(12) United States Patent
Fujisaki

(10) Patent No.: US 8,331,850 B1
(45) Date of Patent: *Dec. 11, 2012

(54) CARRIER

(76) Inventor: Iwao Fujisaki, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,519

(22) Filed: Jan. 10, 2012

Related U.S. Application Data

(63) Continuation of application No. 12/941,035, filed on Nov. 6, 2010, now Pat. No. 8,103,211, which is a continuation of application No. 12/434,795, filed on May 4, 2009, now Pat. No. 7,853,201, which is a continuation of application No. 11/428,330, filed on Jun. 30, 2006, now Pat. No. 7,565,105, which is a continuation of application No. 10/711,990, filed on Oct. 18, 2004, now Pat. No. 7,113,779.

(60) Provisional application No. 60/481,871, filed on Jan. 8, 2004.

(51) Int. Cl.
*H04H 7/00* (2006.01)

(52) U.S. Cl. ............ 455/3.06; 455/41.2; 455/12.1; 455/431

(58) Field of Classification Search ............ 455/3.06, 455/431, 12.1, 41.2, 3.01, 3.02, 3.05, 414.1, 455/43.1, 427, 13.3, 13.2, 430, 188, 66.1, 455/344, 345; 370/316, 321, 212, 511
See application file for complete search history.

(56) References Cited

U.S. PATENT DOCUMENTS

| | | | |
|---|---|---|---|
| 3,945,716 A | 3/1976 | Kinder | |
| 4,135,817 A | 1/1979 | Young et al. | |
| 4,249,181 A | 2/1981 | Lee | |
| 4,419,766 A | 12/1983 | Goeken et al. | |
| 4,607,389 A | 8/1986 | Halgrimson | |
| 4,630,821 A | 12/1986 | Greenwald | |
| 4,688,046 A | 8/1987 | Schwab | |
| 4,756,528 A | 7/1988 | Umashankar | |
| 5,067,172 A | 11/1991 | Schloemer | |
| 5,073,900 A | 12/1991 | Mallinckrodt | |
| 5,123,112 A | 6/1992 | Choate | |
| 5,195,709 A | 3/1993 | Yasushi | |
| 5,381,139 A | 1/1995 | Bensimon | |
| 5,408,515 A | 4/1995 | Bhagat et al. | |
| 5,444,762 A | 8/1995 | Frey et al. | |
| 5,519,761 A | 5/1996 | Gilhousen | |
| 5,559,865 A | 9/1996 | Gilhousen | |
| 5,950,129 A | 9/1999 | Schmid et al. | |
| 6,208,307 B1 | 3/2001 | Frisco et al. | |
| 6,285,878 B1 | 9/2001 | Lai | |
| 6,321,084 B1 | 11/2001 | Horrer | |
| 6,448,906 B1 | 9/2002 | Nachtsheim et al. | |
| 6,512,921 B1 | 1/2003 | Hadinger | |
| 6,614,126 B1 * | 9/2003 | Mitchell | 307/9.1 |
| 6,661,353 B1 | 12/2003 | Gopen | |
| 6,741,841 B1 * | 5/2004 | Mitchell | 455/188.1 |
| 6,751,801 B1 | 6/2004 | Frisco et al. | |
| 6,781,968 B1 | 8/2004 | Colella et al. | |
| 6,889,042 B2 | 5/2005 | Rousseau et al. | |
| 7,006,904 B2 | 2/2006 | Pippenger | |
| 7,020,708 B2 | 3/2006 | Nelson et al. | |
| 7,116,941 B1 | 10/2006 | Tabe | |
| 7,853,201 B1 * | 12/2010 | Fujisaki | 455/3.06 |
| 8,103,211 B1 * | 1/2012 | Fujisaki | 455/3.06 |

(Continued)

*Primary Examiner* — Tan Trinh

(57) ABSTRACT

The vehicle, such as airplane, which comprises the internal wireless communicating device and the external antenna device, wherein the passenger(s) in the vehicle may access network (e.g., the Internet) via the internal wireless communicating device and the external antenna device.

20 Claims, 70 Drawing Sheets

U.S. PATENT DOCUMENTS

| | | |
|---|---|---|
| 2002/0028655 A1 | 3/2002 | Rosener et al. |
| 2002/0072389 A1 | 6/2002 | Ward et al. |
| 2002/0087992 A1 | 7/2002 | Bengeult et al. |
| 2002/0160773 A1 | 10/2002 | Gresham et al. |
| 2002/0168975 A1 | 11/2002 | Gresham et al. |
| 2003/0200547 A1 | 10/2003 | Frisco et al. |
| 2003/0233658 A1 | 12/2003 | Keen et al. |
| 2004/0078821 A1 | 4/2004 | Frisco et al. |
| 2005/0040224 A1 | 2/2005 | Brinton et al. |
| 2007/0156863 A1* | 7/2007 | Oueslati et al. ............... 709/220 |

* cited by examiner

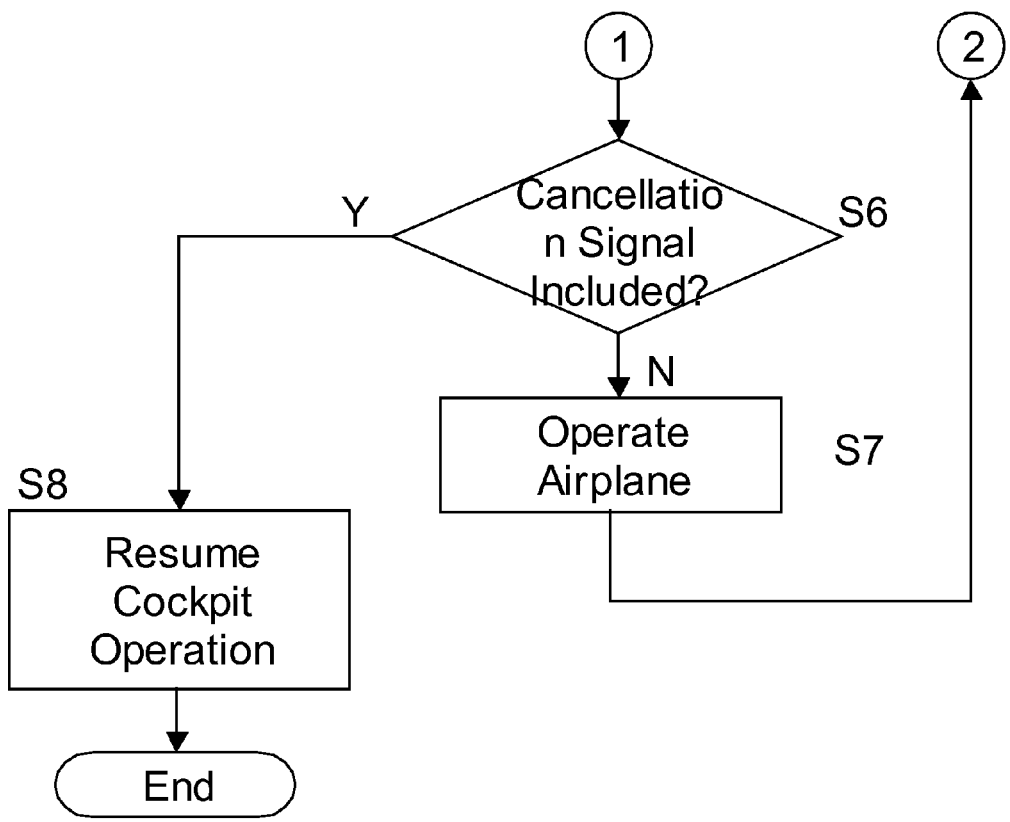

Response Signal 601

Header 602   Response Data 603   Footer 604

Command Signal 605

Fig. 11

RAM 206

| Airport #1 | Location Data V |
|---|---|
| Airport #2 | Location Data W |
| Airport #3 | Location Data X |
| Airport #4 | Location Data Y |

Area 502

Fig. 20

3D Map Data Storage Area H01b1

| 3D Area ID | 3D Area Data |
|---|---|
| 3D Area#1 | 3D Area Data#1 |
| 3D Area#2 | 3D Area Data#2 |
| 3D Area#3 | 3D Area Data#3 |
| 3D Area#4 | 3D Area Data#4 |
| 3D Area#5 | 3D Area Data#5 |
| 3D Area#6 | 3D Area Data#6 |
| 3D Area#7 | 3D Area Data#7 |
| 3D Area#8 | 3D Area Data#8 |
| 3D Area#9 | 3D Area Data#9 |

Fig. 21

Version Data Storage Area H01b2

| 3D Area ID | Version Data |
|---|---|
| 3D Area#1 | Version 1 |
| 3D Area#2 | Version 1 |
| 3D Area#3 | Version 1 |
| 3D Area#4 | Version 1 |
| 3D Area#5 | Version 2 |
| 3D Area#6 | Version 1 |
| 3D Area#7 | Version 1 |
| 3D Area#8 | Version 1 |
| 3D Area#9 | Version 1 |

Navigation Software Storage Area H01c

Navigation Data Storage Area 20601b

Fig. 27

3D Map Data Storage Area 20601b1

| 3D Area ID | 3D Area Data |
|---|---|
| 3D Area#1 | 3D Area Data#1 |
| 3D Area#2 | 3D Area Data#2 |
| 3D Area#3 | 3D Area Data#3 |
| 3D Area#4 | 3D Area Data#4 |
| 3D Area#5 | 3D Area Data#5 |
| 3D Area#6 | 3D Area Data#6 |
| 3D Area#7 | 3D Area Data#7 |
| 3D Area#8 | 3D Area Data#8 |
| 3D Area#9 | 3D Area Data#9 |

Fig. 28

Version Data Storage Area 20601b2

| 3D Area ID | Version Data |
|---|---|
| 3D Area#1 | Version 1 |
| 3D Area#2 | Version 1 |
| 3D Area#3 | Version 1 |
| 3D Area#4 | Version 1 |
| 3D Area#5 | Version 2 |
| 3D Area#6 | Version 1 |
| 3D Area#7 | Version 1 |
| 3D Area#8 | Version 1 |
| 3D Area#9 | Version 1 |

Navigation Software Storage Area
20601c

RAM 206

Fig. 39

TV Data Storage Area 20602b1

| Channel ID | TV Data |
|---|---|
| Channel#1 | TV Data#1 |
| Channel#2 | TV Data#2 |
| Channel#3 | TV Data#3 |
| Channel#4 | TV Data#4 |

Satellite TV Software Storage Area 20602c

RAM T206

Fig. 45

TV Data Storage Area T20602b1

| Channel ID | TV Data |
|---|---|
| Channel#1 | TV Data#1 |
| Channel#2 | |
| Channel#3 | |
| Channel#4 | |

Channel ID&TV Data Signal STVS02b

Channel#1 / TV Data#1 / Channel#2 / TV Data#2 / Channel#3 / TV Data#3 / Channel#4 / TV Data#4

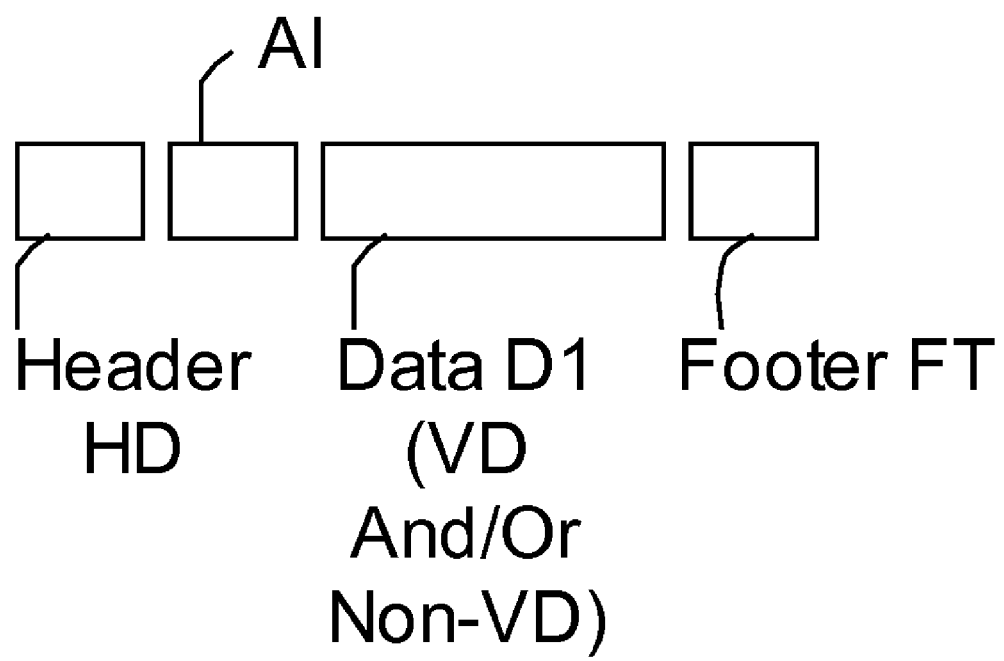

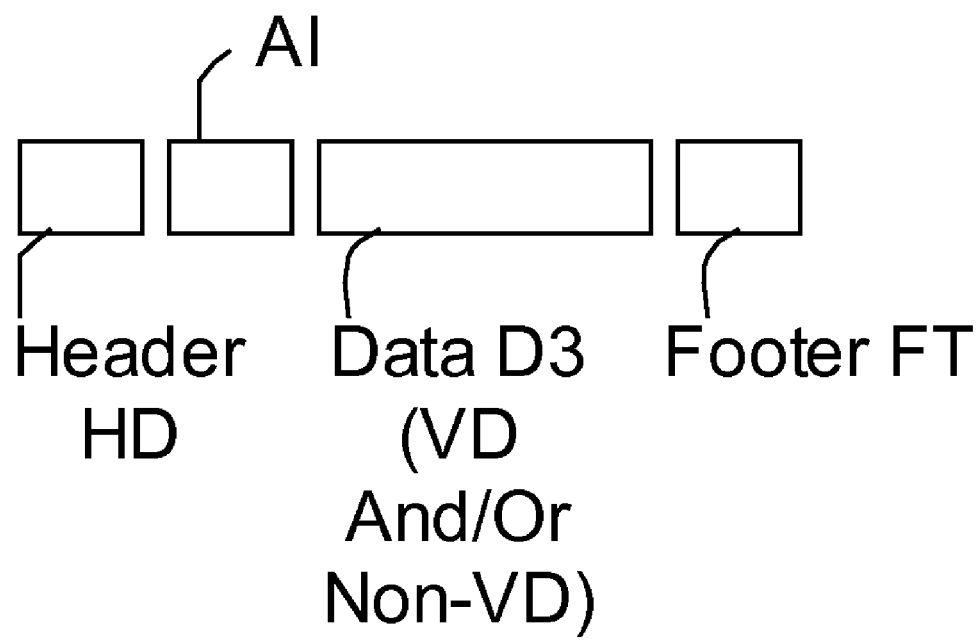

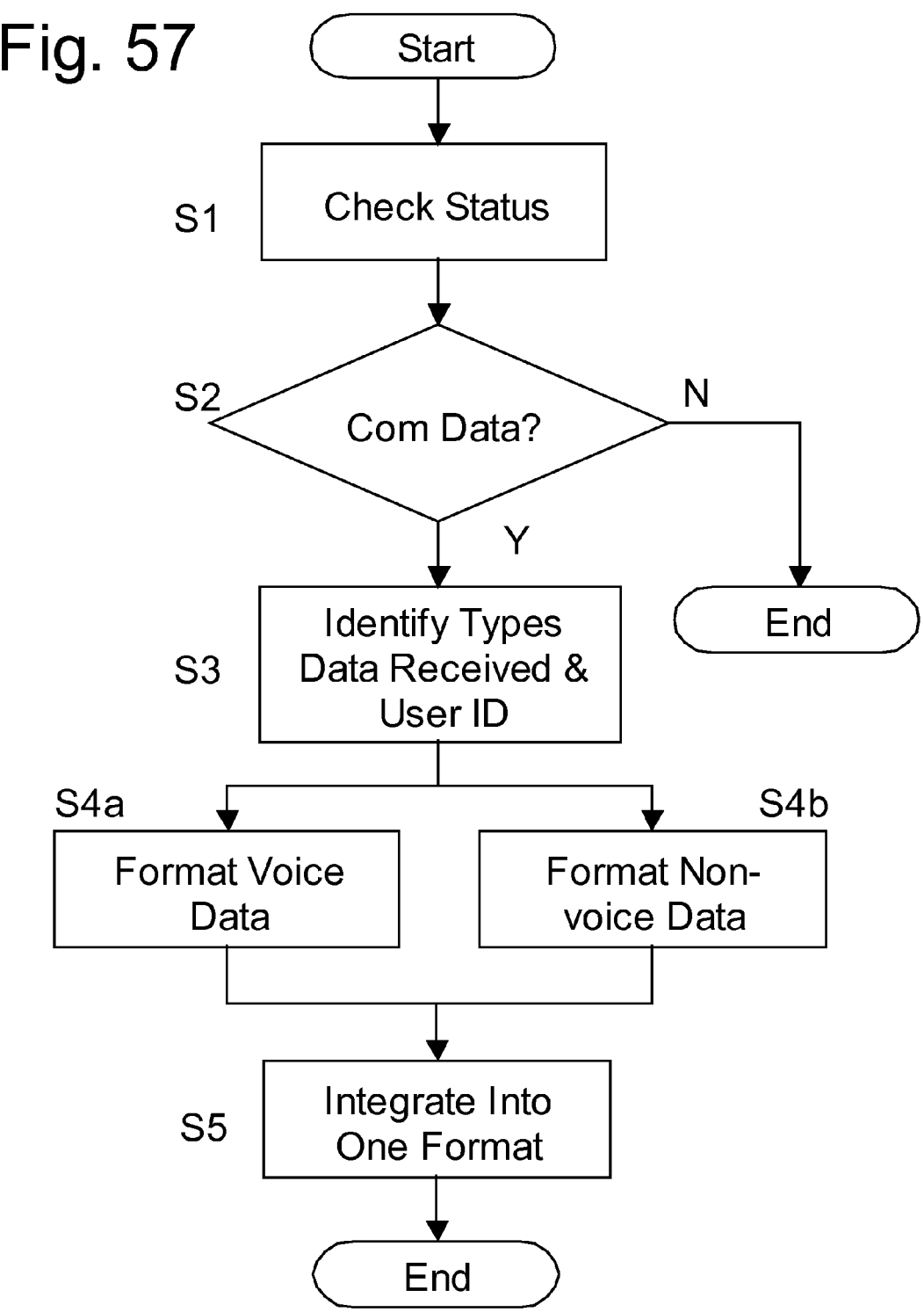

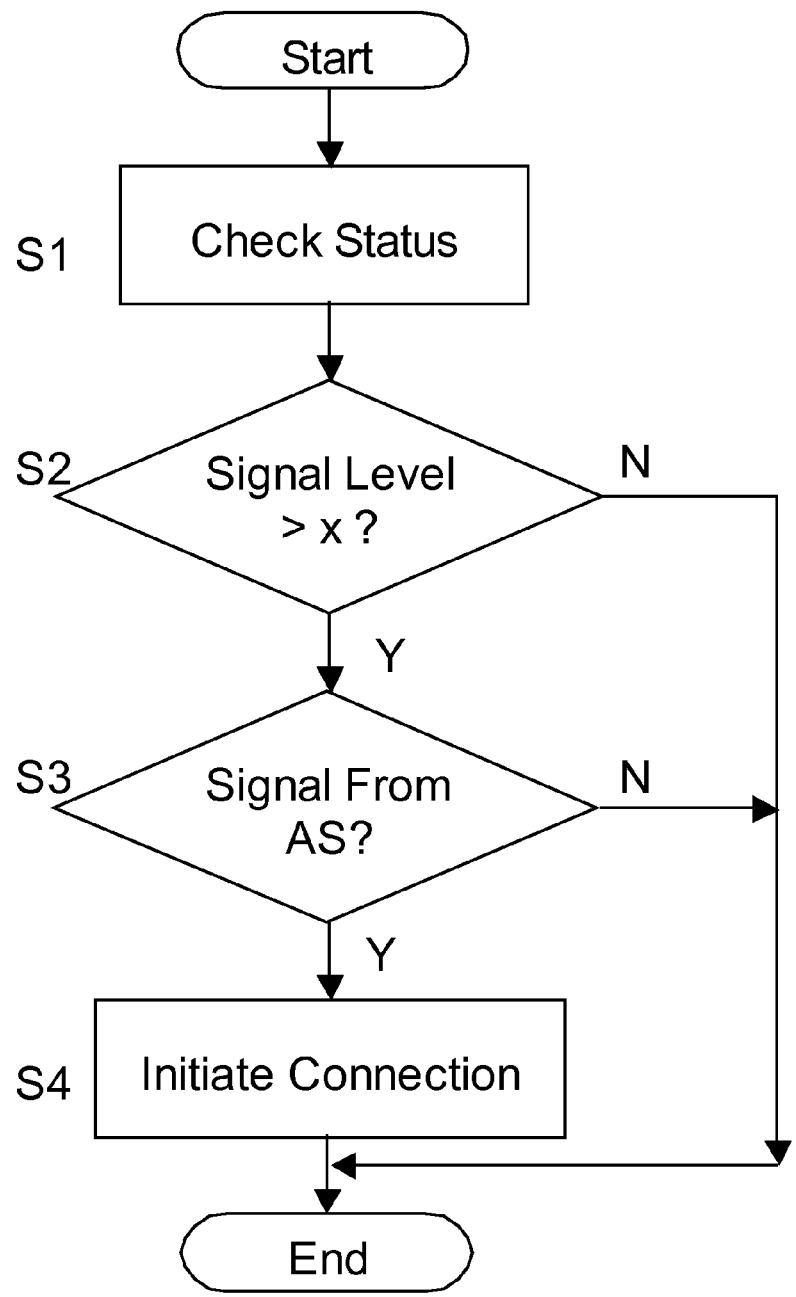

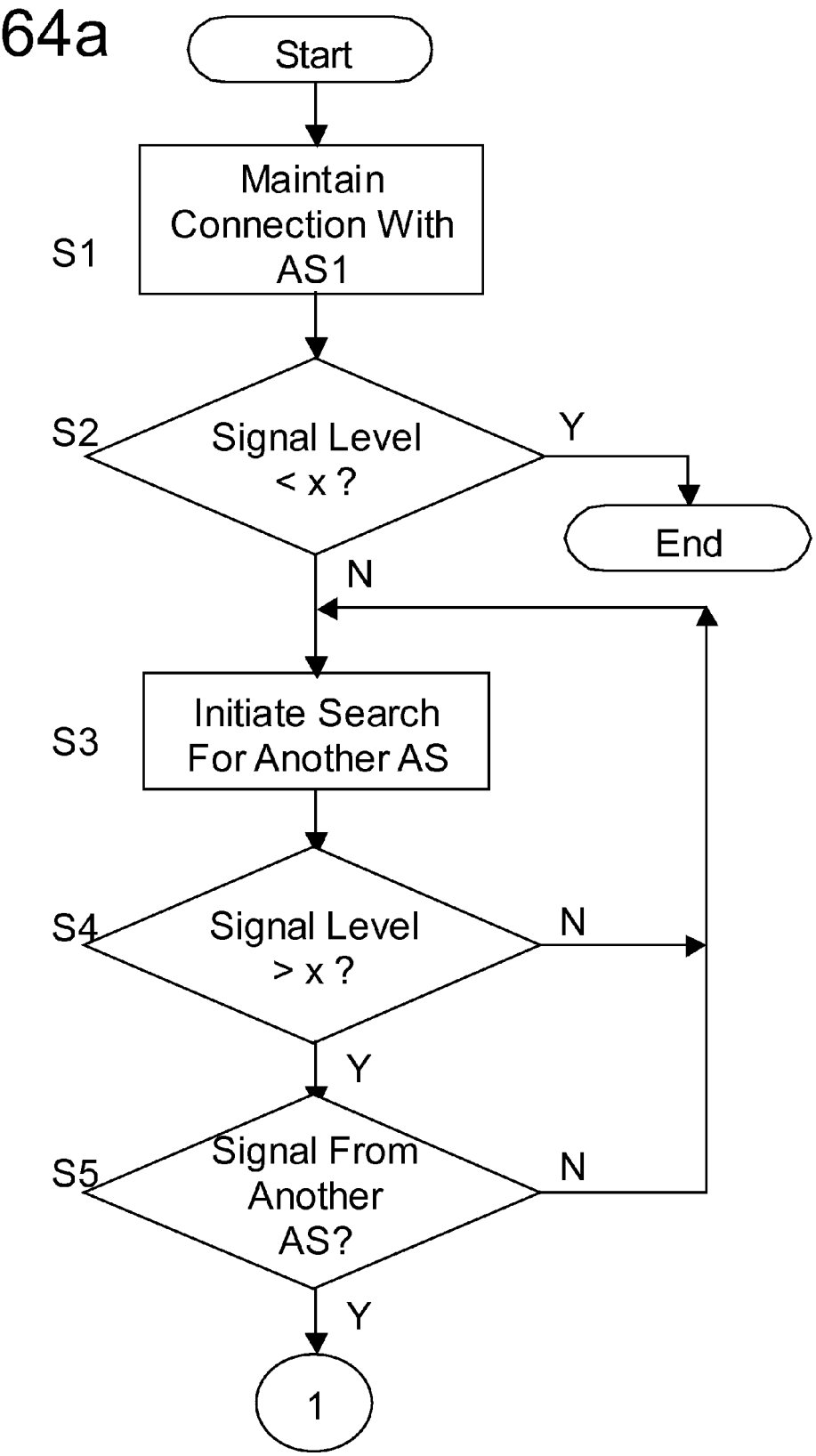

CARRIER

CROSS REFERENCE TO RELATED APPLICATIONS

This application is a continuation of U.S. Ser. No. 12/941,035, filed 2010 Nov. 6, which is a continuation of U.S. Ser. No. 12/434,795, filed 2009 May 4, which is a continuation of U.S. Ser. No. 11/428,330, filed 2006 Jun. 30, which is a continuation of U.S. Ser. No. 10/711,990, filed 2004 Oct. 18, which claims the benefit of U.S. Provisional Application No. 60/481,871, filed 2004 Jan. 8, all of which are hereby incorporated herein by reference in their entirety.

BACKGROUND OF INVENTION

The invention relates to navigation system and more particularly to that of airplanes, space shuttles, gliders, railway trains, buses, taxis, and all other types of carriers and transportation systems.

U.S. Pat. No. 6,751,801 is introduced as a prior art of the present invention of which the summary is the following: 'An aircraft in-flight entertainment system includes a satellite TV receiver, at least one video display connected to the receiver, and a multi-beam antenna on the aircraft for receiving signals from a plurality of satellite TV transponders. The multi-beam antenna may have right-hand circularly polarized (RHCP) and left-hand circularly polarized (LHCP) beams offset from one another by a beam offset angle. The beam offset angle may be less than an angle defined by the spacing of the DBS transponders. The system may also include an antenna steering positioner connected to the multi-beam antenna, and an antenna steering controller for steering the multi-beam antenna based upon received signals from at least one of the RHCP and LHCP beams. The antenna steering controller may comprise a processor for steering the multi-beam antenna based on a selected master one of the RHCP and LHCP beams and slaving the other beam therefrom. Alternately, the processor may steer the multi-beam antenna based on a predetermined contribution from each of the RHCP and LHCP beams.'

U.S. Pat. No. 6,512,921 is introduced as a prior art of the present invention of which the summary is the following: 'A GSO satellite constellation (10) and an NGSO constellation (20) may be used to send various types of communication signals and multimedia signals to an aircraft (30). The video signals are demodulated by a demodulator (46) and routed by a router (64) to TV monitors (72 and 74), as well as short-term video storage (78). Data can be received and transmitted by a low gain, narrowband transmitter/receiver (100) in order to provide voice, computer and control communications at all times during the flight of aircraft (30).'

U.S. Pat. No. 6,208,307 is introduced as a prior art of the present invention of which the summary is the following: 'An aircraft in-flight entertainment system includes an antenna, a satellite TV receiver connected to the antenna, at least one video display connected to the satellite TV receiver, and wherein the antenna is steered using received signals from the relatively wide bandwidth from at least one satellite TV transponder, such as a direct broadcast satellite (DBS) transponder. The system may include an antenna steering positioner connected to the antenna, and an antenna steering controller comprising the received signal detector for generating a received signal strength feedback signal based upon signals from the at least one satellite TV transponder. A processor may be connected to the detector for controlling the antenna steering positioner during aircraft flight and based upon the received signal strength feedback signal. The antenna steering controller may further comprise at least one inertial rate sensor, and the processor may calibrate the sensor based upon the received signal strength feedback signal. The antenna steering controller may also include a global positioning system (GPS) receiver connected to the processor, and the processor may further calibrate the rate sensor based upon the GPS receiver.'

U.S. Pat. No. 5,381,139 is introduced as a prior art of the present invention of which the summary is the following: 'A detector system for a roll-stabilized aircraft includes a hollow rotatable toroidal ring within which a suitable sensor such as a TV sensor is fixed. The sensor observes the exterior of the aircraft through an observation window in the outer peripheral wall of the ring, which can be rotated about the roll axis of the aircraft. The apparatus includes appropriate instrumentation for determining the position relative to the aircraft of an object detected by the sensor.'

U.S. Pat. No. 5,195,709 is introduced as a prior art of the present invention of which the summary is the following: 'A supporting structure for supporting a TV set on an armrest of a seat of an aircraft or other vehicle so that the TV set can be turned in a vertical plane between an operating position outside a cavity formed in the front portion of the armrest and a housing position within the cavity, can be turned about a vertical axis at the operating position, and can be tilted with respect to the vertical axis. The supporting structure includes a hinge mechanism provided at the front upper end of the cavity, and a turning mechanism supported on the hinge mechanism and supporting the TV set so that the TV set can be turned at the operating position in both horizontal and vertical planes. A hinge pin included in the hinge mechanism is provided at one end with a diametrical through hole expanding toward the opposite open ends. One end of a locking pin, included in a locking mechanism, engages one of the open ends of the diametrical through hole of the hinge pin when the hinge pin is at a first predetermined angular position and engages the other open end of the diametrical through hole when the hinge pin is at a second angular position differing from the first predetermined angular position by an angle of about 180.degree. The hinge mechanism is interlocked with a shock absorbing mechanism.'

U.S. Pat. No. 4,756,528 is introduced as a prior art of the present invention of which the summary is the following: 'A video system incorporated into the back of a typical passenger seat, as on an airplane, bus, etc. The system includes a TV screen disposed normally in an upright position and recessed at least in part in the usual recess in a seat back. The arm rest of the seat next rearwardly carries various controls by means of which several modes of TV operation are available, along with the playing of music, commentaries and the like via cassettes in the arm rest, a master array of cassettes located centrally in the aircraft, disk drives, and improved power supply.'

U.S. Pat. No. 4,688,046 is introduced as a prior art of the present invention of which the summary is the following: 'An aircraft locating system identifies on a TV format radar display the position of a specific aircraft based on an RF transmission from the aircraft on an RF channel. The locating system includes at least a pair of receive stations located within several miles of an airport and separated by a base line which is in near proximity to at least one runway at the airport or a theoretical extension thereof. Each receive station includes a passive receiver for determining a bearing angle to a source of RF on the RF channel for generating a signal representative of the bearing angle. The locating system further includes a processor which is responsive to bearing angle signals derived from the receive stations for generating line count and line delay information. The line count and line delay information correlate a position determined by the bearing angle signals from at least a pair of receive stations with a frame of reference of the TV display. The system further includes a video mixer which responds to two different input signals. A first input signal to the video mixer is a scan converted radar return signal. The second input signal to the video mixer is the line count and line delay information. The output of the video mixer is used to drive a video display. The video display, subjected to the two identified inputs can highlight a location identified by the line count and line delay information so that for example a person viewing the display would be able to identify which of perhaps plural radar returns shown on the display is associated with an aircraft which is actively transmitting on the RF channel.'

U.S. Pat. No. 4,630,821 is introduced as a prior art of the present invention of which the summary is the following: 'There is disclosed a video game apparatus to be employed by a passenger of an airplane. The apparatus includes a tray which is mounted on the rear of an airplane seat. The tray has an internal hollow with a rectangular aperture on a top surface which surface faces the passenger when the tray is placed in a usable position. Located in the rectangular aperture is a TV display screen. Located in the internal hollow of the tray is a video game apparatus which operates to provide a video game display on the surface of said TV display screen. The surface of the tray containing the TV display screen also includes a plurality of control elements which are coupled to the video game apparatus to enable the passenger to operate the game. To energize the game, the tray contains a cable coupling assembly whereby when a cable is inserted into the assembly, the video game is energized to provide a display of a game selected by means of a selector switch also mounted on the top surface of the tray.'

U.S. Pat. No. 4,135,817 is introduced as a prior art of the present invention of which the summary is the following: 'Apparatus for measuring an aircraft's horizontal speed and height above ground without the need for airborne cooperative devices. Two ground level TV cameras separated by a measured distance and pointed at zenith are placed in line with the projection of the expected path of the aircraft. Speed is determined by measuring the time that it takes the aircraft to travel between the fields of view of the two TV cameras using zenith crossings as the reference points. Height is determined by correlating the speed with the time required to cross the field of view of either of the two cameras.'

U.S. Pat. No. 3,945,716 is introduced as a prior art of the present invention of which the summary is the following: 'A rotatable head up display system is provided to furnish target coorindate nformation to the pilot of an aircraft, for example. The head up display may be slaved to a FLIR or TV tracker to display the scene viewed thereby as well as the azimuth with respect to the aircraft. A small cathode ray tube is used for the display and the scene is viewed through a holographic lens so that the display appears at infinity focus. The pilot is also provided with means for controlling the aiming of the sensor (FLIR, TV, or the like).'

U.S. Patent Publication No. 20040078821 is introduced as a prior art of the present invention of which the summary is the following: 'An aircraft in-flight entertainment system preferably includes, in one embodiment, a satellite TV receiver, at least one passenger video display connected to the receiver, and a processor connected to the receiver for determining an undesired condition and for generating a substitute image on the passenger video display rather than permit display of an undesired image which would otherwise be produced. The undesired condition may relate to a weak signal or component malfunction. Accordingly, the undesired image may be an undesired default text message or a degraded picture image. Other embodiments of the in-flight entertainment system are directed to providing a moving map image flight information channel integrated with the programming channels of the system.'

U.S. Patent Publication No. 20030200547 is introduced as a prior art of the present invention of which the summary is the following: 'An aircraft in-flight entertainment system includes an adaptive antenna, a terrestrial television (TV) receiver connected to the adaptive antenna for receiving TV programming channels from more than one terrestrial TV transmitter, and at least one display connected to the terrestrial TV receiver. A controller is connected to the adaptive antenna for determining a desired terrestrial TV transmitter, and for directing the adaptive antenna towards the desired terrestrial TV transmitter. If a new desired terrestrial TV transmitter is determined by the controller, then the controller redirects the adaptive antenna towards the new desired terrestrial TV transmitter.'

U.S. Pat. No. 6,448,906 is introduced as a prior art of the present invention of which the summary is the following: 'A device uses bluetooth techniques to communicate with electronic devices in an airplane. During take off or landing, the radio on board the airplane operates in bluetooth mode to send a global poll to all devices requesting that they respond. If a device responds, then it indicates that the device is on at an unauthorized time. This informs the crew that they should try to find the unauthorized device and turn it off.'

U.S. Pat. No. 6,321,084 is introduced as a prior art of the present invention of which the summary is the following: 'To set up a telecommunication link to a person who is in a substantially enclosed facility such as an airplane, inside which there are several internal communication transmitting terminals operated by a private branch exchange of the facility, a personal call number is assigned to a private telecommunication transmitting terminal of the person in a public telecommunication network at least during the person's stay in the facility, the assignment is stored of his/her personal call number to the internal communication transmitting terminal assigned to the person during his/her stay in the facility. A call directed to the personal call number of the person is rerouted together with the personal call number or a corresponding ID to the private branch exchange. The internal communication transmitting terminal assigned to the personal call number/ID is then determined using the stored assignment and the call is forwarded to this internal communication transmitting terminal, whereby the person remains able to be reached under his/her personal call number.'

U.S. Pat. No. 6,285,878 is introduced as a prior art of the present invention of which the summary is the following: 'A new use for the (already existing) fleets of commercial airline aircraft to replace low-earth orbit (LEO) communication satellites. This invention will provide low-cost, broadband wireless communication infrastructure among points-to-points accomplished by using and modifying existing, small, lightweight low power, low cost microwave relay station equipment onboard the commercial airline aircraft. Each equipped aircraft would have a broadband wireless communication link (within line-of-sight coverage ranges) to one or more neighboring aircraft or ground stations and form a chain of seamless airborne repeaters providing broadband wireless communication gateways along the entire flight path. Broadband wireless communication services also provide for customers onboard in-flight as well as customers overboard, along the line-of-sight ranges of flight path from the commercial airline aircraft.'

U.S. Pat. No. 5,950,129 is introduced as a prior art of the present invention of which the summary is the following: 'A system and method for providing two-way in-flight radio telecommunications on board an aircraft is disclosed. The radio telecommunication system includes a Gateway Mobile Switching Center (G-MSC), an Aircraft In-flight System Controller (AISC) located on board a subscriber's aircraft, a Ground In-flight System Controller (GISC), a satellite to relay messages and calls from the GISC and AISC, and a Home Location Register (HLR) which provides routing and location information for use by the GISC and the G-MSC. In an alternate embodiment of the invention, a system and method for using a mobile phone on an aircraft is disclosed. A mobile phone is connected to a seat terminal located on an aircraft by a co-ax cable. The radio frequency (RF) signals produced by a mobile phone pass through a coax cable to an Airborne Radio Base Station (A-RBS). The A-RBS converts the RF signals into signals which do not interfere with the aircraft's navigational and communication equipment and are compatible with the GISC and multiple cellular networks. These converted signals are then transmitted via satellite to a cellular network.'

U.S. Pat. No. 5,559,865 is introduced as a prior art of the present invention of which the summary is the following: 'The airborne communication system enables one or more radiotelephones to communicate with a ground based cellular radiotelephone system. In the preferred embodiment, the aircraft is equipped with a repeater that relays a signal from the airborne radiotelephone to the ground base station and vice versa. Alternate embodiments use an airborne base station to register the radiotelephones before registering them with the ground system. Alternately, the antennas on the ground could be used to form aerial cell sites by pointing the antennas upward to where the aircraft flies through the cells. The system of the present invention provides the additional benefit of enabling the ground based cellular radio systems to source a call to the aircraft radiotelephone.'

U.S. Pat. No. 5,519,761 is introduced as a prior art of the present invention of which the summary is the following: 'The airborne radio communications system of the present invention enables an airborne radio to communicate with the ground based cellular radiotelephone system. The present invention also enables the ground based system to keep track of the location of the airborne radiotelephone and page it when a call from the ground based telephone system is received. The ground base station is connected to upward radiating antennas that form airborne cells. As the aircraft with the radio flies through the airborne cells, the airborne relay receives the signals from the base station and relays them to the radio. If the radio is transmitting signals, the relay transmits those signals, through the airborne cells, to the base station. As the aircraft moves from cell to cell, the radio is handed off to the next cell to maintain communications with the ground.'

U.S. Pat. No. 5,444,762 is introduced as a prior art of the present invention of which the summary is the following: 'Directional antennae on aircraft and on cellular telephone base stations, having a polarity opposite that of potentially interfering ground system signals, minimize signal strength of air cellular signals received by ground cellular stations. Aircraft directional antennae comprise patch antennae or vertical arrays of loop elements or vertical arrays of virtual loop elements. Additionally, air cellular signals are switched to channels not currently in use by ground cellular systems.'

U.S. Pat. No. 5,408,515 is introduced as a prior art of the present invention of which the summary is the following: 'A ground-to-air telephone calling system is provided including a computer for receiving an airborne telephone number and a call-back number from a calling party and forming the telephone numbers into a data signal comporting with existing protocol filed in the FCC, an uplink unit for uplinking the data signal to a satellite and a plurality of downlink stations for receiving the data signal from the satellite; a plurality of ground stations corresponding to each of the downlink units for receiving the data signals and passing a call signal identifying the airborne telephone and particular ground station to a corresponding transmit/receive unit for subsequent transmission to the aircraft; a call being initiated from the ground station to the calling party over the public switched telephone network if the aircraft responds to the call signal. An alternative embodiment provides for a plurality of telephones on board the aircraft, and is capable of directing a call from a ground based caller to a particular telephone assigned to a passenger on the aircraft.'

U.S. Pat. No. 5,123,112 is introduced as a prior art of the present invention of which the summary is the following: 'An air-to-ground communications system is described for controlling multiple two way radiotelephone conversations between a large number of aircraft (53) and a network of base stations (51) that are capable of being interconnected to landline telephone networks (54, 116). Plural base station controllers (90) of the system, each dedicated to control one base station (51), are in turn controlled by a single central processor (52). Means are provided for matching each aircraft with an optimal base station to afford it the strongest available communication signals, and for dynamically allocating communication channels between the base stations. The central processor (52) is designed to manage the system by recording and recognizing usage patterns (525-530) and allocating channels to most efficiently use the available radio spectrum among all the aircraft (517, 519).'

U.S. Pat. No. 5,073,900 is introduced as a prior art of the present invention of which the summary is the following: 'A cellular communications system is provided having both surface and satellite nodes which are fully integrated for providing service over large areas. A spread spectrum system is used with code division multiple access (CDMA) employing forward error correction coding (FECC) to enhance the effective gain and selectivity of the system. Multiple beam, relatively high gain antennas are disposed in the satellite nodes to establish the satellite cells, and by coupling the extra gain obtained with FECC to the high gain satellite node antennas, enough gain is created in the satellite part of the system such that a user need only use a small, mobile handset with a non-directional antenna for communications with both ground nodes and satellite nodes. User position information is also available. A digital data interleaving feature reduces fading.'

U.S. Pat. No. 5,067,172 is introduced as a prior art of the present invention of which the summary is the following: 'An air-to-ground communications system wherein the communicating frequency channels are assigned dependent on the amplitude of the signals received at the base sites and dependent on the altitude of the aircraft.'

U.S. Pat. No. 4,607,389 is introduced as a prior art of the present invention of which the summary is the following: 'The present invention is a communication system for transmitting an electrical signal from a transmission tower and includes a first transceiver located adjacent the base of the tower and which is in communication with a source of an electrical signal which is to be transmitted. An enclosure is removably located adjacent the top of the tower and includes a second transceiver for receiving the transmitted electrical signal from the first transceiver and a third transceiver for retransmitting the electrical signal from the tower. By this arrangement there is no need for stringing coaxial cable from a ground based transmitter to the antenna mounted to the top of the tower, thereby eliminating the power loss associated with the use of such coaxial cable. In one embodiment of the present invention, the second and third transceivers are conveyed to and from the top of the tower via a pulley arrangement for maintenance purposes, and in an alternate embodiment, the second and third transceivers are enclosed within a housing and are conveyed to and from the top of the tower within a conduit by means of compressed air.'

U.S. Pat. No. 4,419,766 is introduced as a prior art of the present invention of which the summary is the following: 'An improved system and method for providing air/ground communications compatible with ground based telephone systems. The airborne equipment incorporates means for comparing signals received from various ground stations located along the flight path so as to allow the selection of the "best" signal to provide good telephone communications service for a reasonable length telephone conversation.'

U.S. Pat. No. 4,249,181 is introduced as a prior art of the present invention of which the summary is the following: 'In cellular mobile radiotelephone systems employing reuse of a predetermined set of channels in adjacent iterations of a pattern of cells (FIG. 1), average signal-to-interference ratio in at least one cell region of interest is improved by tilting the antenna (11,12) gain pattern center-beam line of an antenna serving that region below the horizontal (FIG. 3). In one embodiment the tilt (.theta.) is sufficient to create a reduced-gain notch (FIG. 8) in the center-beam portion of the pattern.'

U.S. Patent Publication No. 20020160773 is introduced as a prior art of the present invention of which the summary is the following: 'A system for permitting passengers on board an aircraft to send and receive electronic data is described. The components of the system on board the aircraft include a server having a plurality of nodes to which computer terminals are attached, as desired. The components of the system on board the aircraft include a wireless access point having a plurality nodes, where the wireless access point is attached to the server and to a plurality of wireless cards inserted into computer terminals, as desired. The computer terminals are laptop or palm-top personal computers belonging to the various passengers on board or fixed terminals within the aircraft. The server communicates with a wide variety of different terminals running different operating systems and with the access point. Each computer terminal is connected to the server via an aircraft cable or wireless network. Server has mass storage which contains a database of WWW pages which can be browsed by passengers using terminals. Server provides a domain name server (DNS) that masquerades as the passenger's usual DNS. Server then links the passenger to the appropriate locally stored WWW page. Server also contains storage for e-mail messages. Connected to server is one or more radios. This permits data to be transferred to base station using communications network. A virtual private network (VPN) connects station to communications service provider networks, web content processor, and via links to the Internet, including access to subscriber ISPs/corporate mail servers and other mail servers. Points of Presence (POP) provide Internet access and e-mail service to subscribers of the service while not on the aircraft. POPs can also be used by communications service provider networks and web content processors as an alternate means to connect to VPN.'

U.S. Patent Publication No. 20020168975 is introduced as a prior art of the present invention of which the summary is the following: 'An electronic communication system for use onboard an aircraft includes a server and a plurality of input ports for connection with passenger computing devices. Passengers can send and retrieve electronic messages (e-mail and/or attachments) using a proxy-based web server access to the user's own e-mail service provider. The system receives proxy-based commands from the user's computing device and translates those commands into web-based commands that enable communication with the passenger's e-mail accounts. The passenger may send e-mail communications by composing a message on the passenger computing device and sending it via the web-based proxy server. E-mail messages may also be retrieved from one or more passenger e-mail accounts. In one embodiment, the system transmits only e-mail summary information to the airborne server and provides the summary information to the passenger. The passenger may select one or more e-mails and/or attachments for subsequent retrieval, thus limiting passenger expense for retrieval of unwanted or unnecessary e-mails and/or attachments. The system may also display cost information associated with uploading the e-mail and/or attachments to enable the passenger to select those desired messages for subsequent transmission.'

However, the foregoing pieces prior art do not disclose the vehicle, such as airplane, which comprises the internal wireless communicating device and the external antenna device, wherein the passenger(s) in the vehicle may access network (e.g., the Internet) via the internal wireless communicating device and the external antenna device.

SUMMARY

It is an object of the present invention to provide a transportation system which enables the passengers therein to allow wireless communication in a convenient manner.

It is another object of the invention to provide a transportation system which enables the passengers therein to use the communication devices they own while they are in such transportation system.

It is another object of the invention to provide a transportation system which enables to entertain the passengers therein while they are in such transportation system.

It is another object of the invention to provide a transportation system which provides more convenience to the passengers therein while they are in such transportation system.

It is another object of the invention to provide a transportation system which implements a plurality of functions, systems, and/or services provided to the passengers therein.

It is another object of the invention to provide a transportation system with a reliable security system installed therein.

It is another object of the invention to provide a commercially successful transportation system which attracts more users of such system.

The present invention introduces the transportation system, wherein the $1^{st}$ type data, the $2^{nd}$ type data, the $3^{rd}$ type data, and the $4^{th}$ type data, which are received by the internal wireless communicating system simultaneously, are transferred to the satellite via the external wireless communicating system simultaneously, wherein the $1^{st}$ type data and the $2^{nd}$ type data are transferred from the first wireless mobile device located in the transportation system, and the $3^{rd}$ type data and the $4^{th}$ type data are transferred from the second wireless mobile device located in the transportation system.

BRIEF DESCRIPTION OF DRAWINGS

The above and other aspects, features, and advantages of the invention will be better understood by reading the following more particular description of the invention, presented in conjunction with the following drawings, wherein:

FIG. 8b is a flowchart illustrating an exemplary embodiment of the present invention.

FIG. 11 is a block diagram illustrating an exemplary embodiment of the present invention.

FIG. 20 is a block diagram illustrating an exemplary embodiment of the present invention.

FIG. 21 is a block diagram illustrating an exemplary embodiment of the present invention.

FIG. 27 is a block diagram illustrating an exemplary embodiment of the present invention.

FIG. 28 is a block diagram illustrating an exemplary embodiment of the present invention.

FIG. 39 is a block diagram illustrating an exemplary embodiment of the present invention.

FIG. 45 is a block diagram illustrating an exemplary embodiment of the present invention.

FIG. 56a is a digital information illustrating an exemplary embodiment of the present invention.

FIG. 56c is a digital information illustrating an exemplary embodiment of the present invention.

FIG. 57 is a flowchart illustrating an exemplary embodiment of the present invention.

FIG. 63 is a flowchart illustrating an exemplary embodiment of the present invention.

FIG. 64a is a flowchart illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrates only one function or mode in order to avoid complexity in its explanation, however, such description does not mean that only one function or mode can be implemented at a time. In other words, more than one function or mode can be implemented simultaneously by way of utilizing the same random access memory. In addition, the figure numbers are cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1A:
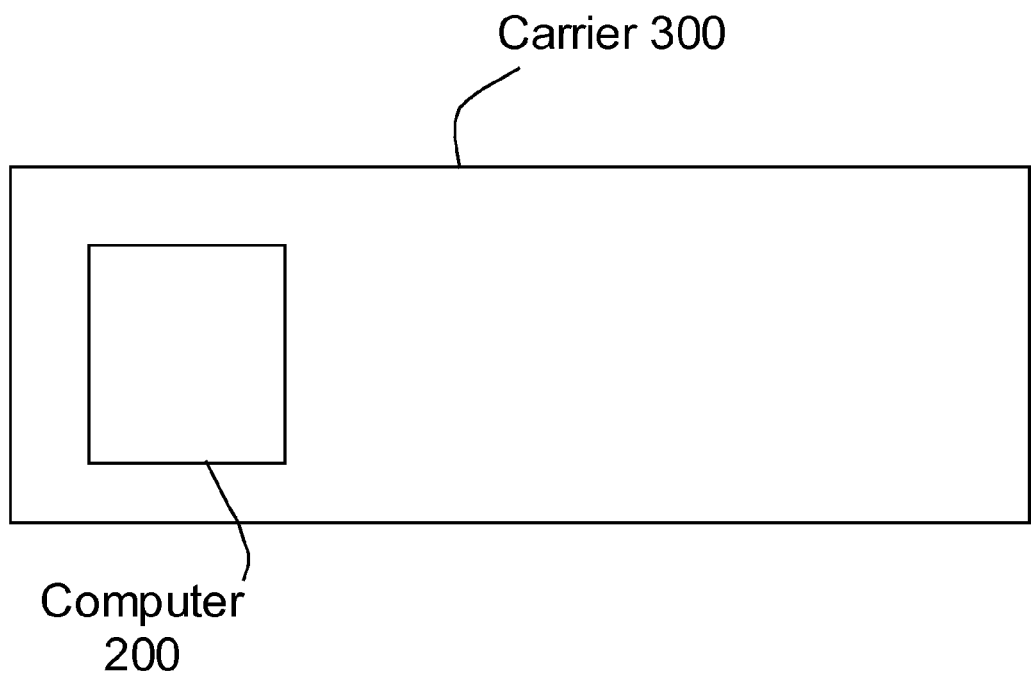
FIG. 1a is a simplified illustration illustrating an exemplary embodiment of the present invention.

As illustrated in FIG. 1a, Carrier 300 includes Computer 200. Computer 200 is responsible of controlling the navigation of Carrier 300. Here, Carrier 300 may be any carrier or transportation system designed to carry passenger(s), such as automobile, motorcycle, railway train, taxi, bus, space ship, space station.

Figure 1B:
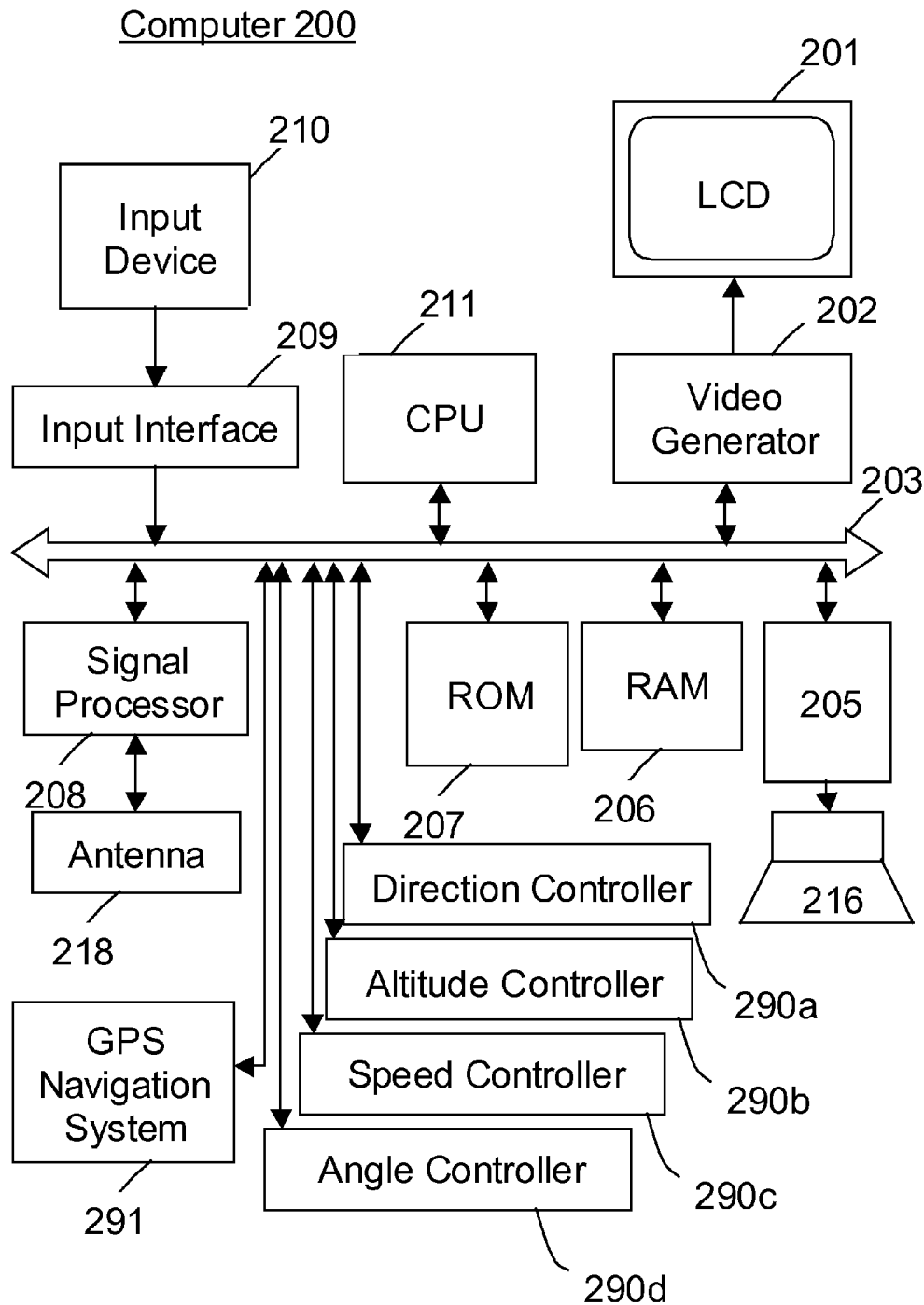
FIG. 1b is a block diagram illustrating an exemplary embodiment of the present invention.

FIG. 1b illustrates the block diagram of the computer installed in the cockpit portion of Carrier 300. CPU 211 controls and administers the overall function and operation of Computer 200. CPU 211 uses RAM 206 to temporarily store data and/or to perform calculation to perform its function. RAM 206 is also used to store a plurality of data and programs necessary to perform the present invention. Video Generator 202 generates analogue and/or digital video signals which are displayed on Monitor 201. Sound Generator 205 generates analogue and/or digital audio signals that are transferred to Speaker 204. ROM 207 stores data and programs which are necessary to perform the present invention. Antenna 212 sends and receives communication data, location data and various types of wireless signals. Signal Processor 208 converts a stream of data produced by CPU 211 into a specific format (for example, data compression) in order to be sent by Antenna 212 in a wireless fashion, and also converts a stream of wireless data received by Antenna 212 into a specific format which is readable by CPU 211. Input signals are input by Input Device 210, such as keyboard, ON/OFF switch, joystick, and the signal is transferred to CPU 211 via Input Interface 209 and Data Bus 203. Direction Controller 213 controls the direction of Carrier 300 (FIG. 1a) in which Computer 200 is installed under the control and administration of CPU 211. Altitude Controller 214 controls the altitude of Carrier 300 in which Computer 200 is installed under the control and administration of CPU 211. Speed Controller 215 controls the speed of Carrier 300 in which Computer 200 is installed under the control and administration of CPU 211. Angle Controller 216 controls the angle of Carrier 300 in which Computer 200 is installed under the control and administration of CPU 211. GPS Navigation System 217 calculates and identifies the present location of Carrier 300 in the actual three-dimensional space by way of utilizing the method so-called GPS or global positioning system.

<<Three-Dimensional Map>>

Figure 2:
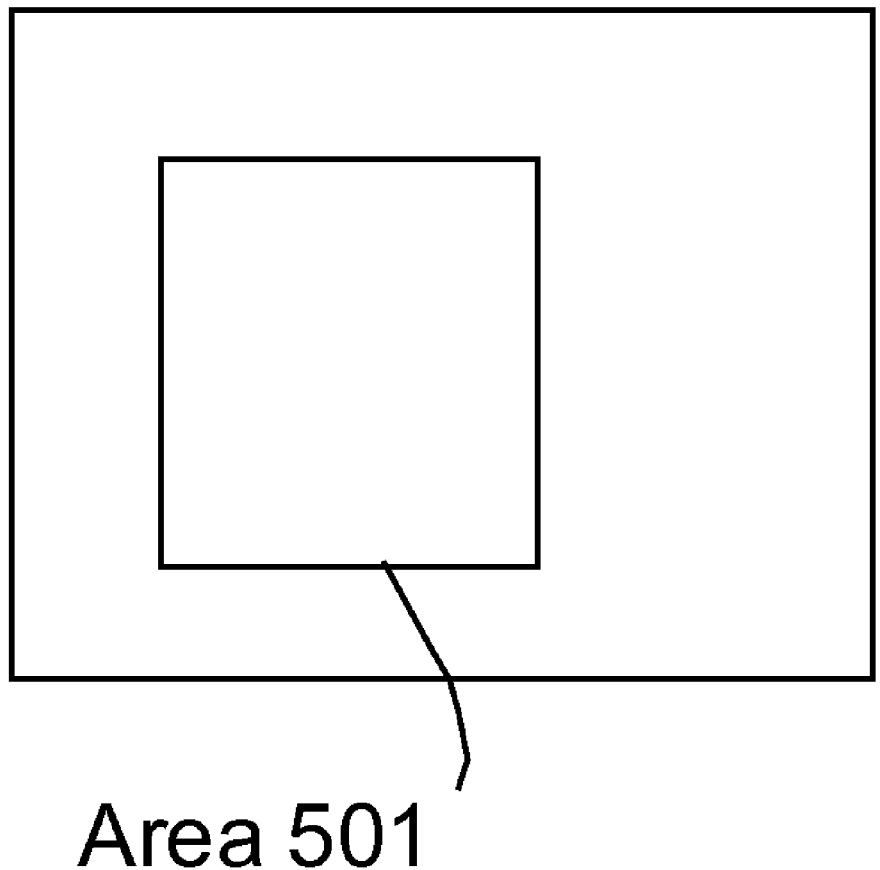
FIG. 2 is a block diagram illustrating an exemplary embodiment of the present invention.

As illustrated in FIG. 2, RAM 206 includes Area 501. Area 501 stores a three-dimensional map of the surface of the earth in a digital format. All of the objects stored as the part of the three-dimensional (3D) map reflect the actual objects exist in the real world, such as mountains, buildings, bridges, islands and other objects which have height of more than one foot above sea level. These objects are stored in Area 501 in three-dimensional format and height, width, and depth of each object are utilized for performing the present invention.

Figure 3:
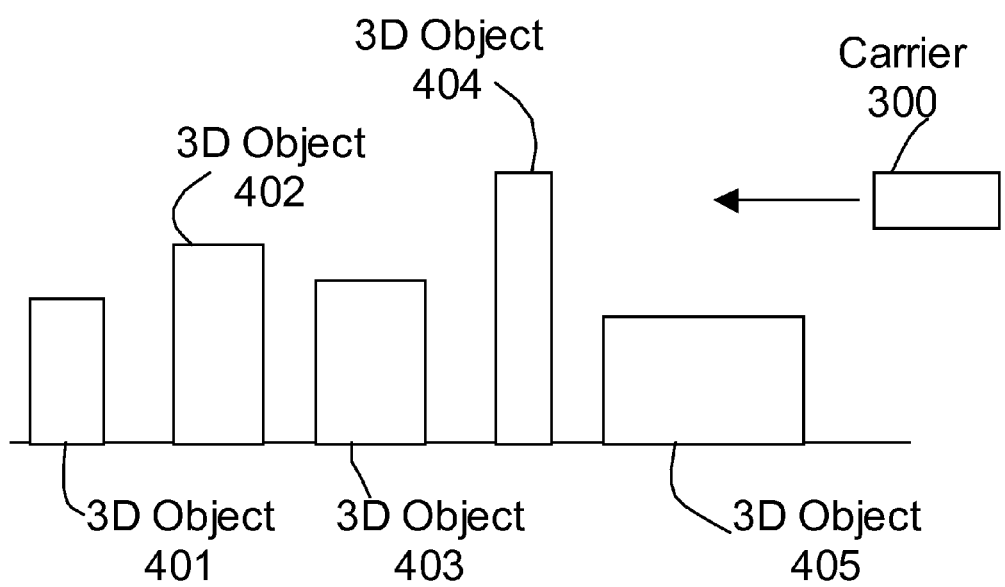
FIG. 3 is a simplified illustration illustrating an exemplary embodiment of the present invention.

FIG. 3 illustrates the method of utilizing the three-dimensional (3D) map stored in Area 501 (FIG. 2). In the example illustrated in FIG. 3, several objects, such as buildings, exist in the three-dimensional space, i.e., Object 401, Object 402, Object 403, Object 404, and Object 405. GPS Navigation System 217 (FIG. 1a) identifies the actual location of Carrier 300 and applies the location data to the three-dimensional map stored in Area 501. In the present example, the altitude of Carrier 300 exceeds the heights of Objects 401, 402, 403, and 405, but does not exceed the height of Object 404. Assuming that all of these objects are located on the path of Carrier 300. If Carrier 300 does not alter its course, it will result in colliding with Object 404.

<<Auto Collision Avoiding Function>>

Figure 4:
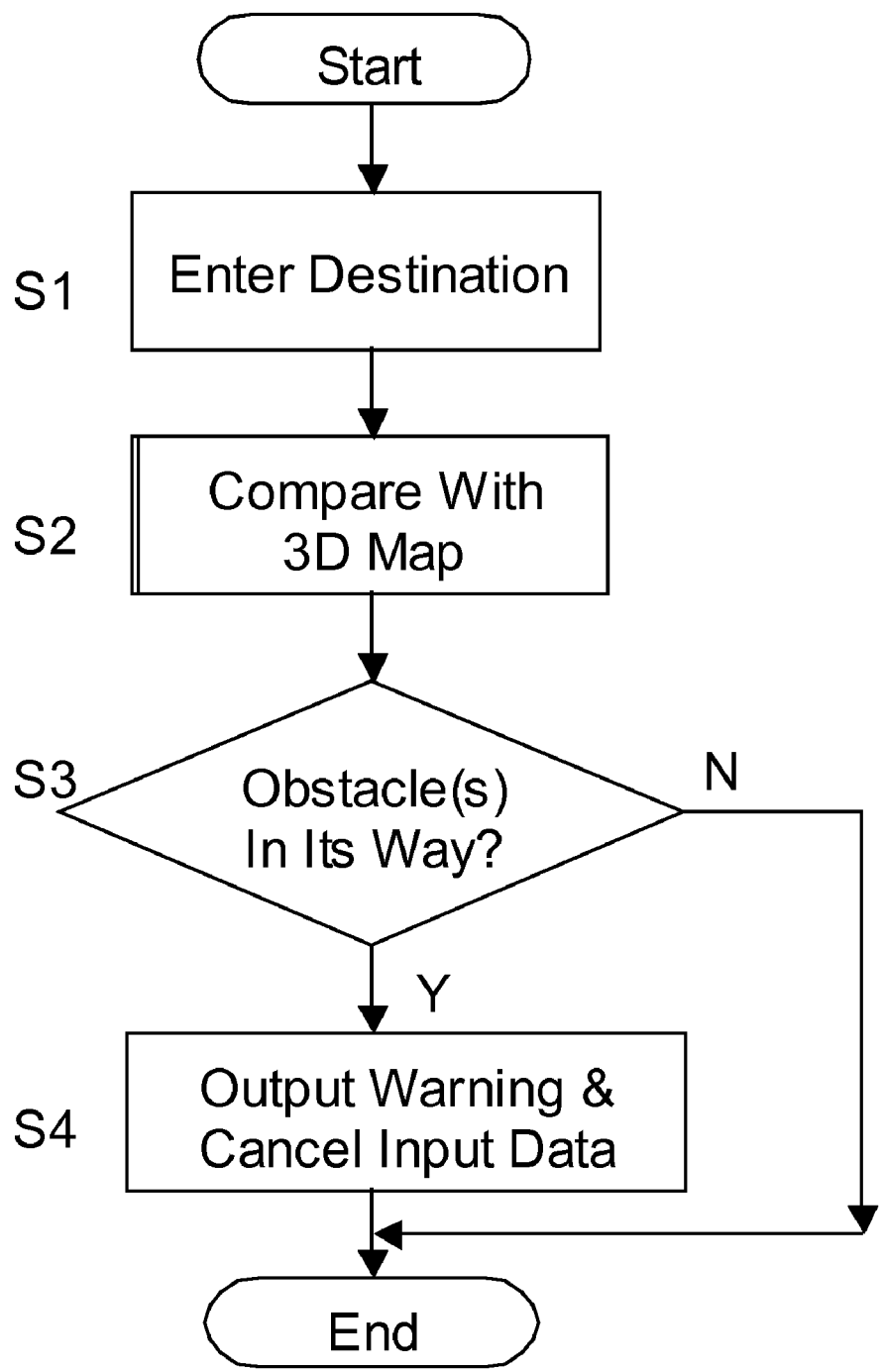
FIG. 4 is a flowchart illustrating an exemplary embodiment of the present invention.

FIG. 4 illustrates the method of Carrier 300 to avoid colliding with any objects during actual flight before such flight is initiated. The destination data which represents the destination of Carrier 300 is manually input by Input Device 210 (FIG. 1b) (S1). CPU 211 (FIG. 1b) calculates the course to the destination based on the destination data and compares with the three-dimensional data stored in Area 501 of RAM 206 (FIG. 2) (S2). If any of the objects stored in Area 501, which is in the path of Carrier 300, is higher than its navigation altitude (S3), CPU 211 outputs a warning sign and/or sound from Monitor 201 (FIG. 1b) and/or Speaker 204 (FIG. 1b) and cancels the input data input from Input Device 210 (S4).

Figure 5:
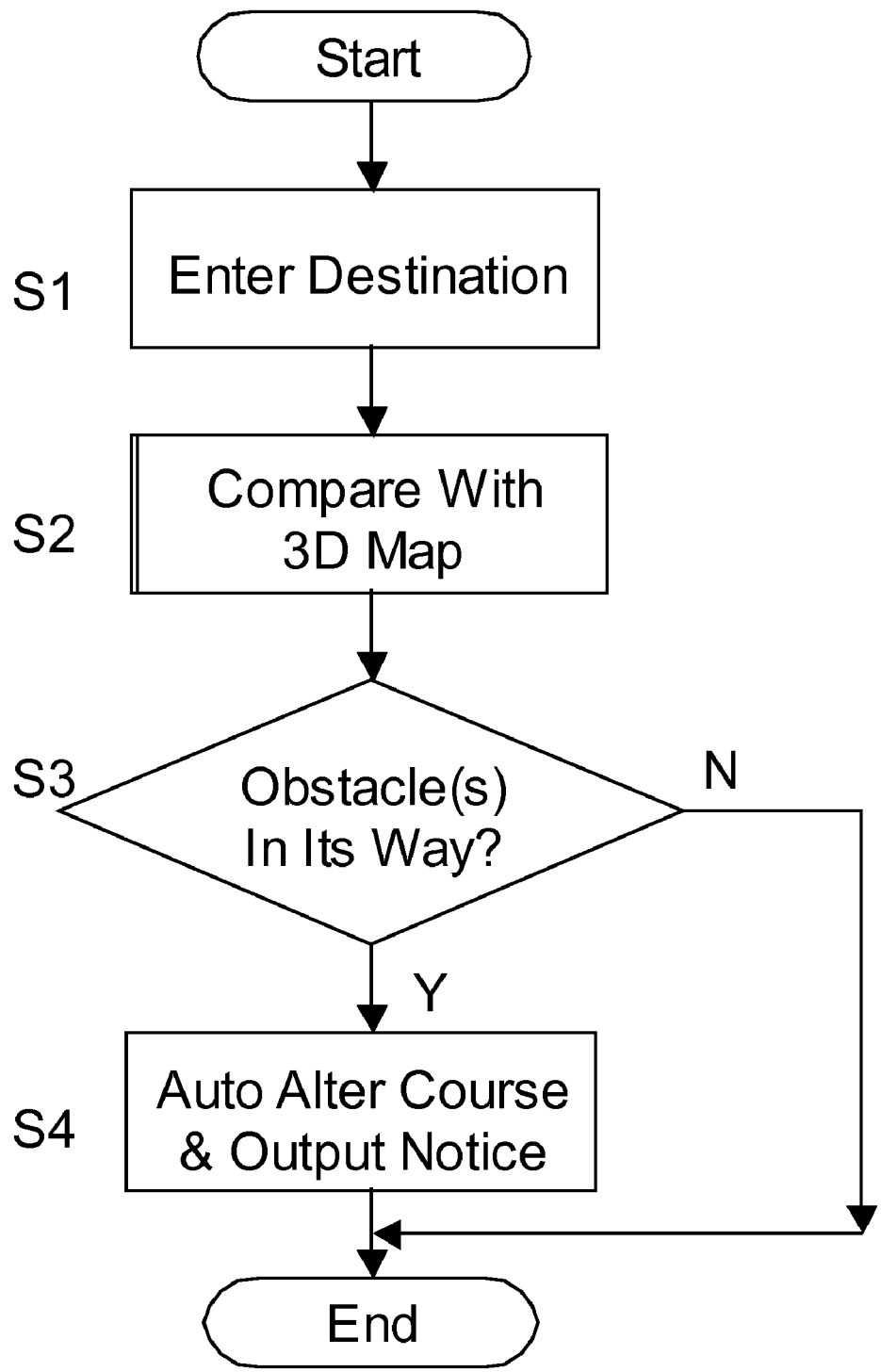
FIG. 5 is a flowchart illustrating an exemplary embodiment of the present invention.

FIG. 5 illustrates another method of Carrier 300 to avoid colliding with any objects during actual flight before such flight is initiated. The destination data which represents the destination of Carrier 300 is manually input by Input Device 210 (FIG. 1b) (S1). CPU 211 (FIG. 1b) calculates the course to the destination based on the destination data and compares with the three-dimensional data stored in Area 501 of RAM 206 (FIG. 2) (S2). If any of the objects stored in Area 501, which is in the path of Carrier 300, is higher than its navigation altitude (S3), CPU 211 calculates an alternative course to the destination and outputs a notice sign and/or sound which indicates that the course has been altered from Monitor 201 (FIG. 1b) and/or Speaker 204 (FIG. 1b) (S4).

Figure 6:
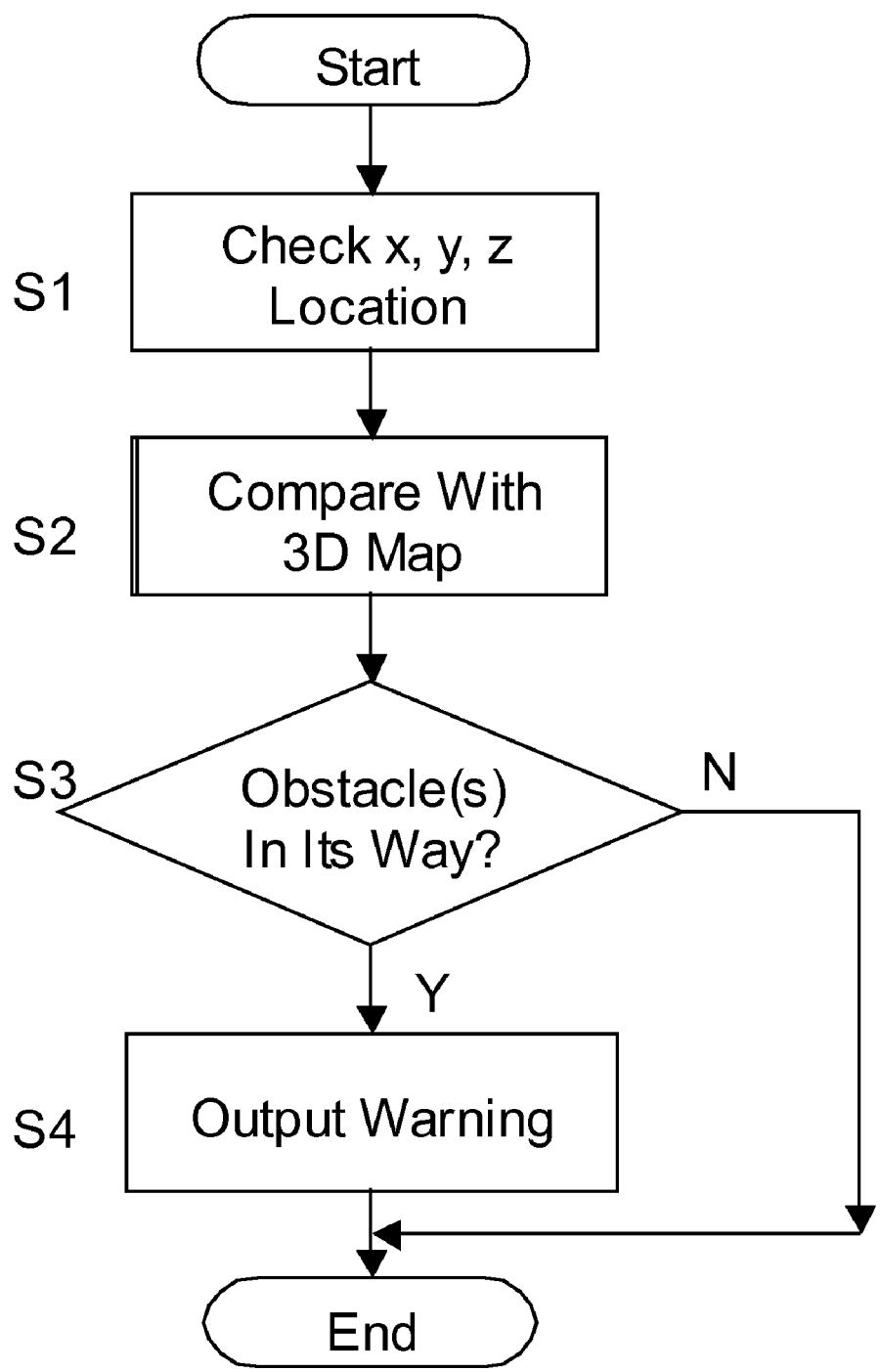
FIG. 6 is a flowchart illustrating an exemplary embodiment of the present invention.

FIG. 6 illustrates the method of Carrier 300 to avoid colliding with any objects during actual flight after such flight is initiated. CPU 211 (FIG. 1b) periodically checks the present location of Carrier 300 during flight by utilizing the navigation data received from GPS Navigation System 217 (FIG. 1b) via Data Bus 203 (FIG. 1b) (S1). Such navigation data is periodically compared with the three-dimensional data stored in Area 501 of RAM 206 (FIG. 2) (S2). If any of the objects stored in Area 501, which is in the path of Carrier 300, is higher than its navigation altitude (S3), CPU 211 outputs a warning sign and/or sound from Monitor 201 (FIG. 1b) and/or Speaker 204 (FIG. 1b) (S4).

Figure 7:
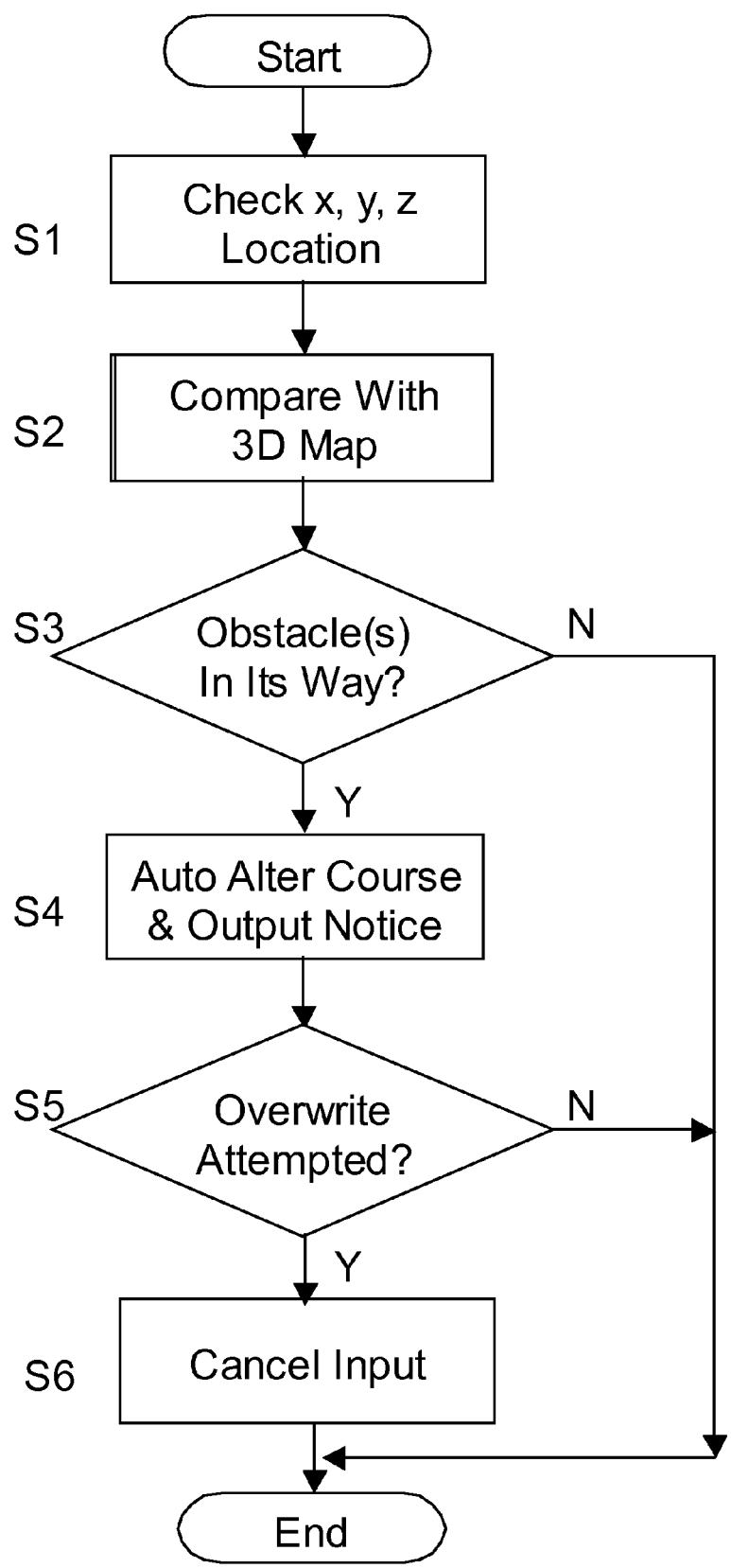
FIG. 7 is a flowchart illustrating an exemplary embodiment of the present invention.

FIG. 7 illustrates another method of Carrier 300 to avoid colliding with any objects during actual flight after such flight is initiated. CPU 211 (FIG. 1b) periodically checks the present location of Carrier 300 during flight by utilizing the navigation data received from GPS Navigation System 217 (FIG. 1b) vial Data Bus 203 (FIG. 1b) (S1). Such navigation data is periodically compared with the three-dimensional data stored in Area 501 of RAM 206 (FIG. 2) (S2). If any of the objects stored in Area 501, which is in the path of Carrier 300, is higher than its navigation altitude (S3), CPU 211 calculates an alternative course to the destination and outputs a notice sign and/or sound which indicates that the course has been altered from Monitor 201 (FIG. 1b) and/or Speaker 204 (FIG. 1b) (S4). If the alternative course is attempted to be overwritten by signal input from Input Device 210 (FIG. 1b) (S5), CPU 211 cancels such input signal (S6).

<<Remote Controlling System>>

FIG. 8a through FIG. 10 illustrate the remote controlling system of Carrier 300.

Figure 8A:
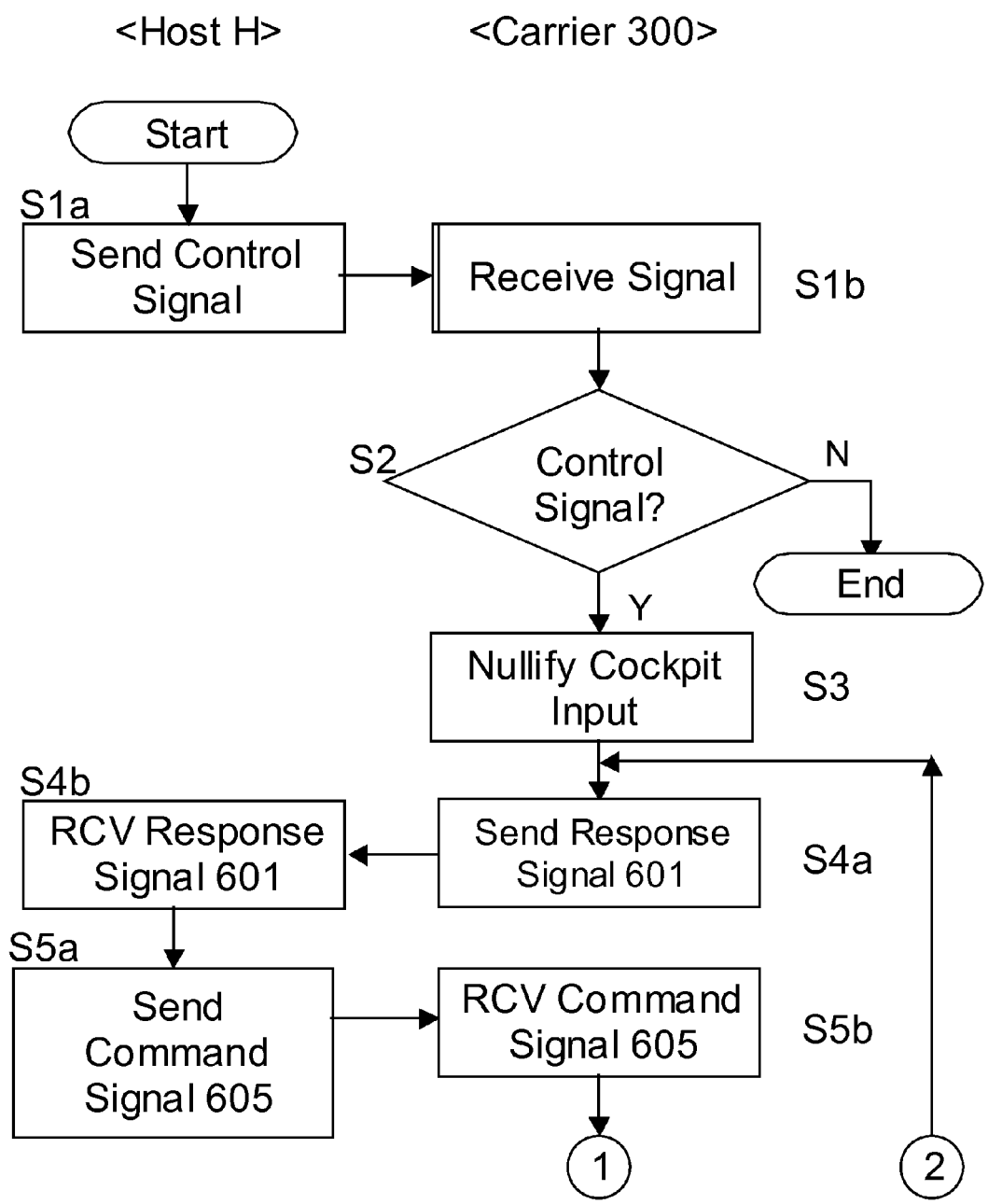
FIG. 8a is a flowchart illustrating an exemplary embodiment of the present invention.

As illustrated in FIG. 8a and FIG. 8b, Carrier 300 may be remotely controlled by Host H. Host H includes a computer system same or similar to Computer 200 (FIG. 1b) which enables to remotely control Carrier 300 by signals input from input device same or similar to Input Device 210 (FIG. 1b). When the remote controlling system is initiated, Host H which is located in a remote location sends a control signal to Carrier 300 in a wireless fashion (S1a). Carrier 300 periodically receives various types of signals via Antenna 212 (FIG. 1b). The received signal is processed (e.g., decompressed) by Signal Processor 208 (FIG. 1b) and is transferred to CPU 211 (FIG. 1b) via Data Bus 203 (FIG. 1b) (S1b). If CPU 211 determines that the received signal is a control signal produced by Host H (S2), all signals input from Input Device 210 (FIG. 1b) thereafter are blocked and nullified (S3). CPU 211 sends Response Signal 601 (S4a), which is received by Host H (S4b). Then Host H sends a command signal (S5a), which is received by Carrier 300 in the manner described in S1b above (S5b). CPU 211 operates Carrier 300 in compliance with Command Signal 605 received from Host H (S7). The sequence of S4a through S7 is repeated until a cancellation signal which indicates to deactivate the remote controlling system is included in Command Signal 605 (S6). Once the remote controlling system is deactivated, signals input from Input Device 210 (FIG. 1b) are valid thereafter and operation of Carrier 300 from its cockpit is resumed (S8).

Figure 9:
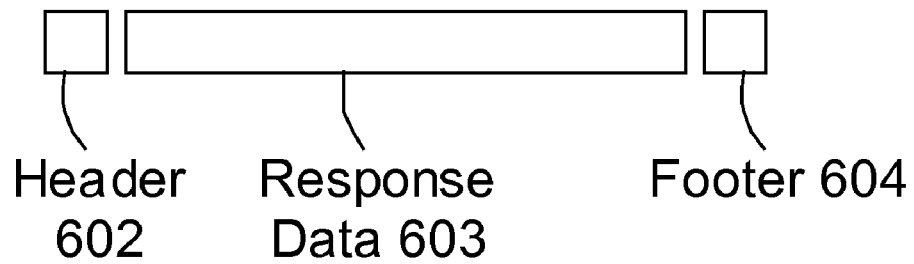
FIG. 9 is a simplified illustration illustrating an exemplary embodiment of the present invention.

FIG. 9 illustrates the basic structure of Response Signal 601 described in S4a and S4b in FIG. 8a. Response Signal 601 is composed of Header 602, Response Data 603, and Footer 604. Header 602 and Footer 604 indicate the beginning and end of Response Signal 601. Response Data 603 includes data regarding the present altitude, speed, direction, and angle of Carrier 300.

Figure 10:
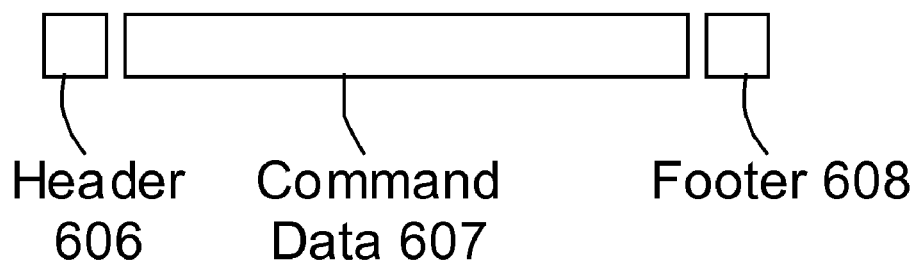
FIG. 10 is a simplified illustration illustrating an exemplary embodiment of the present invention.

FIG. 10 illustrates the basic structure of Command Signal 605 described in S5a and S5b in FIG. 8a. Command Signal 605 is composed of Header 606, Command Data 607, and Footer 608. Header 606 and Footer 608 indicate the beginning and end of Command Signal 605, respectively. Command Data 607 includes data regarding the renewed altitude, speed, direction, and angle of Carrier 300. As another embodiment, Command Data 607 may include the data regarding destination instead. The remote controlling system is cancelled if Command Data 607 includes a cancellation signal instead of data regarding renewed altitude, speed, direction, and angle of Carrier 300.

<<Emergency Landing System>>

Figure 12A:
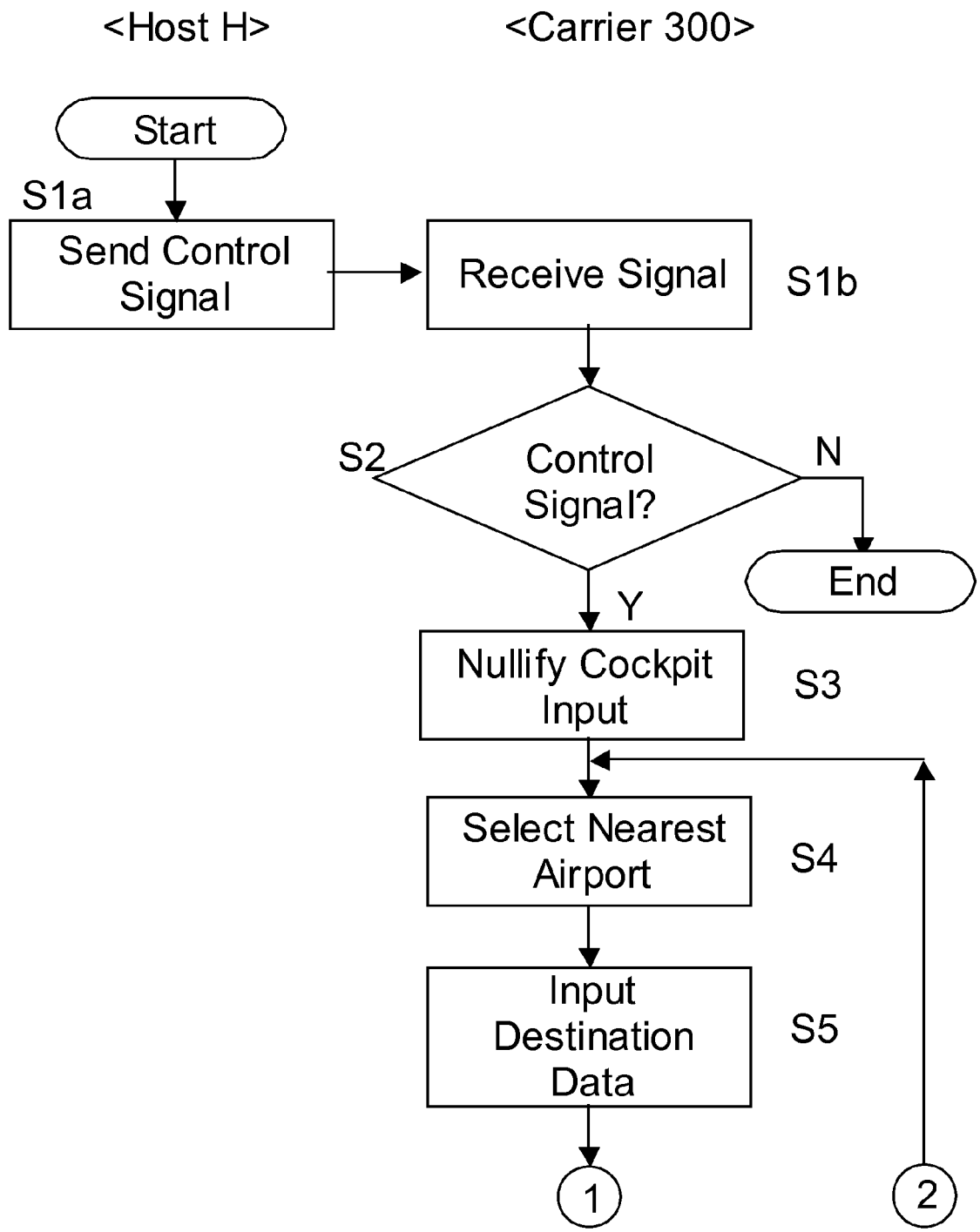
FIG. 12a is a flowchart illustrating an exemplary embodiment of the present invention.
Figure 12B:
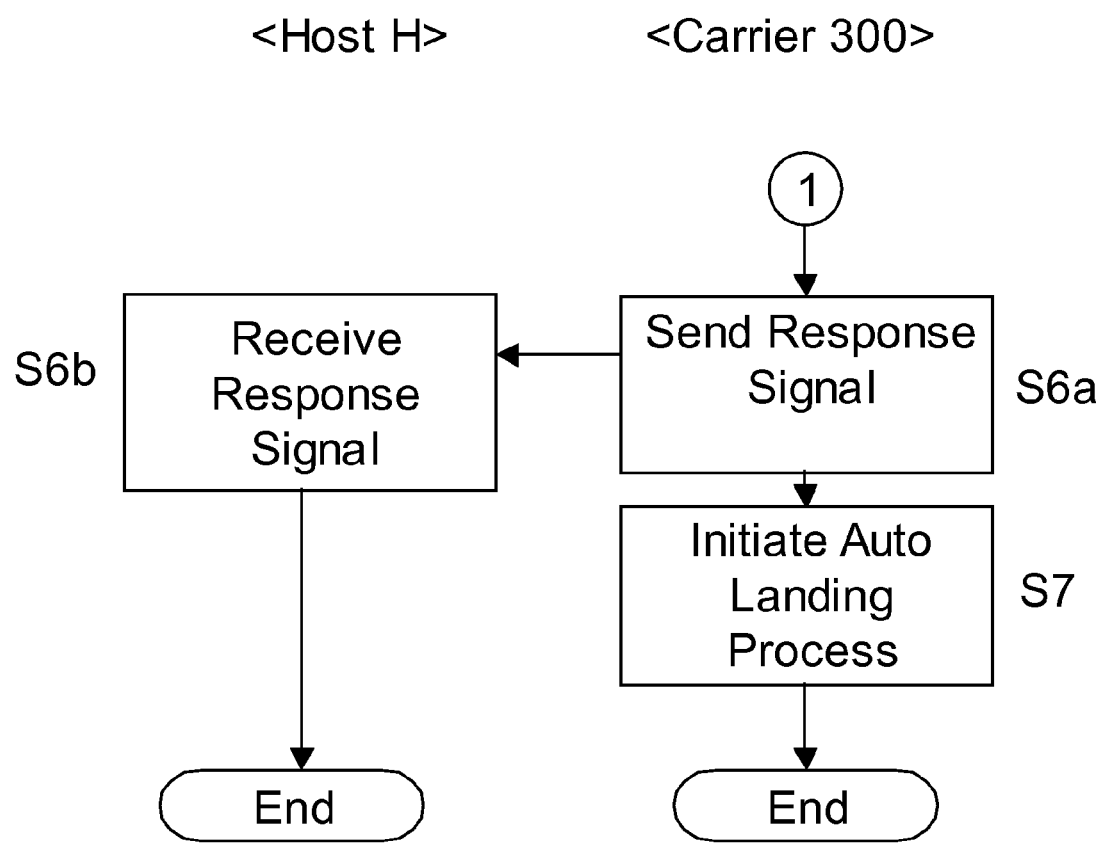
FIG. 12b is a flowchart illustrating an exemplary embodiment of the present invention.

FIG. 11 through FIG. 12b illustrate the emergency landing system of Carrier 300.

As illustrated in FIG. 11, RAM 206 includes Area 502. Area 502 stores a plurality of location data representing the locations of a plurality of airports. Here, the term airport includes any facility which is capable of landing airplanes, space shuttles, gliders, and any other carriers. In the present example, Location Data V represents the location of Airport #1, Location Data W represents the location of Airport #2, Location Data X represents the location of Airport #3, and Location Data Y represents the location of Airport #4. The plurality of location data are linked with three-dimensional map stored in Area 501 of RAM 206 (FIG. 2), therefore, these location data can be identified on the three-dimensional map stored in Area 501.

FIG. 12a and FIG. 12b illustrate the emergency landing system by utilizing the location data stored in Area 502 of RAM 206 (FIG. 11). Host H which is located in a remote location sends a control signal to Carrier 300 in a wireless fashion (S1a). Carrier 300 periodically receives various types of signals via Antenna 212 (FIG. 1b). The received signal is processed (e.g., decompressed) by Signal Processor 208 (FIG. 1b) and transferred to CPU 211 (FIG. 1b) via Data Bus 203 (FIG. 1b) (S1b). If CPU 211 determines that the received signal is a control signal produced by Host H (S2), all signals input from Input Device 210 (FIG. 1b) thereafter are blocked and nullified (S3). CPU 211 identifies the present location by utilizing GPS Navigation System 217 (FIG. 1b) and compares with the location data stored in Area 502 of RAM 206 (FIG. 11). CPU 211 selects the nearest airport and inputs the location data of the selected airport as the new destination (S5). Carrier 300 sends a response signal (S6a), which is received by Host H (S6b), and Carrier 300 initiates an automatic landing process to the location of the selected airport (S7). As another embodiment, the location data can be selected manually by utilizing Input Device 210 and render Input Device 210 remain activated only for that purposes, and select the nearest airport only when no airport was selected within a specified time. Or as another embodiment, Carrier 300 may select a predetermined location and initiate the automatic landing process thereto.

As another embodiment, the emergency landing system can be performed without involving Host H. This embodiment is not shown in any drawings. CPU 211 (FIG. 1b) periodically checks the signal from Input Device 210 (FIG. 1b). If an emergency signal is input from Input Device 210 which indicates that Carrier 300 must be landed at the nearest airport, all signals input from Input Device 210 (FIG. 1b) thereafter are blocked and nullified. CPU 211 identifies the present location by utilizing GPS Navigation System 217 (FIG. 1b) and compares with the location data stored in Area 502 of RAM 206 (FIG. 11). CPU 211 selects the nearest airport and inputs the location data of the selected airport as the new destination and initiates an automatic landing process to the location of the selected airport. As another embodiment, the location data can be selected manually by utilizing Input Device 210 and render Input Device 210 remain activated only for that purposes, and select the nearest airport only when no airport was selected within a specified time. Or as another embodiment, Carrier 300 may select a predetermined location and initiate the automatic landing process thereto.

<<Connection Between Host H And Carrier 300>>

Figure 13:
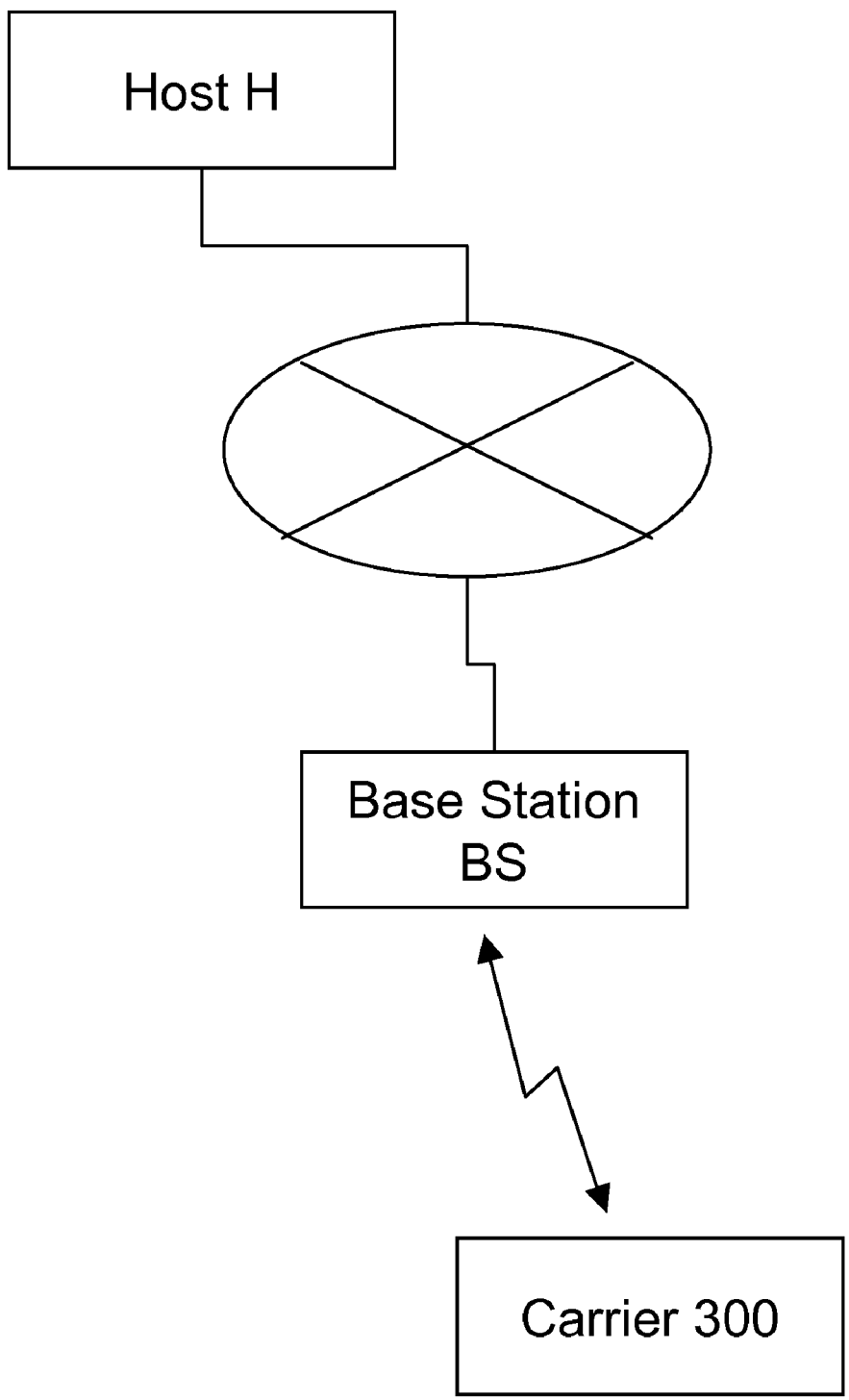
FIG. 13 is a simplified illustration illustrating an exemplary embodiment of the present invention.

FIG. 13 illustrates the first embodiment of the connection between Host H and Carrier 300. As described in the present drawing, Host H and Carrier 300 are connected via Network NT, such as the Internet and Base Station BS. The data sent from Host H is transferred to Network NT, which forwards the data to Base Station BS. Base Station BS transfers the data to Carrier 300 in a wireless fashion. The data sent from Carrier 300 is transferred to Base Station BS in a wireless fashion, which forwards the data to Network NT. Network NT transfers the data to Host H.

Figure 14:
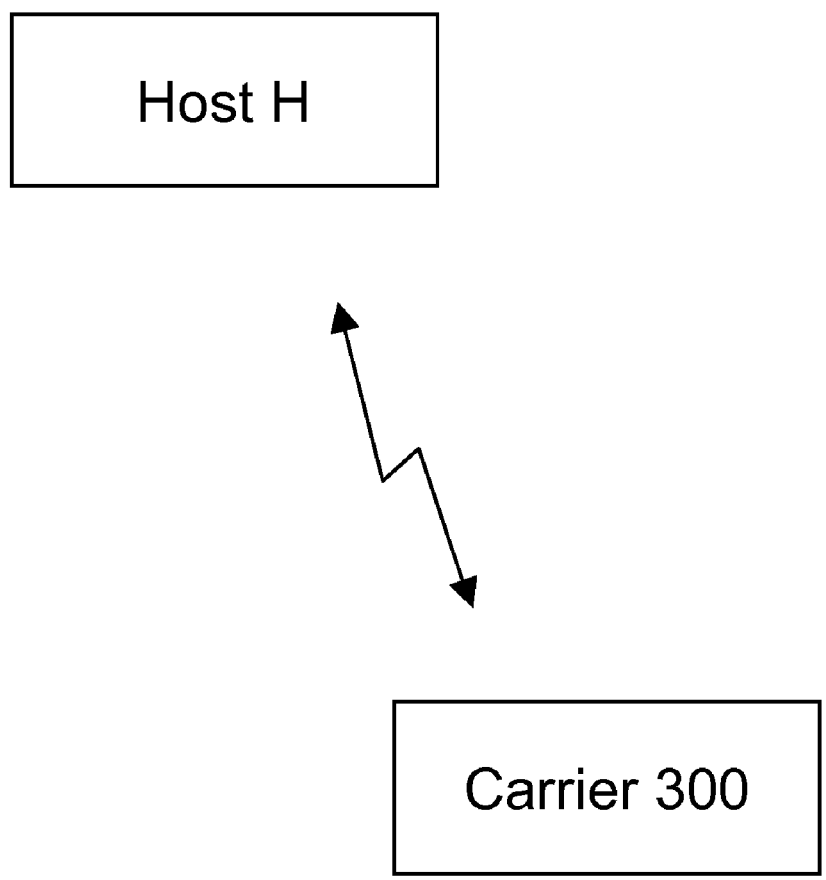
FIG. 14 is a simplified illustration illustrating an exemplary embodiment of the present invention.

FIG. 14 illustrates the second embodiment of the connection between Host H and Carrier 300. As described in the present drawing, Host H and Carrier 300 are connected directly. The data sent from Host H is transferred directly to Carrier 300 in a wireless fashion, and vice versa.

Figure 15:
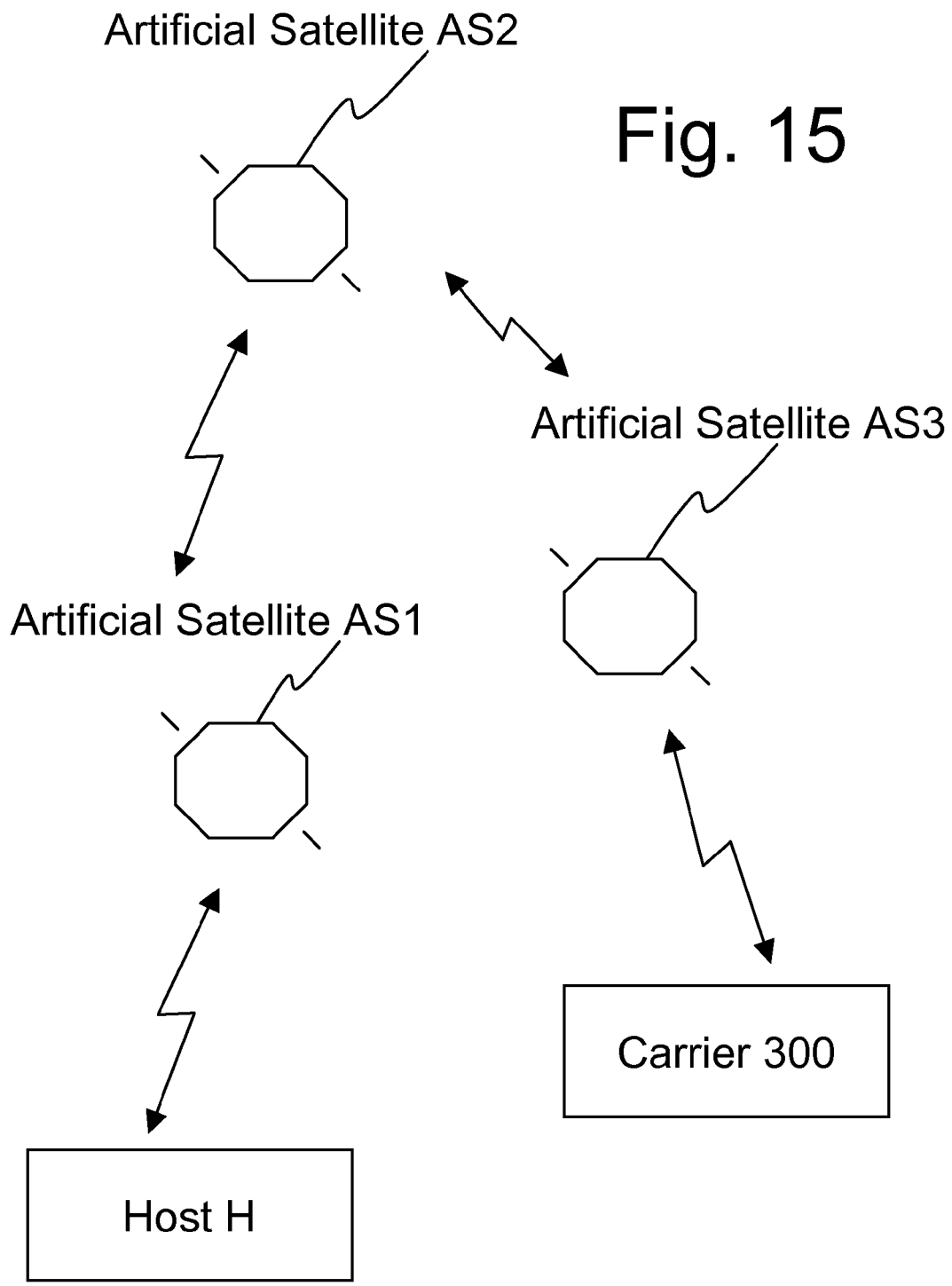
FIG. 15 is a simplified illustration illustrating an exemplary embodiment of the present invention.

FIG. 15 illustrates the third embodiment of the connection between Host H and Carrier 300. As described in the present drawing, Host H and Carrier 300 are connected via three artificial satellites, i.e., Artificial Satellite AS1, Artificial Satellite AS2, and Artificial Satellite AS3. The data sent from Host H is transferred to Artificial Satellite AS1 in a wireless fashion, which forwards the data to Artificial Satellite AS2 in a wireless fashion. Artificial Satellite AS2 forwards the data to Artificial Satellite AS3 in a wireless fashion. Artificial Satellite AS3 forwards the data to Carrier 300 in a wireless fashion. The data sent from Carrier 300 is transferred to Artificial Satellite AS3 in a wireless fashion, which forwards the data to Artificial Satellite AS2 in a wireless fashion. Artificial Satellite AS2 forwards the data to Artificial Satellite AS1 in a wireless fashion. Artificial Satellite AS1 forwards the data to Host H in a wireless fashion.

<<3D Map Data Updating Function>>

FIGS. 16 through 30 illustrate the 3D map data updating function which updates the 3D map data stored in Carrier 300.

Figure 16:
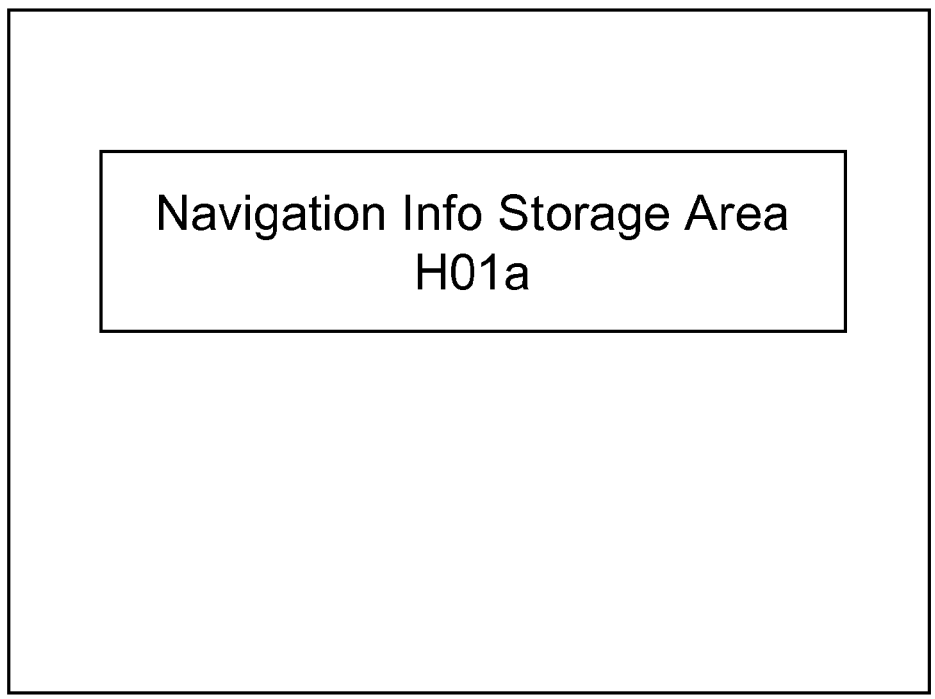
FIG. 16 is a block diagram illustrating an exemplary embodiment of the present invention.

FIG. 16 illustrates the storage area included in Host H. As described in the present drawing, Host H includes Navigation Information Storage Area H01a of which the data and the software program stored therein are described in FIG. 17.

Figure 17:
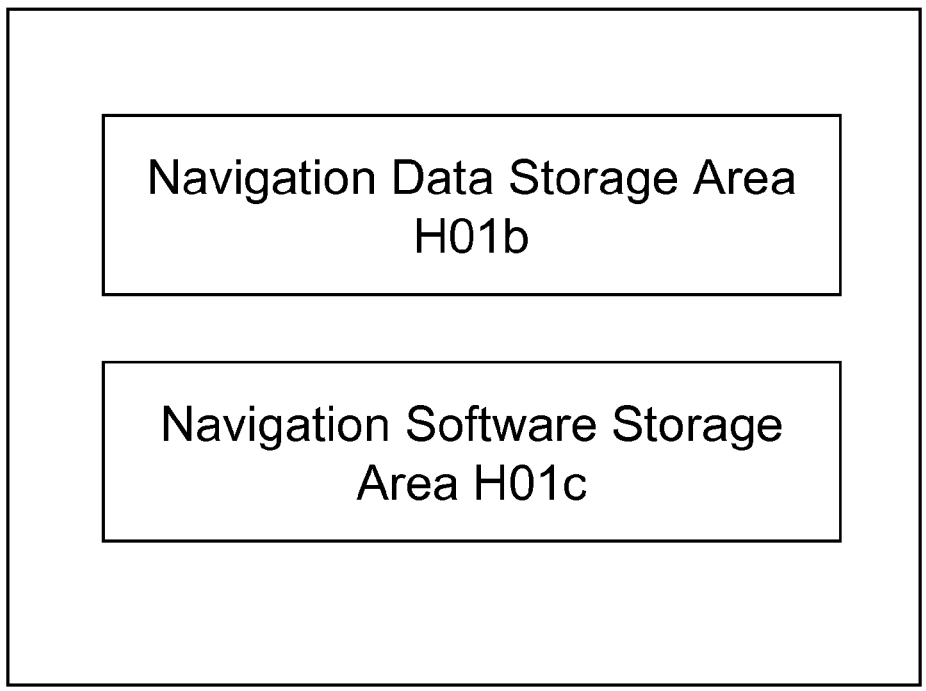
FIG. 17 is a block diagram illustrating an exemplary embodiment of the present invention.

FIG. 17 illustrates the storage areas included in Navigation Information Storage Area H01a (FIG. 16). As described in the present drawing, Navigation Information Storage Area H01a includes Navigation Data Storage Area H01b and Navigation Software Storage Area H01c. Navigation Data Storage Area H01b stores the data necessary to implement the present function on the side of Host H, such as the ones described in FIGS. 18 through 21. Navigation Software Storage Area H01c stores the software program necessary to implement the present function on the side of Host H, such as the one described in FIG. 22.

Figure 18:
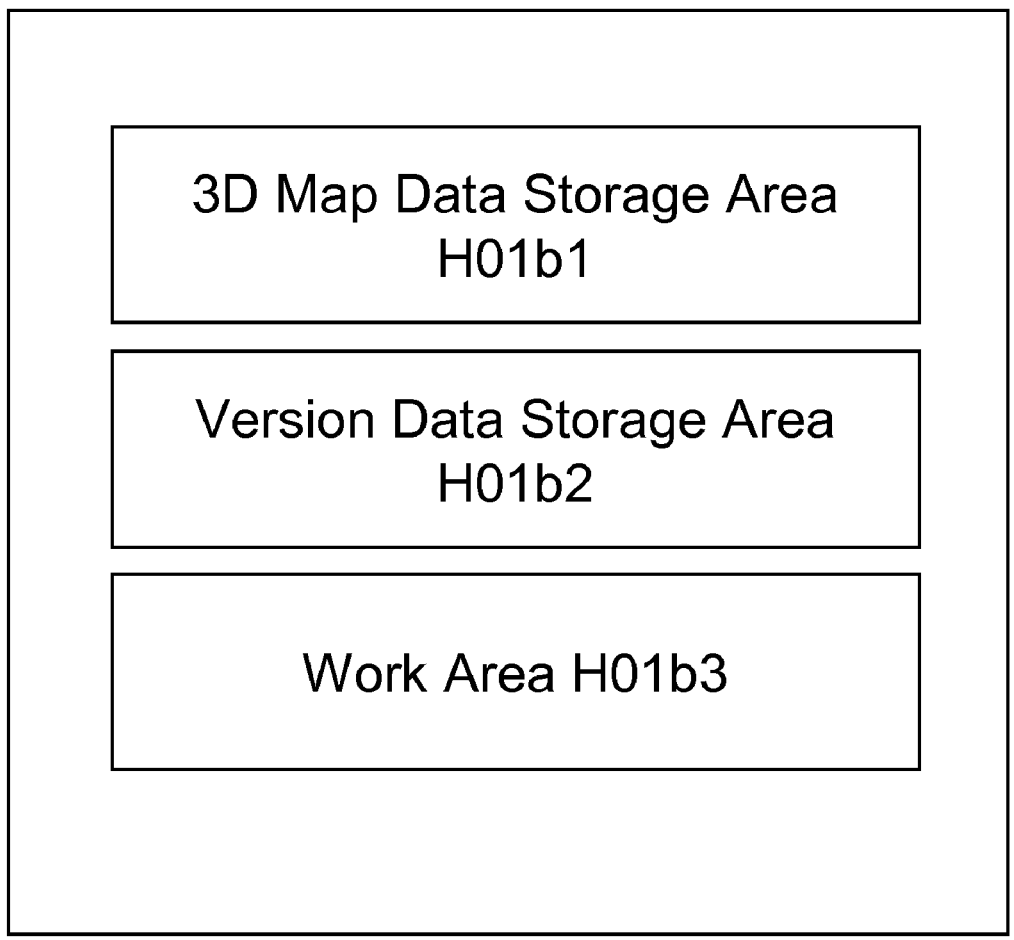
FIG. 18 is a block diagram illustrating an exemplary embodiment of the present invention.

FIG. 18 illustrates the storage areas included in Navigation Data Storage Area H01b (FIG. 17). As described in the present drawing, Navigation Data Storage Area H01b includes 3D Map Data Storage Area H01b1, Version Data Storage Area H01b2, and Work Area H01b3. 3D Map Data Storage Area H01b1 stores the data described in FIGS. 19 and 20. 3D Map Data Storage Area H01b1 stores the same or similar data stored in Area 501 (FIG. 2), which stores a three-dimensional map of the surface of the earth in a digital format. All of the objects stored as the part of the three-dimensional (3D) map reflect the actual objects exist in the real world, such as mountains, buildings, bridges, islands and other objects which have height of more than one foot above sea level. These objects are stored therein in three-dimensional format and height, width, and depth of each object are utilized for performing the present invention. Version Data Storage Area H01b2 stores the data described in FIG. 21. Work Area H01b3 is utilized as a work area to perform calculation and temporarily store data.

Figure 19:
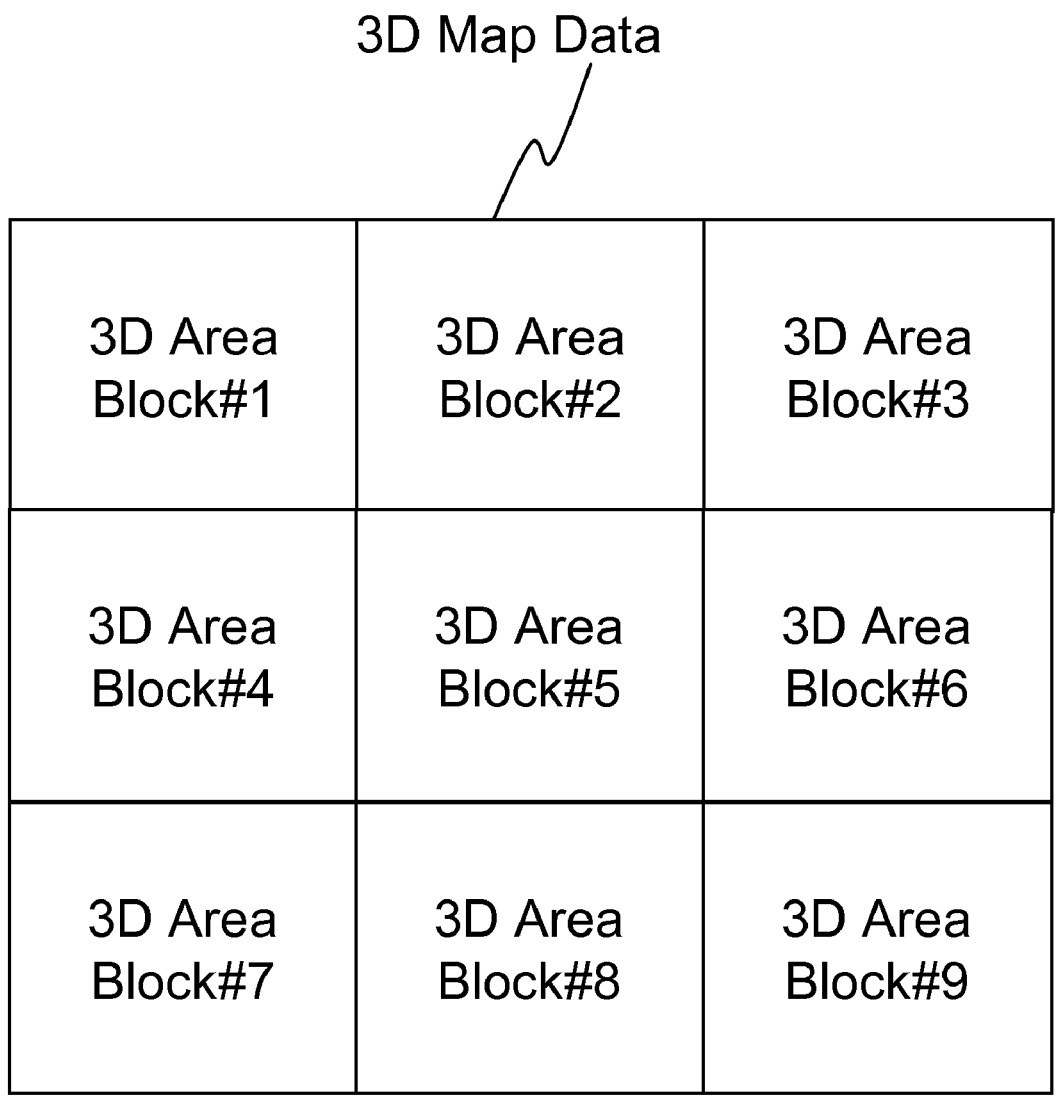
FIG. 19 is a simplified illustration illustrating an exemplary embodiment of the present invention.

FIG. 19 illustrates the 3D map data stored in Navigation Data Storage Area H01b (FIG. 18). As described in the present drawing, the 3D map data is composed of nine blocks, i.e., 3D Area Block#1, 3D Area Block#2, 3D Area Block#3, 3D Area Block#4, 3D Area Block#5, 3D Area Block#6, 3D Area Block#7, 3D Area Block#8, and 3D Area Block#9.

FIG. 20 illustrates the data stored in 3D Map Data Storage Area H01b1 (FIG. 18). As described in the present drawing, 3D Map Data Storage Area H01b1 comprises two columns, i.e., '3D Area ID' and '3D Area Data'. Column '3D Area ID' stores the 3D area IDs, and each 3D area ID is an identification of the corresponding 3D area data stored in column '3D Area Data'. Column '3D Area Data' stores the 3D area data, and each 3D area data represents the three-dimensional data of the corresponding 3D area block described in the previous drawing figure. In the example described in the present drawing, 3D Map Data Storage Area H01b1 stores the following data: the 3D area ID '3D Area#1' and the corresponding 3D area data '3D Area Data#1'; the 3D area ID '3D Area#2' and the corresponding 3D area data '3D Area Data#2'; the 3D area ID '3D Area#3' and the corresponding 3D area data '3D Area Data#3'; the 3D area ID '3D Area#4' and the corresponding 3D area data '3D Area Data#4'; the 3D area ID '3D Area#5' and the corresponding 3D area data '3D Area Data#5'; the 3D area ID '3D Area#6' and the corresponding 3D area data '3D Area Data#6'; the 3D area ID '3D Area#7' and the corresponding 3D area data '3D Area Data#7'; the 3D area ID '3D Area#8' and the corresponding 3D area data '3D Area Data#8'; and the 3D area ID '3D Area#9' and the corresponding 3D area data '3D Area Data#9'.

FIG. 21 illustrates the data stored in Version Data Storage Area H01b2 (FIG. 18). As described in the present drawing, Version Data Storage Area H01b2 comprises two columns, i.e., '3D Area ID' and 'Version Data'. Column '3D Area ID' stores the data described in FIG. 20. Column 'Version Data' stores the version data, and each version data represents the version of the 3D area data stored in 3D Map Data Storage Area H01b1 (FIG. 20) of the corresponding 3D area ID. In the example described in the present drawing, Version Data Storage Area H01b2 stores the following data: the 3D area ID '3D Area#1' and the corresponding version data 'Version 1'; the 3D area ID '3D Area#2' and the corresponding version data 'Version 1'; the 3D area ID '3D Area#3' and the corresponding version data 'Version 1'; the 3D area ID '3D Area#4' and the corresponding version data 'Version 1'; the 3D area ID '3D Area#5' and the corresponding version data 'Version 2'; the 3D area ID '3D Area#6' and the corresponding version data 'Version 1'; the 3D area ID '3D Area#7' and the corresponding version data 'Version 1'; the 3D area ID '3D Area#8' and the corresponding version data 'Version 1'; and the 3D area ID '3D Area#9' and the corresponding version data 'Version 1'. In the present example, the version data of the 3D area ID '3D Area#5' is 'Version 2' whereas the other version data of the 3D area IDs are 'Version 1'. This means that the 3D area data corresponding to the 3D area ID '3D Area#5', i.e., '3D Area Data#5' stored in 3D Map Data Storage Area H01b1 (FIG. 20) should be updated.

Figure 22:
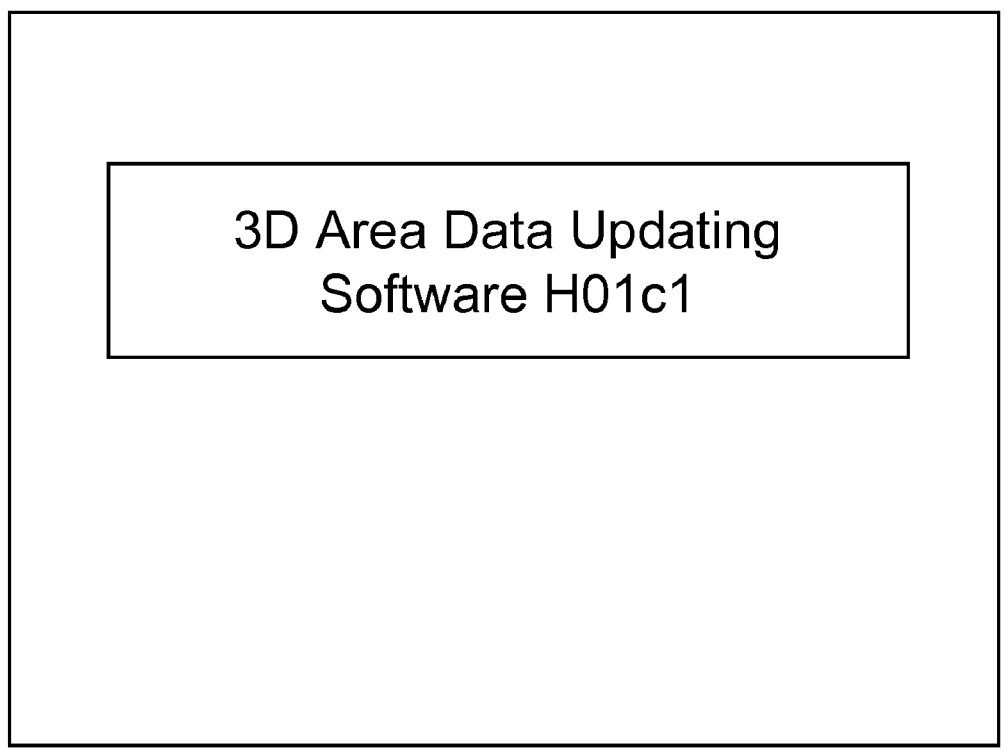
FIG. 22 is a block diagram illustrating an exemplary embodiment of the present invention.

FIG. 22 illustrates the software programs stored in Navigation Software Storage Area H01c (FIG. 17). As described in the present drawing, Navigation Software Storage Area H01c stores 3D Area Data Updating Software H01c1. 3D Area Data Updating Software H01c1 is the software program described in FIG. 30.

Figure 23:
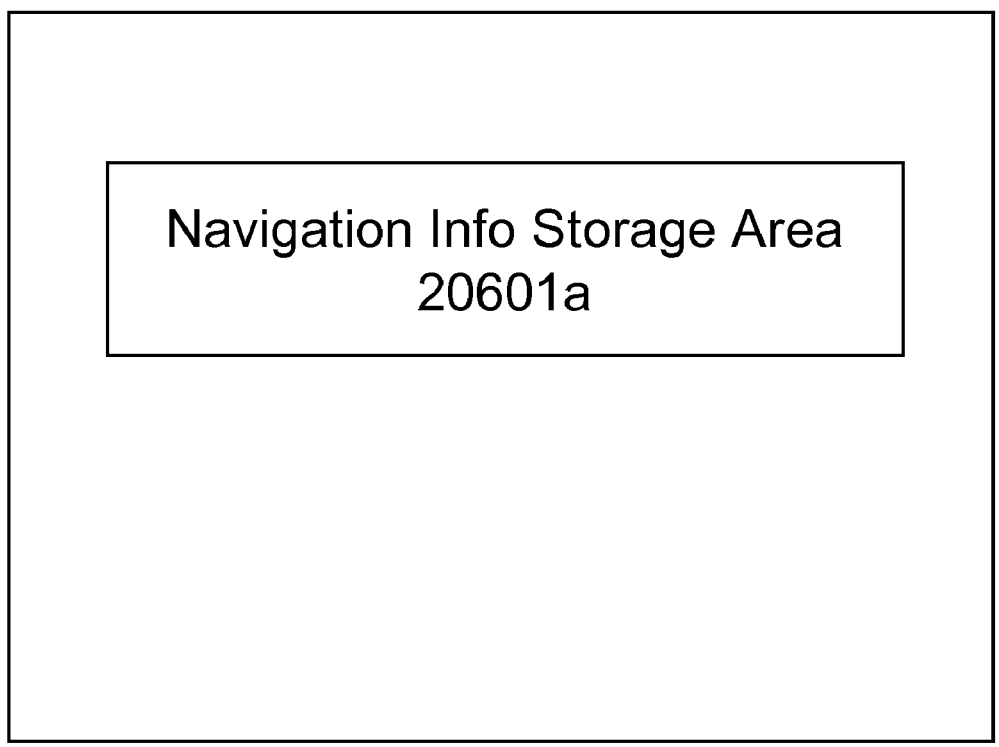
FIG. 23 is a block diagram illustrating an exemplary embodiment of the present invention.

FIG. 23 illustrates the storage area included in RAM 206 (FIG. 2) of Carrier 300. As described in the present drawing, RAM 206 includes Navigation Information Storage Area 20601a of which the data and the software program stored therein are described in FIG. 24.

Figure 24:
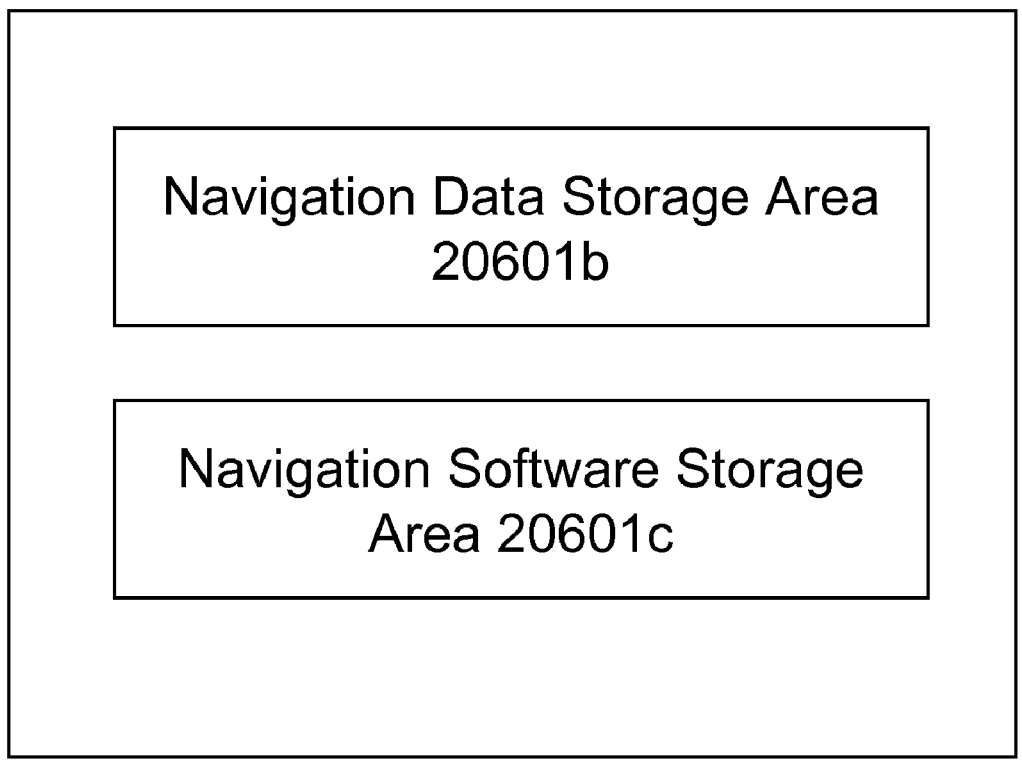
FIG. 24 is a block diagram illustrating an exemplary embodiment of the present invention.

FIG. 24 illustrates the storage areas included in Navigation Information Storage Area 20601a (FIG. 23). As described in the present drawing, Navigation Information Storage Area 20601a includes Navigation Data Storage Area 20601b and Navigation Software Storage Area 20601c. Navigation Data Storage Area 20601b stores the data necessary to implement the present function on the side of Carrier 300, such as the ones described in FIGS. 25 through 28. Navigation Software Storage Area 20601c stores the software program necessary to implement the present function on the side of Carrier 300, such as the one described in FIG. 29.

Figure 25:
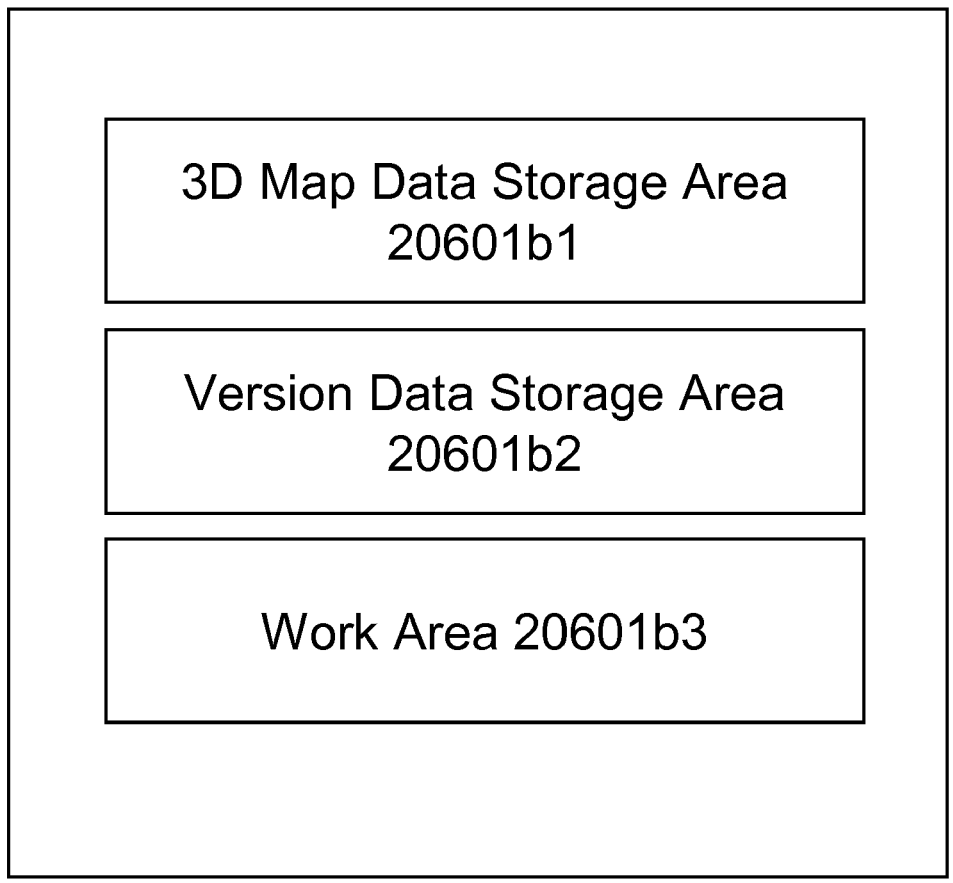
FIG. 25 is a block diagram illustrating an exemplary embodiment of the present invention.

FIG. 25 illustrates the storage areas included in Navigation Data Storage Area 20601b (FIG. 24). As described in the present drawing, Navigation Data Storage Area 20601b includes 3D Map Data Storage Area 20601b1, Version Data Storage Area 20601b2, and Work Area 20601b3. 3D Map Data Storage Area 20601b1 stores the data described in FIGS. 26 and 27. 3D Map Data Storage Area 20601b1 stores the same or similar data stored in Area 501 (FIG. 2), which stores a three-dimensional map of the surface of the earth in a digital format. All of the objects stored as the part of the three-dimensional (3D) map reflect the actual objects exist in the real world, such as mountains, buildings, bridges, islands and other objects which have height of more than one foot above sea level. These objects are stored therein in three-dimensional format and height, width, and depth of each object are utilized for performing the present invention. Version Data Storage Area 20601b2 stores the data described in FIG. 28. Work Area 20601b3 is utilized as a work area to perform calculation and temporarily store data.

Figure 26:
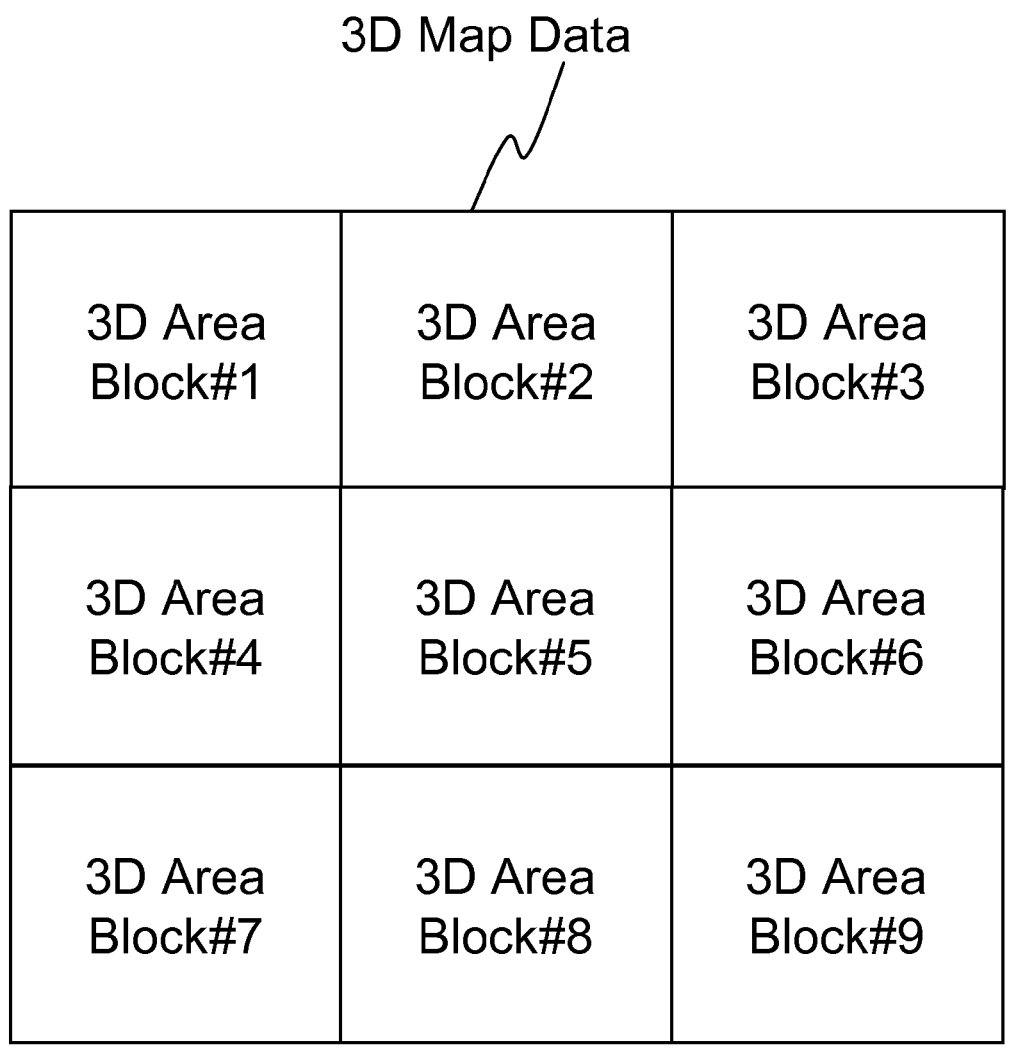
FIG. 26 is a simplified illustration illustrating an exemplary embodiment of the present invention.

FIG. 26 illustrates the 3D map data stored in Navigation Data Storage Area 20601b (FIG. 25). As described in the present drawing, the 3D map data is composed of nine blocks, i.e., 3D Area Block#1, 3D Area Block#2, 3D Area Block#3, 3D Area Block#4, 3D Area Block#5, 3D Area Block#6, 3D Area Block#7, 3D Area Block#8, and 3D Area Block#9.

FIG. 27 illustrates the data stored in 3D Map Data Storage Area 20601b1 (FIG. 25). As described in the present drawing, 3D Map Data Storage Area 20601b1 comprises two columns, i.e., '3D Area ID' and '3D Area Data'. Column '3D Area ID' stores the 3D area IDs, and each 3D area ID is an identification of the corresponding 3D area data stored in column '3D Area Data'. Column '3D Area Data' stores the 3D area data, and each 3D area data represents the three-dimensional data of the corresponding 3D area block described in the previous drawing figure. In the example described in the present drawing, 3D Map Data Storage Area 20601b1 stores the following data: the 3D area ID '3D Area#1' and the corresponding 3D area data '3D Area Data#1'; the 3D area ID '3D Area#2' and the corresponding 3D area data '3D Area Data#2'; the 3D area ID '3D Area#3' and the corresponding 3D area data '3D Area Data#3'; the 3D area ID '3D Area#4' and the corresponding 3D area data '3D Area Data#4'; the 3D area ID '3D Area#5' and the corresponding 3D area data '3D Area Data#5'; the 3D area ID '3D Area#6' and the corresponding 3D area data '3D Area Data#6'; the 3D area ID '3D Area#7' and the corresponding 3D area data '3D Area Data#7'; the 3D area ID '3D Area#8' and the corresponding 3D area data '3D Area Data#8'; and the 3D area ID '3D Area#9' and the corresponding 3D area data '3D Area Data#9'.

FIG. 28 illustrates the data stored in Version Data Storage Area 20601b2 (FIG. 25). As described in the present drawing, Version Data Storage Area 20601b2 comprises two columns, i.e., '3D Area ID' and 'Version Data'. Column '3D Area ID' stores the data described in FIG. 27. Column 'Version Data' stores the version data, and each version data represents the version of the 3D area data stored in 3D Map Data Storage Area 20601b1 (FIG. 27) of the corresponding 3D area ID. In the example described in the present drawing, Version Data Storage Area 20601b2 stores the following data: the 3D area ID '3D Area#1' and the corresponding version data 'Version 1'; the 3D area ID '3D Area#2' and the corresponding version data 'Version 1'; the 3D area ID '3D Area#3' and the corresponding version data 'Version 1'; the 3D area ID '3D Area#4' and the corresponding version data 'Version 1'; the 3D area ID '3D Area#5' and the corresponding version data 'Version 2'; the 3D area ID '3D Area#6' and the corresponding version data 'Version 1'; the 3D area ID '3D Area#7' and the corresponding version data 'Version 1'; the 3D area ID '3D Area#8' and the corresponding version data 'Version 1'; and the 3D area ID '3D Area#9' and the corresponding version data 'Version 1'. In the present example, the version data of the 3D area ID '3D Area#5' is 'Version 2' whereas the other version data of the 3D area IDs are 'Version 1'. This means that the 3D area data corresponding to the 3D area ID '3D Area#5', i.e., '3D Area Data#5' stored in 3D Map Data Storage Area 20601b1 (FIG. 27) should be updated.

Figure 29:
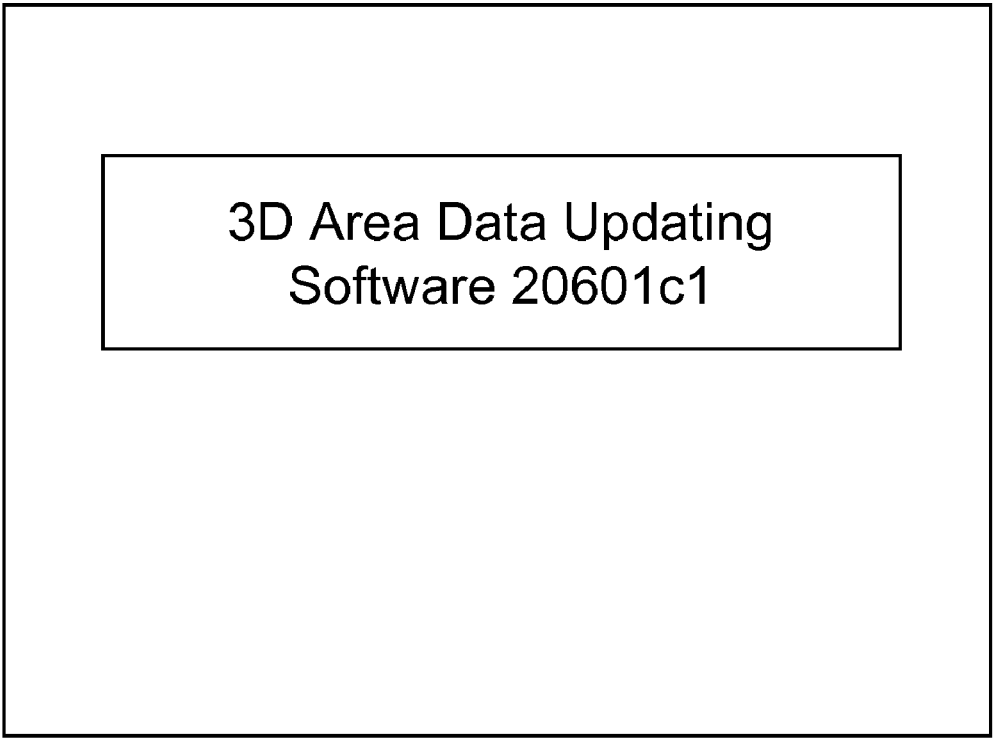
FIG. 29 is a block diagram illustrating an exemplary embodiment of the present invention.

FIG. 29 illustrates the software programs stored in Navigation Software Storage Area 20601c (FIG. 24). As described in the present drawing, Navigation Software Storage Area 20601c stores 3D Area Data Updating Software 20601c1. 3D Area Data Updating Software 20601c1 is the software program described in FIG. 30.

Figure 30:
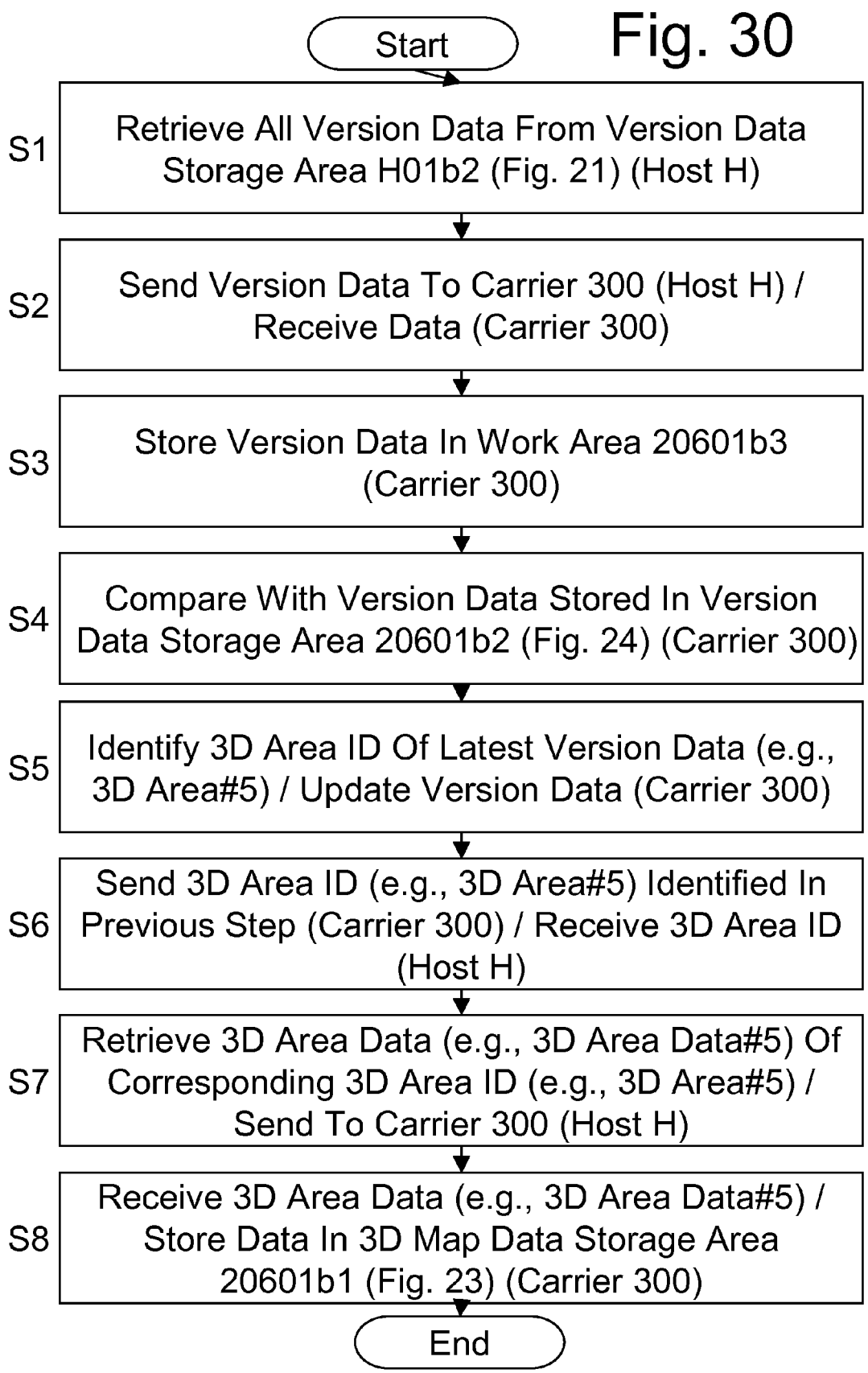
FIG. 30 is a flowchart illustrating an exemplary embodiment of the present invention.

FIG. 30 illustrates 3D Area Data Updating Software H01c1 (FIG. 22) of Host H (FIG. 429) and 3D Area Data Updating Software 20601c1 (FIG. 29) of Carrier 300, which update the 3D area data stored in 3D Map Data Storage Area 20601b1 (FIG. 23). Referring to the present drawing, Host H retrieves all version data from Version Data Storage Area H01b2 (FIG. 21) (S1). Host H sends the version data retrieved in the previous step, which are received by Carrier 300 (S2). CPU 211 (FIG. 1b) of Carrier 300 stores the version data in Work Area 20601b3 (FIG. 25) (S3). CPU 211 compares the version data stored in the previous step with the version data stored in Version Data Storage Area 20601b2 (FIG. 24) (S4). CPU 211 identifies the 3D area ID of the latest version data in Version Data Storage Area 20601b2 (FIG. 24) (e.g., 3D Area#5) and updates the version data thereof (S5). CPU 211 sends the 3D area ID (e.g., 3D Area#5) identified in the previous step, which is received by Host H (S6). Host H retrieves the 3D area data (e.g., 3D Area Data#5) of the corresponding 3D area ID (e.g., 3D Area#5) from 3D Map Data Storage Area H01b1 (FIG. 20), and sends the data To Carrier 300 (S7). CPU 211 of Carrier 300 receives the 3D area data (e.g., 3D Area Data#5), and stores the data in 3D Map Data Storage Area 20601b1 (FIG. 23) (S8).

<<3D Map Data Updating Function—Summary>>

A carrier comprising a map data storage means, wherein said map data storage means stores a map data comprising a plurality of area data, said map data stores the data regarding a plurality of objects which reflect the real world, one or more of said plurality of area data are updated to the latest version, a destination data representing the destination of said carrier is input to said carrier, said carrier identifies a guiding-to-the-destination path which represents the path to the destination indicated by said destination data, and compares said guiding-to-the-destination path with said plurality of area data, and said carrier outputs a warning sign if an obstacle exists within said guiding-to-the-destination path of said carrier.

<<Auto Collision Avoiding Function—Other Embodiments>>

Figure 31:
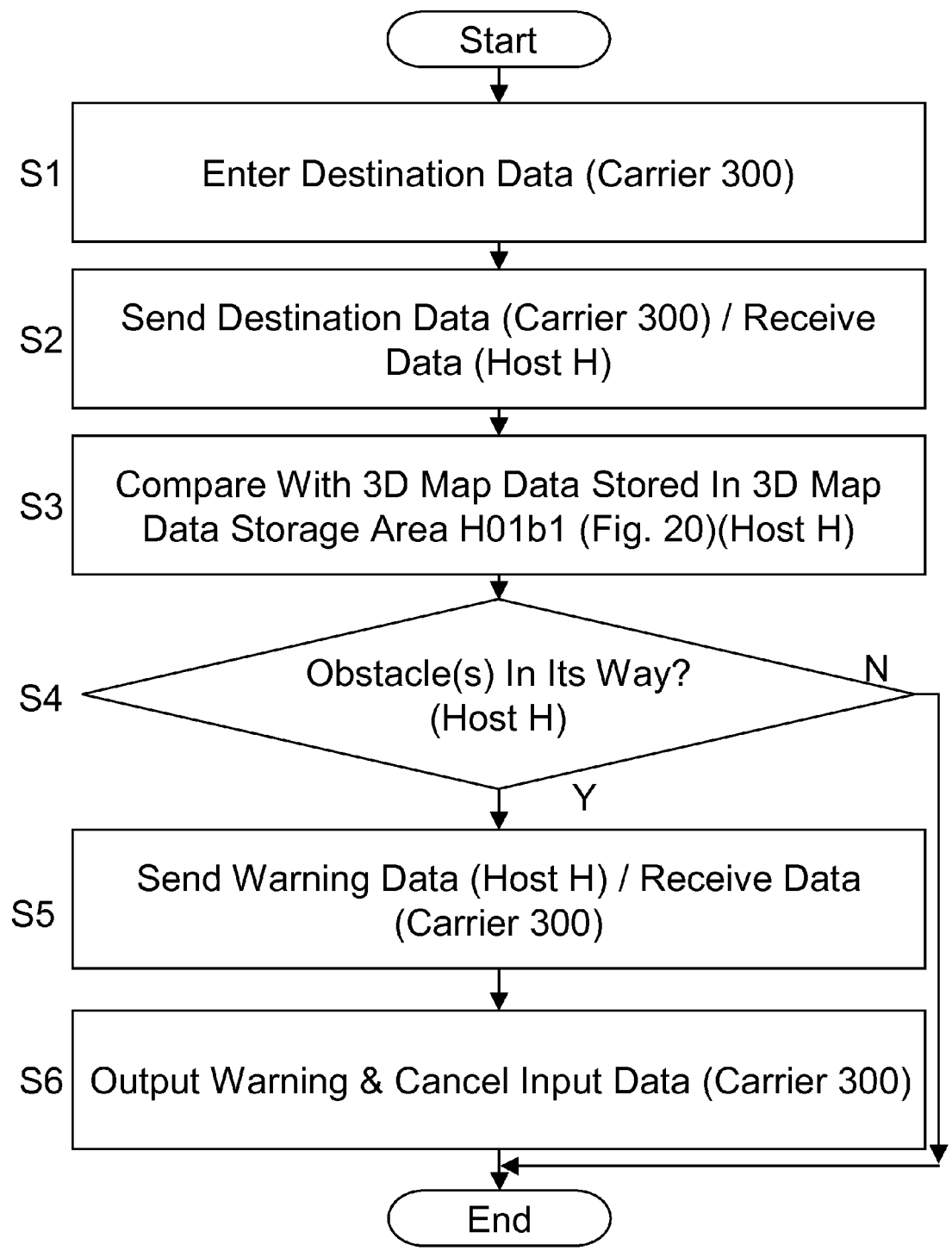
FIG. 31 is a flowchart illustrating an exemplary embodiment of the present invention.

FIG. 31 illustrates another embodiment of the auto collision avoiding function described in FIG. 4 to avoid colliding with any object during actual flight before such flight is initiated, wherein Host H plays the major role in performing the present function. Referring to the present drawing, a destination data is input via Input Device 210 (FIG. 1b) of Carrier 300 (S1). Here, the destination data indications the destination of Carrier 300 in (x, y, z) format. CPU 211 of Carrier 300 sends the destination data, which is received by Host H (S2). Host H calculates the course to the destination based on the destination data and compares the destination data with the 3D map data stored in 3D Map Data Storage Area H01b1 (FIG. 20) (S3). If any of the objects stored in 3D Map Data Storage Area H01b1, which is in the path of Carrier 300, is higher than its navigation altitude (S4), Host H sends a warning data, which is received by Carrier 300 (S5). Here, the warning data is the data indicating that one or more of obstacles are in its way. CPU 211 outputs a warning sign and/or sound from Monitor 201 (FIG. 1b) and/or Speaker 204 (FIG. 1b) and cancels the data input from Input Device 210 in S1 (S6).

Figure 32:
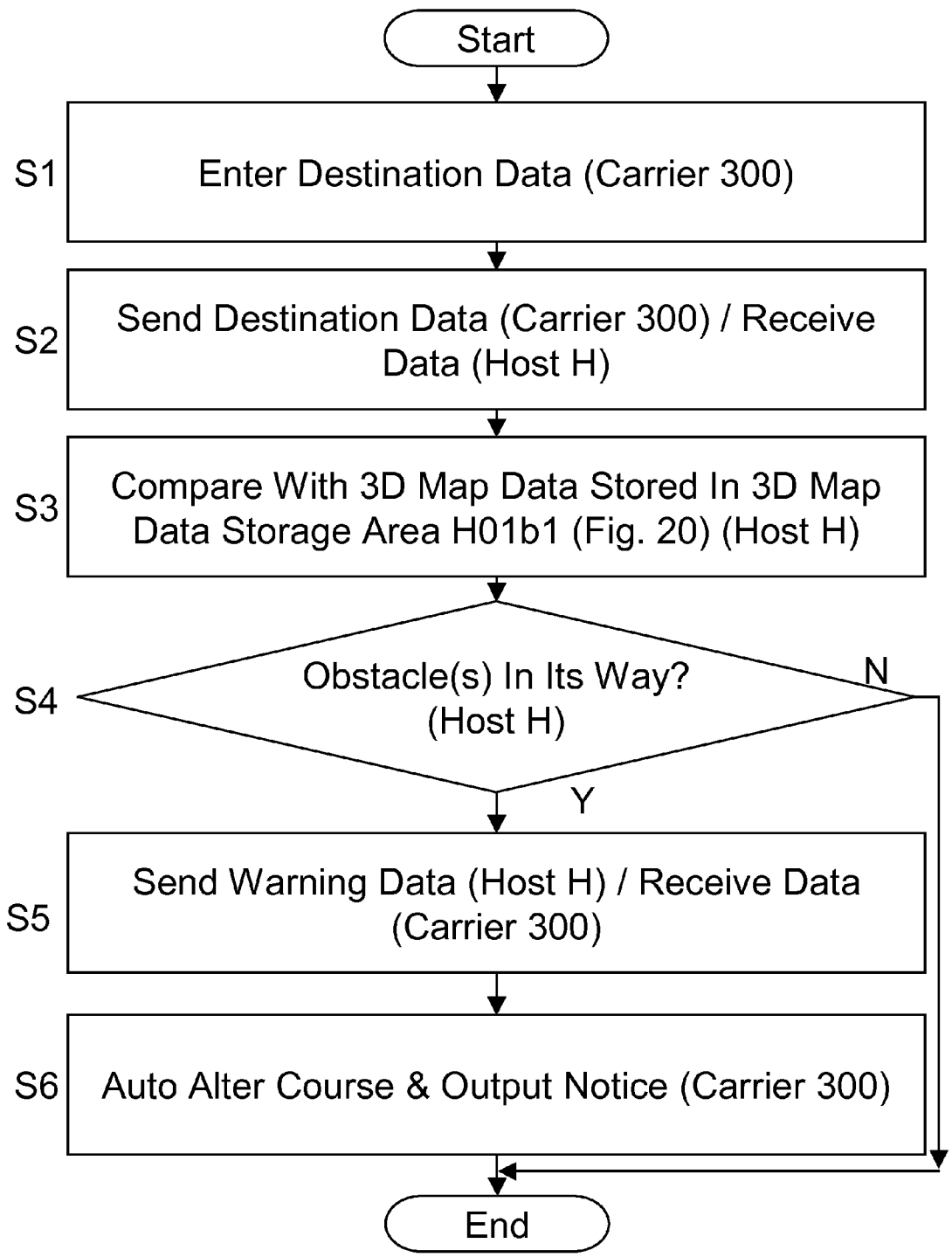
FIG. 32 is a flowchart illustrating an exemplary embodiment of the present invention.

FIG. 32 illustrates another embodiment of the auto collision avoiding function described in FIG. 5 to avoid colliding with any object during actual flight before such flight is initiated, wherein Host H plays the major role in performing the present function. Referring to the present drawing, a destination data is input via Input Device 210 (FIG. 1b) of Carrier 300 (S1). Here, the destination data indications the destination of Carrier 300 in (x, y, z) format. CPU 211 of Carrier 300 sends the destination data, which is received by Host H (S2). Host H calculates the course to the destination based on the destination data and compares the destination data with the 3D map data stored in 3D Map Data Storage Area H01b1 (FIG. 20) (S3). If any of the objects stored in 3D Map Data Storage Area H01b1, which is in the path of Carrier 300, is higher than its navigation altitude (S4), Host H sends a warning data, which is received by Carrier 300 (S5). Here, the warning data is the data indicating that one or more of obstacles are in its way. CPU 211 calculates an alternative course to the destination and outputs a notice sign and/or sound which indicates that the course has been altered from Monitor 201 (FIG. 1b) and/or Speaker 204 (FIG. 1b) (S6).

Figure 33:
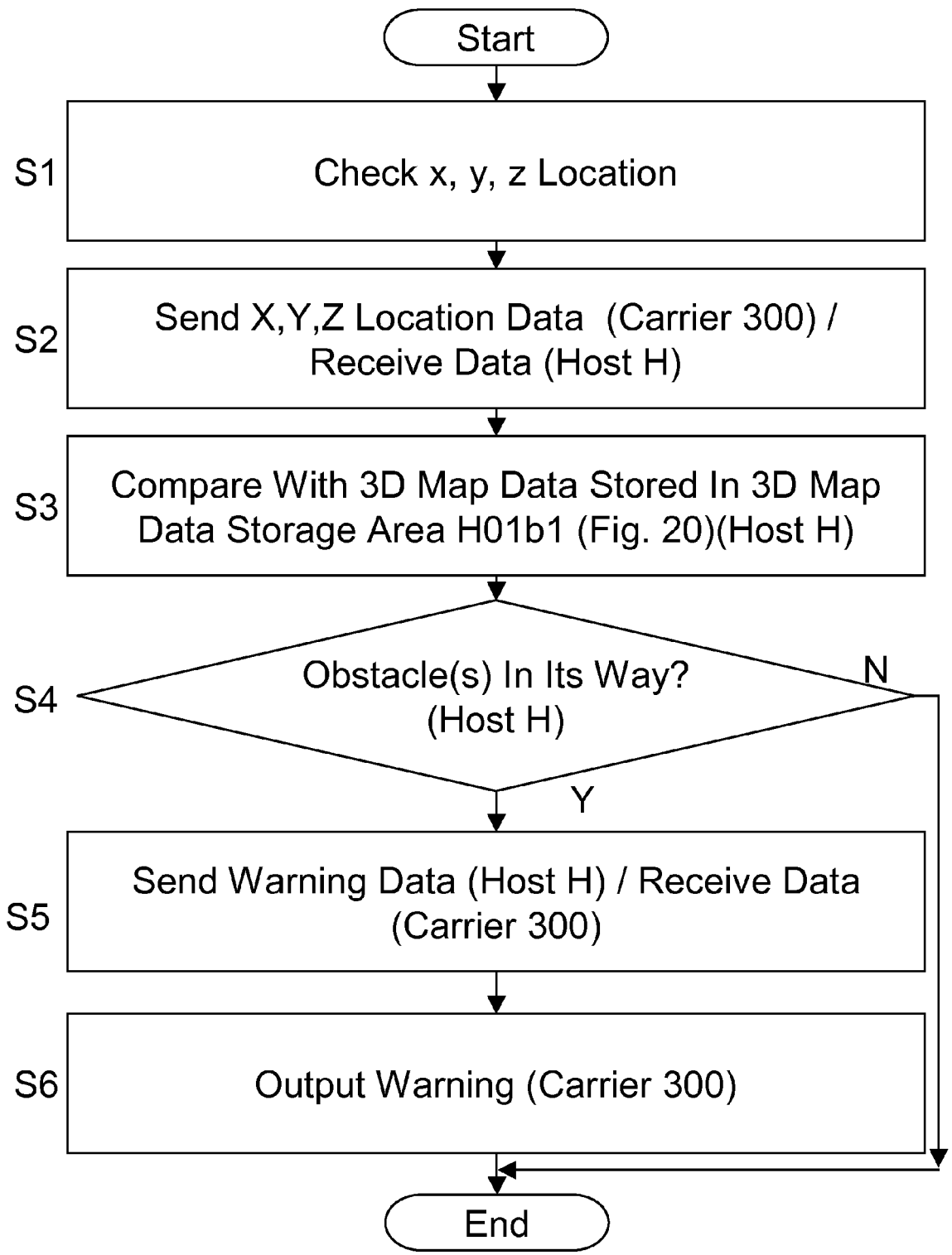
FIG. 33 is a flowchart illustrating an exemplary embodiment of the present invention.

FIG. 33 illustrates another embodiment of the auto collision avoiding function described in FIG. 6 to avoid colliding with any object during actual flight before such flight is initiated, wherein Host H plays the major role in performing the present function. Referring to the present drawing, CPU 211 (FIG. 1b) checks the present location of Carrier 300 during flight by utilizing the navigation data received from GPS Navigation System 217 (FIG. 1b) via Data Bus 203 (FIG. 1b) (S1). CPU 211 sends the X,Y,Z Location Data, which is received by Host H (S2). Here, the X,Y,Z Location Data is the data representing the current geographic location of Carrier 300 in (x, y, z) format. The navigation data is compared with the three-dimensional data stored in 3D Map Data Storage Area H01b1 (FIG. 20) (S3). If any of the objects stored in 3D Map Data Storage Area H01b1, which is in the path of Carrier 300, is higher than its navigation altitude (S4), Host H sends a warning data, which is received by Carrier 300 (S5). CPU 211 outputs a warning sign and/or sound from Monitor 201 (FIG. 1b) and/or Speaker 204 (FIG. 1b) (S6). The foregoing sequence is performed periodically.

Figure 34:
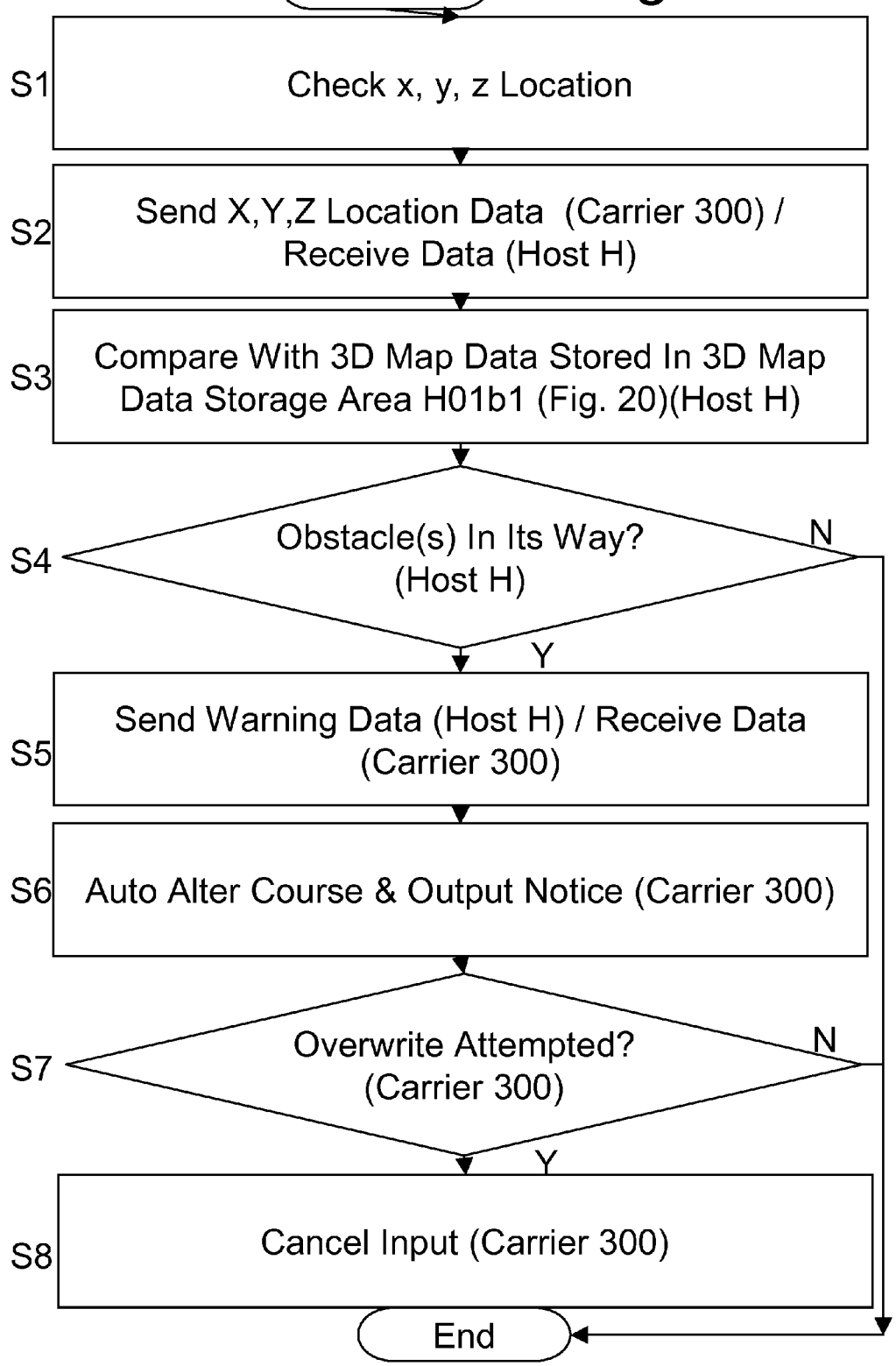
FIG. 34 is a flowchart illustrating an exemplary embodiment of the present invention.

FIG. 34 illustrates another embodiment of the auto collision avoiding function described in FIG. 6 to avoid colliding with any object during actual flight before such flight is initiated, wherein Host H plays the major role in performing the present function. Referring to the present drawing, CPU 211 (FIG. 1b) checks the present location of Carrier 300 during flight by utilizing the navigation data received from GPS Navigation System 217 (FIG. 1b) via Data Bus 203 (FIG. 1b) (S1). CPU 211 sends the X,Y,Z Location Data, which is received by Host H (S2). Here, the X,Y,Z Location Data is the data representing the current geographic location of Carrier 300 in (x, y, z) format. The navigation data is compared with the three-dimensional data stored in 3D Map Data Storage Area H01b1 (FIG. 20) (S3). If any of the objects stored in 3D Map Data Storage Area H01b1, which is in the path of Carrier 300, is higher than its navigation altitude (S4), Host H sends a warning data, which is received by Carrier 300 (S5). CPU 211 calculates an alternative course to the destination and outputs a notice sign and/or sound which indicates that the course has been altered from Monitor 201 (FIG. 1b) and/or Speaker 204 (FIG. 1b) (S6). If the alternative course is attempted to be overwritten by signal input from Input Device 210 (FIG. 1b) (S7) CPU 211 cancels such input signal (S8).

<<Auto Collision Avoiding Function (Other Embodiments)—Summary>>

A navigation system comprising a host computer and a carrier, wherein said carrier periodically produces a location data of said carrier, said host computer stores a plurality of three-dimensional data regarding a plurality of three-dimensional objects which reflect the objects in the real world, said host computer compares the path of said carrier with said plurality of three-dimensional data, and a warning sign is output if one or more of said three-dimensional objects are within said path of said carrier thereby avoiding said carrier to collide one or more of said objects in the real world.

<<Satellite TV Function>>

FIGS. 35 through 50 illustrate the satellite TV function which enables the passengers of Carrier 300 to enjoy watching satellite TV programs at their seats.

Figure 35:
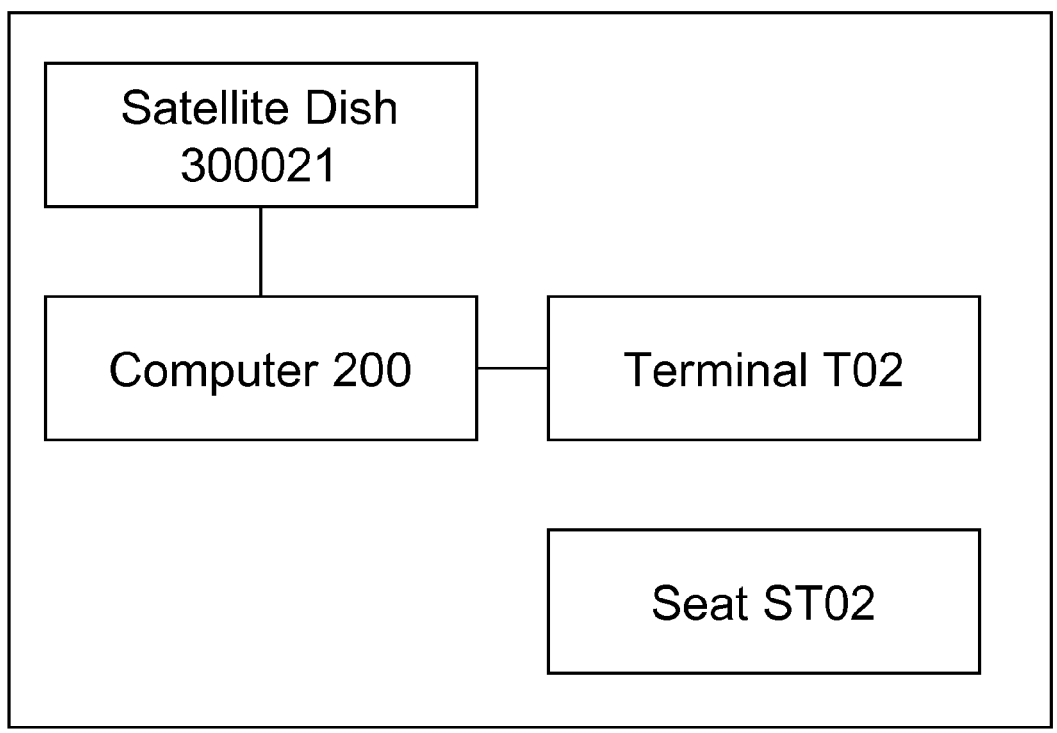
FIG. 35 is a simplified illustration illustrating an exemplary embodiment of the present invention.

FIG. 35 illustrates the major elements utilized to implement the present function. As described in the present drawing, Carrier 300 comprises Satellite Dish 300021, Computer 200, Terminal T02, and Seat ST02 (for the avoidance of doubt, a plurality of Seat ST02 may be installed in Carrier 300). Satellite Dish 300021 is an antenna to receive Satellite TV Signal STVS02 described in FIG. 47 which is sent from Artificial Satellite AS3 (FIG. 15). Computer 200 described hereinbefore distributes TV data to Terminal T02. Terminal T02 is a small computer which comprises a display and a speaker to output the TV data. Seat ST02 is a seat for a passenger to sit while travelling by Carrier 300. Terminal T02 is located in front of or next to Seat ST02 within the range at which the passenger sitting on Seat ST02 is enabled to watch the display of Terminal T02. The distance between Terminal T02 and Seat ST02 may be in the range of 30 cm and 10 m. One Terminal T02 may be shared by more than one passenger.

Figure 36:
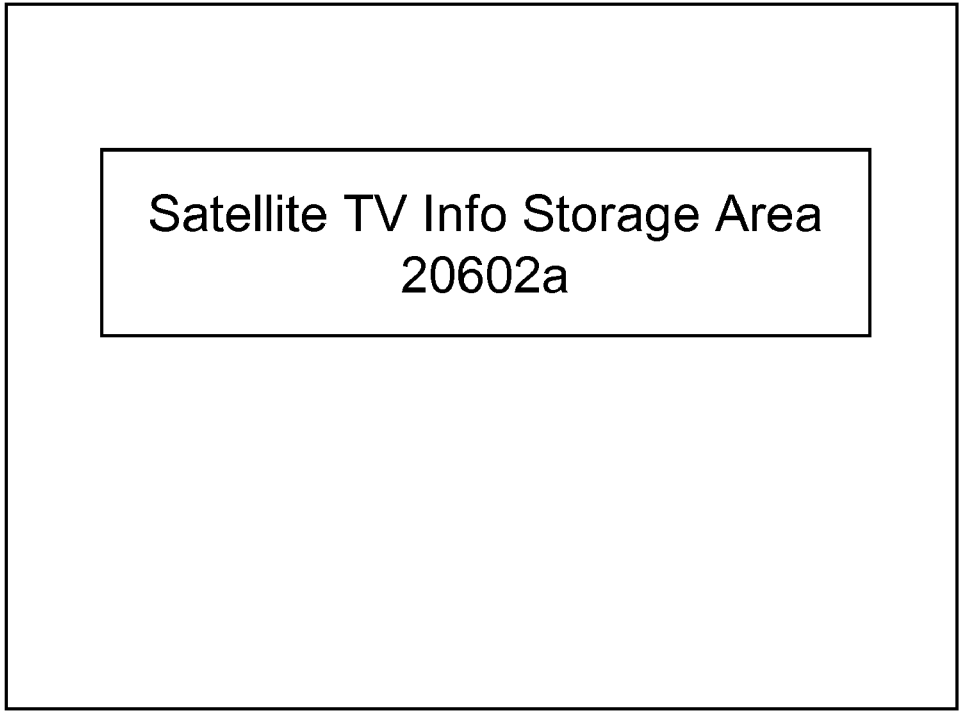
FIG. 36 is a block diagram illustrating an exemplary embodiment of the present invention.

FIG. 36 illustrates the storage area included in RAM 206 of Computer 200 installed in Carrier 300. As described in the present drawing, RAM 206 includes Satellite TV Information Storage Area 20602a of which the data and the software programs stored therein are described in FIG. 37.

Figure 37:
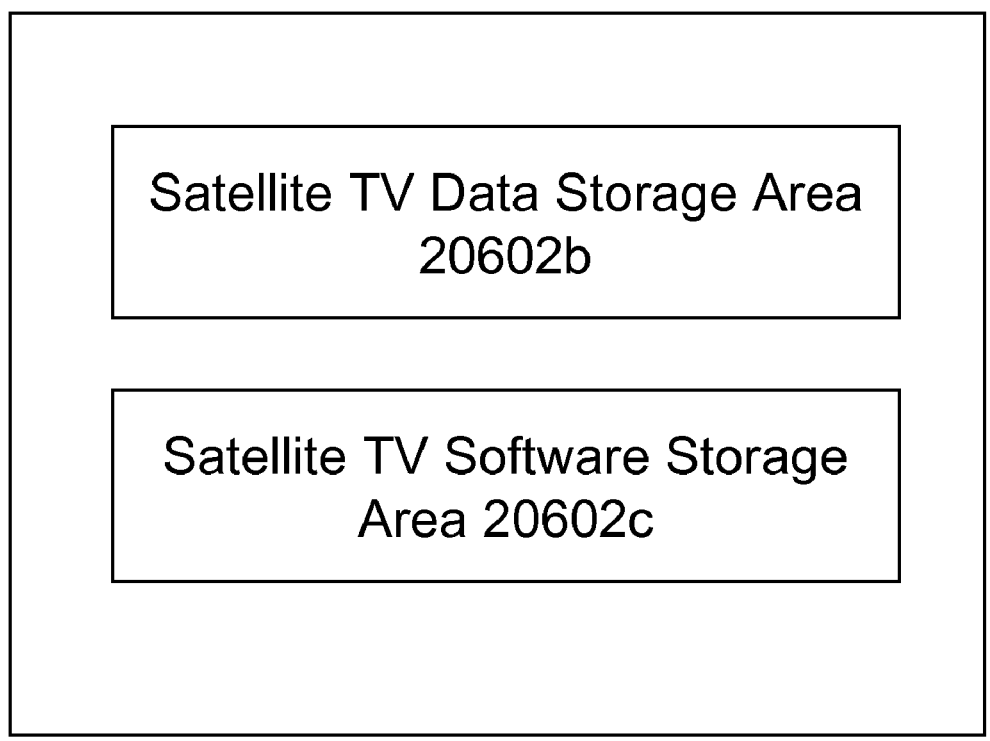
FIG. 37 is a block diagram illustrating an exemplary embodiment of the present invention.

FIG. 37 illustrates the storage areas included in Satellite TV Information Storage Area 20602a (FIG. 36). As described in the present drawing, Satellite TV Information Storage Area 20602*a* includes Satellite TV Data Storage Area 20602*b* and Satellite TV Software Storage Area 20602*c*. Satellite TV Data Storage Area 20602*b* stores the data necessary to implement the present function on the side of Computer 200, such as the ones described in FIGS. 38 through 39. Satellite TV Software Storage Area 20602*c* stores the software programs necessary to implement the present function on the side of Computer 200, such as the ones described in FIG. 40.

Figure 38:
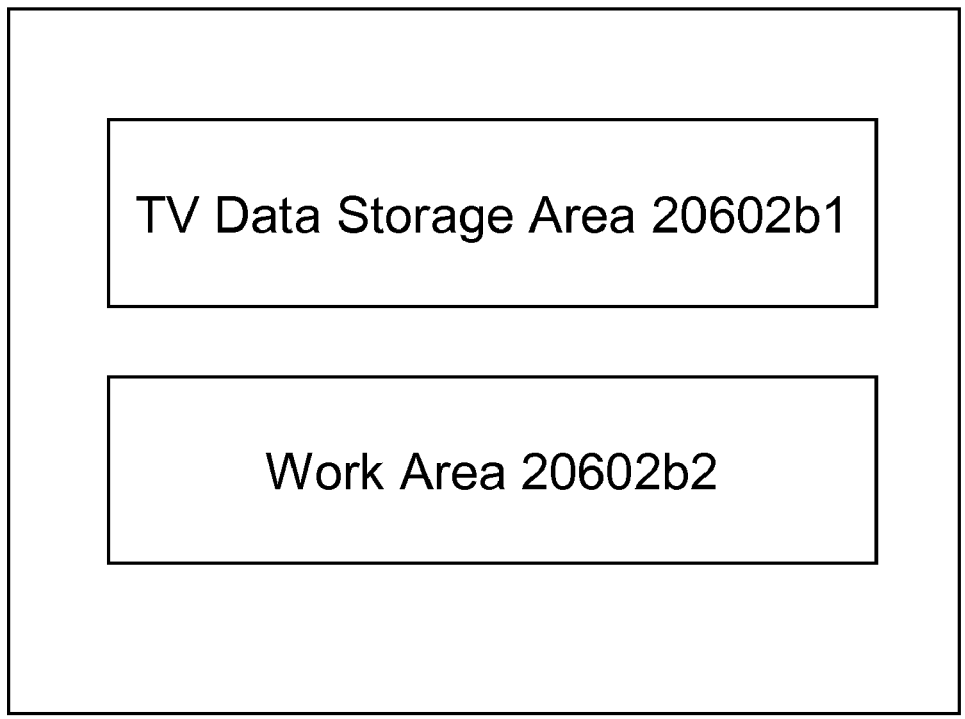
FIG. 38 is a block diagram illustrating an exemplary embodiment of the present invention.

FIG. 38 illustrates the storage areas included in Satellite TV Data Storage Area 20602*b* (FIG. 37). As described in the present drawing, Satellite TV Data Storage Area 20602*b* includes TV Data Storage Area 20602*b*1 and Work Area 20602*b*2. TV Data Storage Area 20602*b*1 stores the data described in FIG. 39. Work Area 20602*b*2 is utilized as a work area to perform calculation and temporarily store data.

FIG. 39 illustrates the data stored in TV Data Storage Area 20602*b*1 (FIG. 38). As described in the present drawing, TV Data Storage Area 20602*b*1 comprises two columns, i.e., 'Channel ID' and 'TV Data'. Column 'Channel ID' stores the channel IDs, and each channel ID is an identification of the corresponding TV data stored in column 'TV Data'. Each channel ID is composed of numeric data designed to be displayed on LCD T201 (FIG. 41) of Terminal T02 (FIG. 35). Column 'TV Data' stores the TV data, and each TV data is a video data designed to be output from LCD T201 (FIG. 41) and Speaker 216 (FIG. 41) of Terminal T02 (FIG. 35). In the example described in the present drawing, TV Data Storage Area 20602*b*1 stores the following data: the channel ID 'Channel#1' and the corresponding TV data 'TV Data#1'; the channel ID 'Channel#2' and the corresponding TV data 'TV Data#2'; the channel ID 'Channel#3' and the corresponding TV data 'TV Data#3'; and the channel ID 'Channel#4' and the corresponding TV data 'TV Data#4'.

Figure 40:
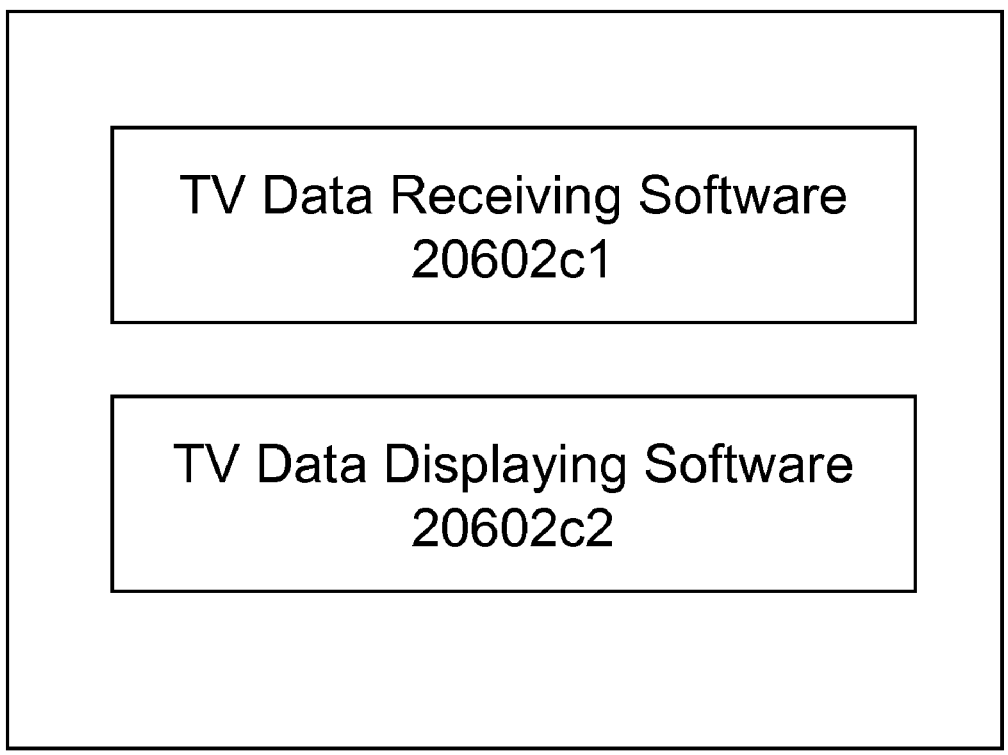
FIG. 40 is a block diagram illustrating an exemplary embodiment of the present invention.

FIG. 40 illustrates the software programs stored in Satellite TV Software Storage Area 20602*c* (FIG. 37). As described in the present drawing, Satellite TV Software Storage Area 20602*c* stores TV Data Receiving Software 20602*c*1 and TV Data Displaying Software 20602*c*2. TV Data Receiving Software 20602*c*1 is the software program described in FIG. 49. TV Data Displaying Software 20602*c*2 is the software program described in FIG. 50.

Figure 41:
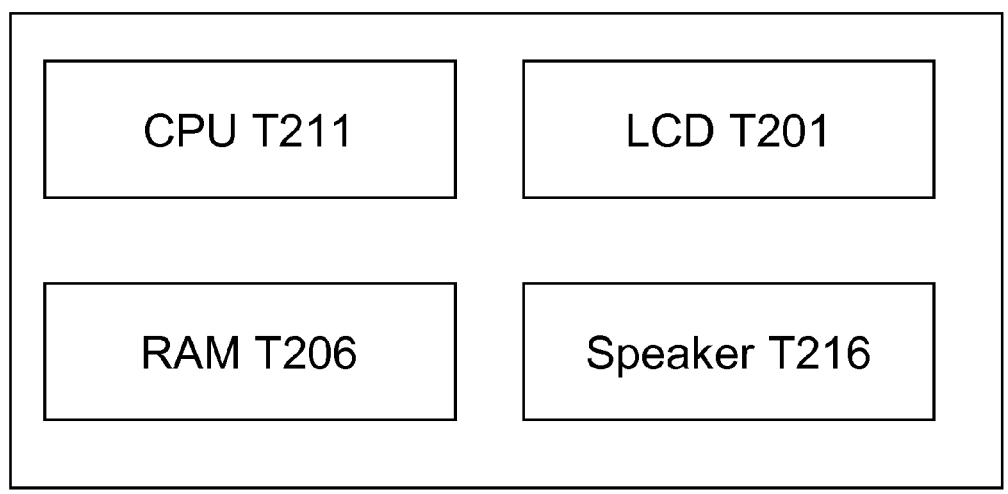
FIG. 41 is a simplified illustration illustrating an exemplary embodiment of the present invention.

FIG. 41 illustrates the major elements included in Terminal T02. As described in the present drawing, Terminal T02 includes CPU T211, RAM T206, LCD T201, and Speaker T216. CPU T211 controls and administers the overall function and operation of Computer 200. CPU T211 utilizes RAM T206 to temporarily store data, perform calculation to perform its own function, and/or implement the present function. LCD T201 is a monitor to output video data of TV data (FIG. 39). Speaker T216 is a speaker to output audio data of TV data (FIG. 39).

Figure 42:
FIG. 42 is a block diagram illustrating an exemplary embodiment of the present invention.

FIG. 42 illustrates the storage area included in RAM T206 (FIG. 41) of Terminal T02. As described in the present drawing, RAM T206 includes Satellite TV Information Storage Area T20602*a* of which the data and the software programs stored therein are described in FIG. 43.

Figure 43:
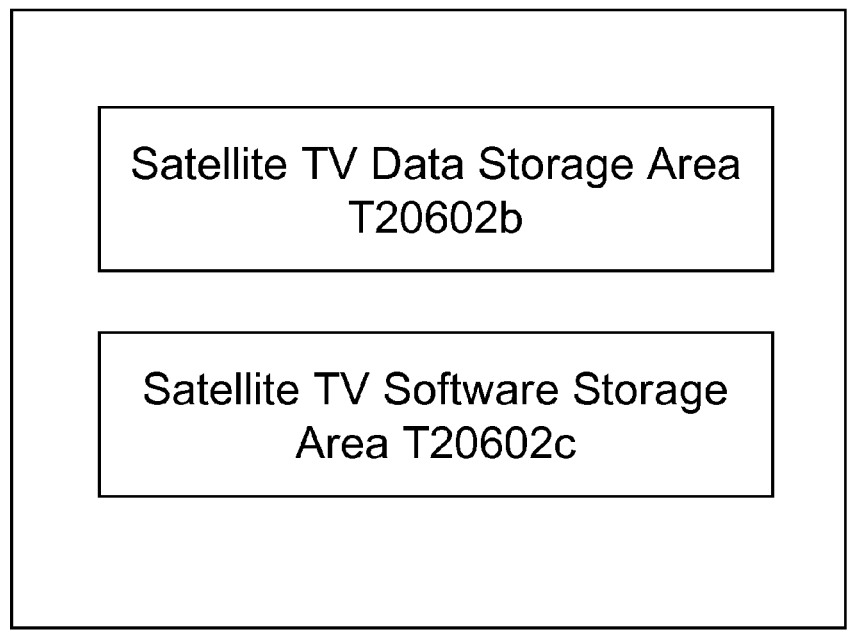
FIG. 43 is a block diagram illustrating an exemplary embodiment of the present invention.

FIG. 43 illustrates the storage areas included in Satellite TV Information Storage Area T20602*a* (FIG. 42). As described in the present drawing, Satellite TV Information Storage Area T20602*a* includes Satellite TV Data Storage Area T20602*b* and Satellite TV Software Storage Area T20602*c*. Satellite TV Data Storage Area T20602*b* stores the data necessary to implement the present function on the side of Terminal T02, such as the ones described in FIGS. 44 and 45. Satellite TV Software Storage Area T20602*c* stores the software programs necessary to implement the present function on the side of Terminal T02, such as the one described in FIG. 46.

Figure 44:
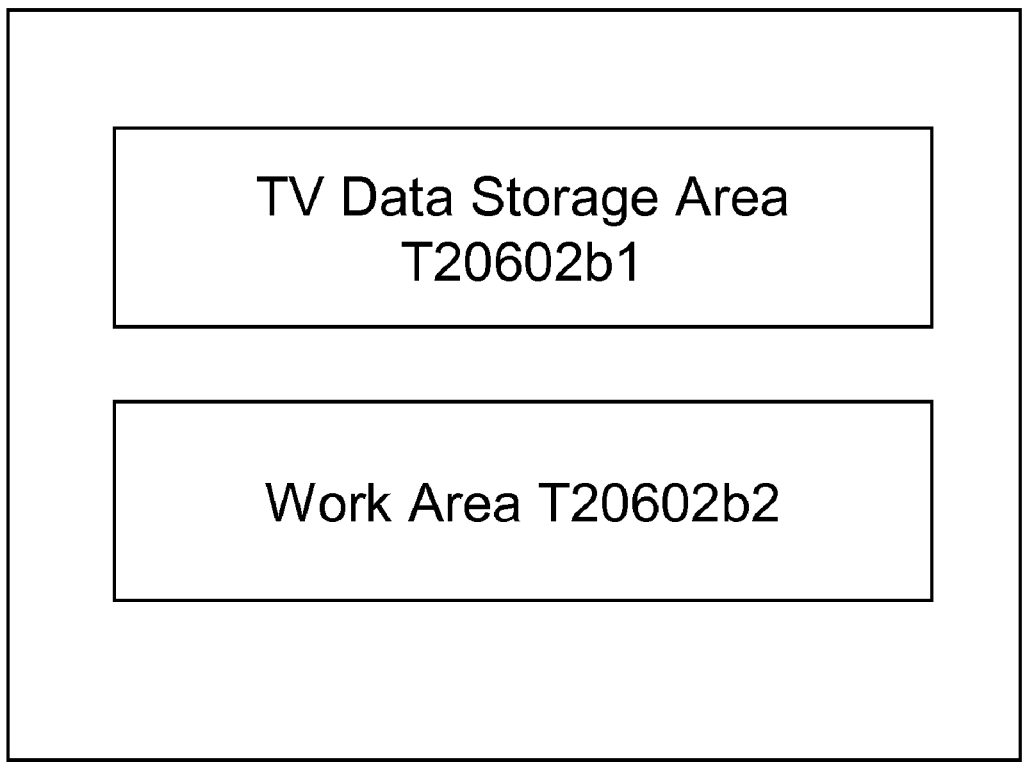
FIG. 44 is a block diagram illustrating an exemplary embodiment of the present invention.

FIG. 44 illustrates the storage areas included in Satellite TV Data Storage Area T20602*b* (FIG. 43). As described in the present drawing, Satellite TV Data Storage Area T20602*b* includes TV Data Storage Area T20602*b*1 and Work Area T20602*b*2. TV Data Storage Area T20602*b*1 stores the data described in FIG. 45. Work Area T20602*b*2 is utilized as a work area to perform calculation and temporarily store data.

FIG. 45 illustrates the data stored in TV Data Storage Area T20602*b*1 (FIG. 44). As described in the present drawing, TV Data Storage Area T20602*b*1 comprises two columns, i.e., 'Channel ID' and 'TV Data'. Column 'Channel ID' stores the channel IDs, and each channel ID is an identification of the corresponding TV data stored in column 'TV Data'. Each channel ID is composed of numeric data designed to be displayed on LCD T201 (FIG. 41) of Terminal T02 (FIG. 35). Column 'TV Data' stores a TV data which is the audiovisual data designed to be output from LCD T201 (FIG. 41) and Speaker T216 (FIG. 41) of Terminal T02 (FIG. 35). In the example described in the present drawing, TV Data Storage Area 20602*b*1 stores the following data: the channel ID 'Channel#1' and the corresponding TV data 'TV Data#1'. The TV data corresponding to the rest of the channel IDs are blank, which indicates that the passenger is currently watching TV Data#1 represented by Channel#1.

Figure 46:
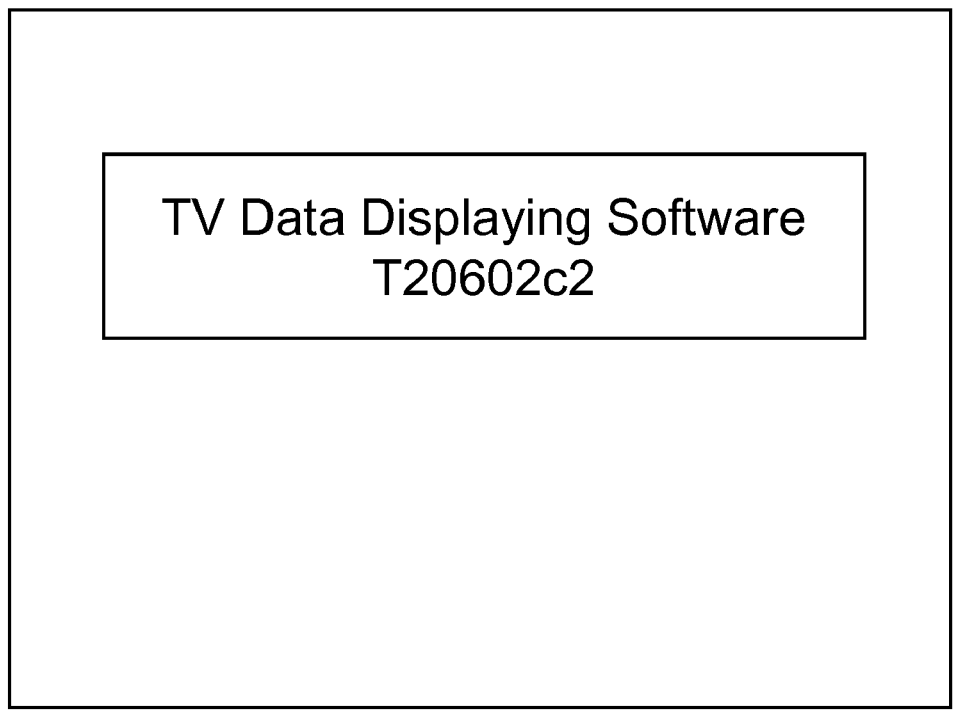
FIG. 46 is a block diagram illustrating an exemplary embodiment of the present invention.

FIG. 46 illustrates the software programs stored in Satellite TV Software Storage Area T20602*c* (FIG. 43). As described in the present drawing, Satellite TV Software Storage Area T20602*c* stores TV Data Displaying Software 20602*c*2. TV Data Displaying Software 20602*c*2 is the software program described in FIG. 50.

Figure 47:
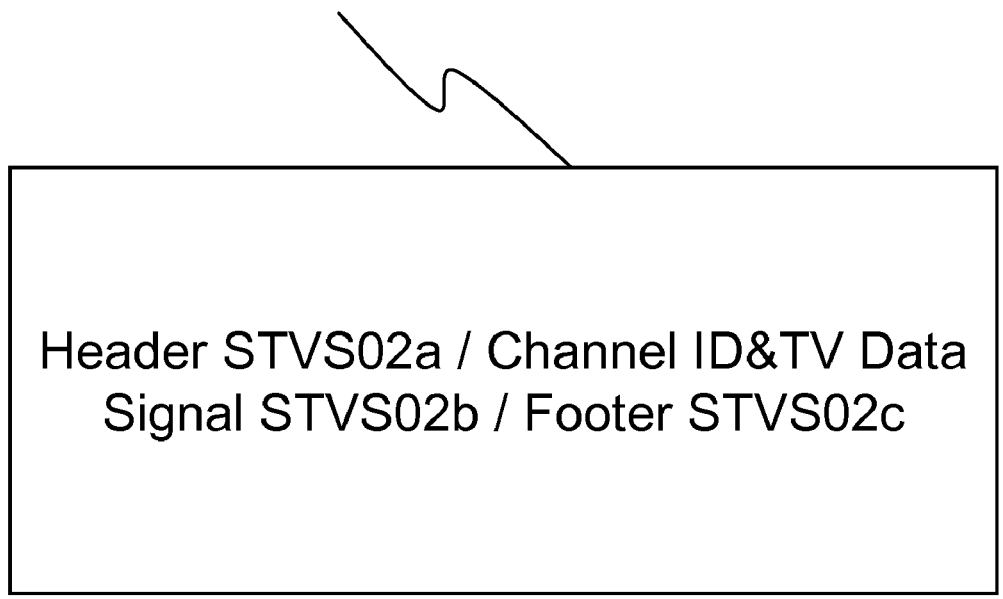
FIG. 47 is a simplified illustration of data utilized in the present invention.

FIG. 47 illustrates Satellite TV Signal STVS02 sent from Artificial Satellite AS3 (FIG. 15), which is received by Carrier 300. As described in the present drawing, Satellite TV Signal STVS02 includes Header STVS02*a*, Channel ID&TV Data Signal STVS02*b*, and Footer STVS02*c*. Header STVS02*a* and Footer STVS02*c* indicate the start and end of Satellite TV Signal STVS02, respectively. Channel ID&TV Data Signal STVS02*b* is the data described in FIG. 48.

Figure 48:
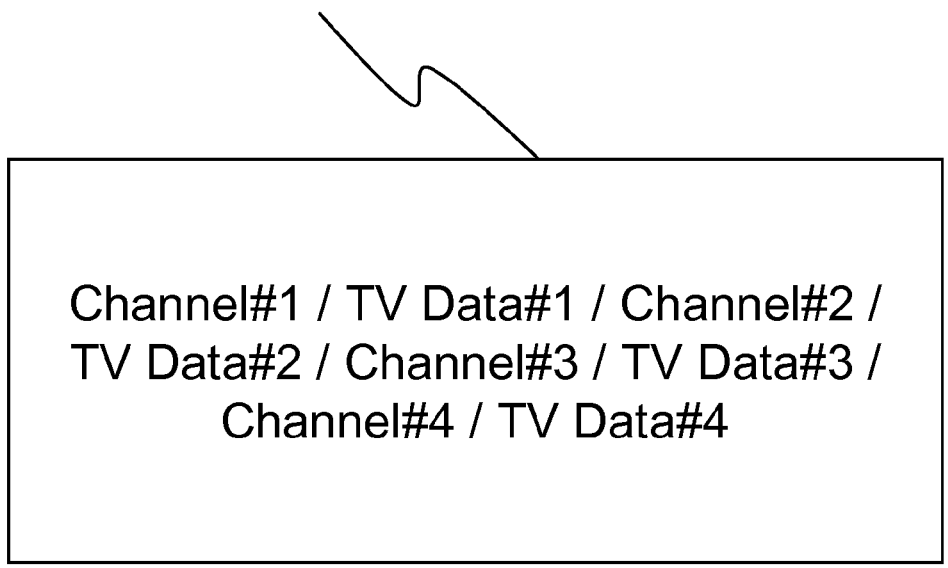
FIG. 48 is a simplified illustration of data utilized in the present invention.

FIG. 48 illustrates the data included in Channel ID&TV Data Signal STVS02*b* (FIG. 47). As described in the present drawing, Channel ID&TV Data Signal STVS02*b* includes Channel#1, TV Data#1, Channel#2, TV Data#2, Channel#3, TV Data#3, Channel#4, and TV Data#4. The TV data 'TV Data#1' is stored in TV Data Storage Area 20602*b*1 (FIG. 39) of Computer 200 at the corresponding channel ID 'Channel#1'; the TV data 'TV Data#2' is stored in TV Data Storage Area 20602*b*1 (FIG. 39) at the corresponding channel ID 'Channel#2'; the TV data 'TV Data#3' is stored in TV Data Storage Area 20602*b*1 (FIG. 39) at the corresponding channel ID 'Channel#3'; and the TV data 'TV Data#4' is stored in TV Data Storage Area 20602*b*1 (FIG. 39) at the corresponding channel ID 'Channel#4.

Figure 49:
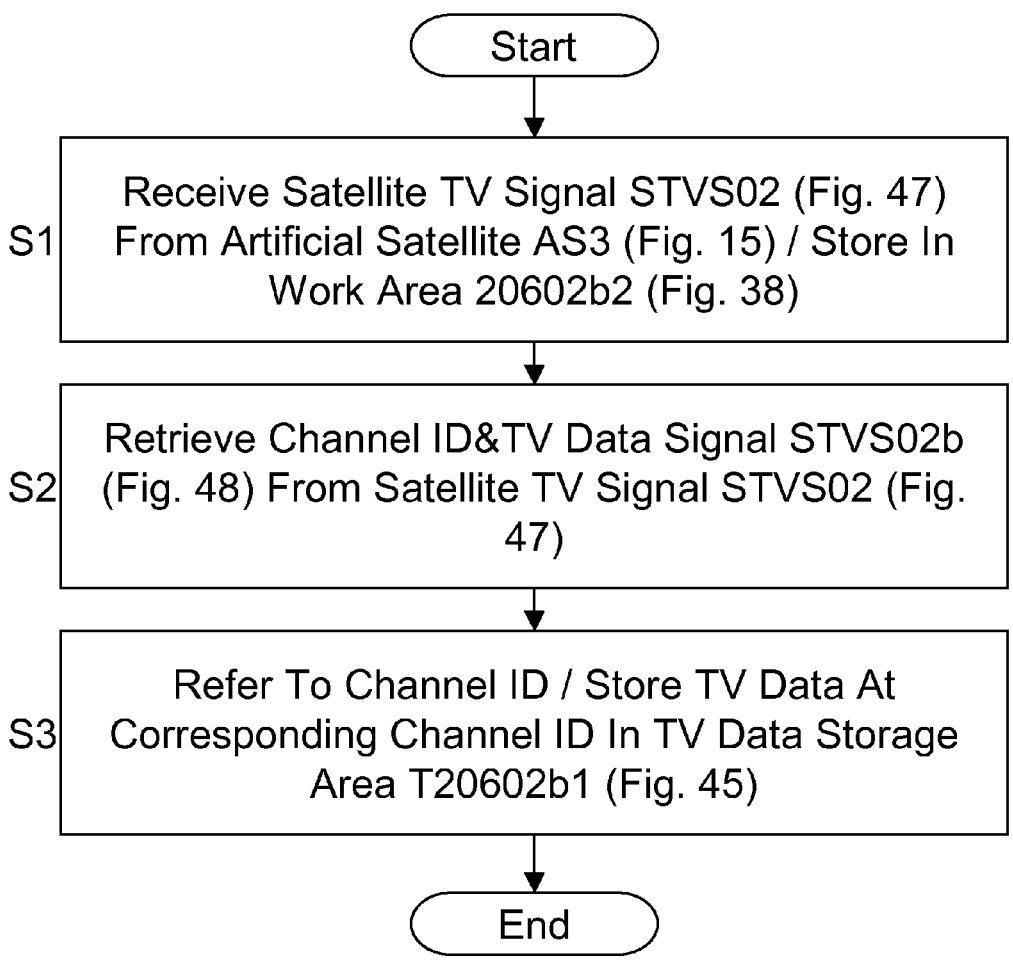
FIG. 49 is a flowchart illustrating an exemplary embodiment of the present invention.

FIG. 49 illustrates TV Data Receiving Software 20602*c*1 (FIG. 40) of Computer 200, which receives and stores Channel ID&TV Data Signal STVS02*b* (FIG. 48) sent from Artificial Satellite AS3 (FIG. 15). Referring to the present drawing, Carrier 300 receives Satellite TV Signal STVS02 (FIG. 47) via Satellite Dish 300021 (FIG. 35) from Artificial Satellite AS3 (FIG. 15), which is stored in Work Area 20602*b*2 (FIG. 38) (S1). Computer 200 of Carrier 300 retrieves Channel ID&TV Data Signal STVS02*b* (FIG. 48) from Satellite TV Signal STVS02 (FIG. 47) (S2). Computer 200 refers to the channel IDs and stores the TV data at the corresponding channel ID in TV Data Storage Area T20602b1 (FIG. 45) (S3). The foregoing sequence is performed periodically.

Figure 50:
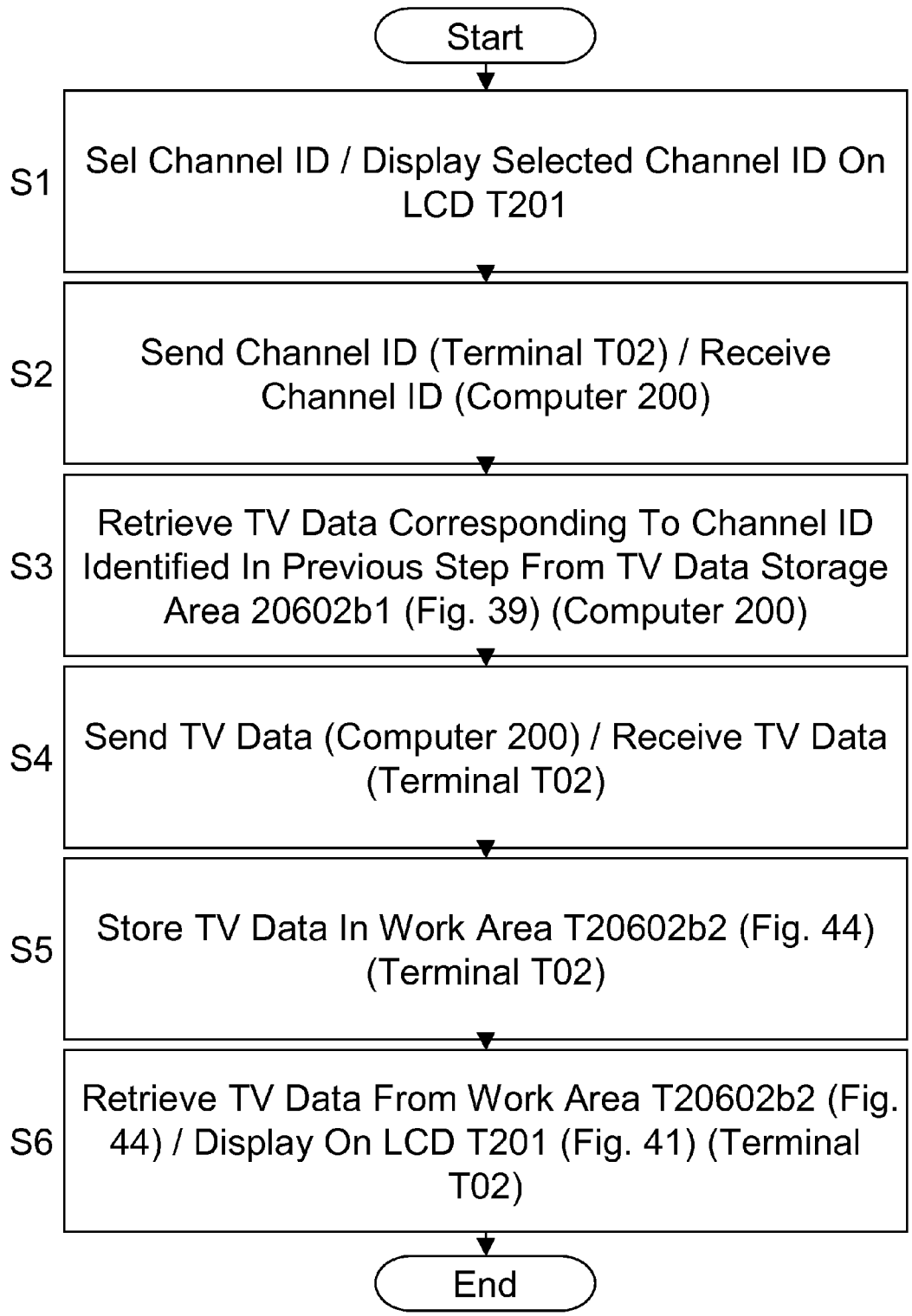
FIG. 50 is a flowchart illustrating an exemplary embodiment of the present invention.

FIG. 50 illustrates TV Data Displaying Software 20602c2 (FIG. 40) of Computer 200 and TV Data Displaying Software T20602c2 (FIG. 46) of Terminal T02, which display TV data on LCD T201 (FIG. 41). Referring to the present drawing, the passenger sitting on Seat ST02 (FIG. 35) selects the channel ID (e.g., Channel#1) via an input device (not shown) of Terminal T02 and selects ID is displayed on LCD T201 (S1). CPU T211 (FIG. 41) of Terminal T02 sends the channel ID selected in the previous step (e.g., Channel#1), which is Received by Computer 200 (S2). Computer 200 retrieves the TV data (e.g., TV Data#1) corresponding to the channel ID identified in the previous step (e.g., Channel#1) from TV Data Storage Area 20602b1 (FIG. 39) (S3). Computer 200 sends the TV data retrieved in the previous step (e.g., TV Data#1), which is received by Terminal T02 (S4). CPU T211 stores the TV data in Work Area T20602b2 (FIG. 44) (S5). CPU T211 retrieves the TV data from Work Area T20602b2 (FIG. 44) and displays the data on LCD T201 (FIG. 41) (S6).

<<Satellite TV Function—Summary>>

(1) A carrier comprising a satellite dish, storage area and a terminal, wherein a plurality of TV data is received by said satellite dish in a wireless fashion, said plurality of TV data are stored in said storage area, a certain TV data identified by a channel ID selecting signal input to said terminal is retrieved from said storage area, and said certain TV data is output from said terminal.

(2) The carrier of summary (1), wherein said carrier further comprises a seat, and said terminal is located adjacent to said seat.

(3) The carrier of summary (1), wherein said carrier further comprises a seat, and said terminal is located adjacent to said seat, thereby enables the passenger sitting on said seat is able to operate said terminal.

(4) The carrier of summary (1), wherein said carrier is an airplane.

(5) The carrier of summary (1), wherein said carrier is an automobile.

<<Wireless Communication Facilitating System>>

FIGS. 51 through 64b illustrate the method of enabling the passengers in Carrier 300 to perform wireless communication in a convenient manner.

Figure 51:
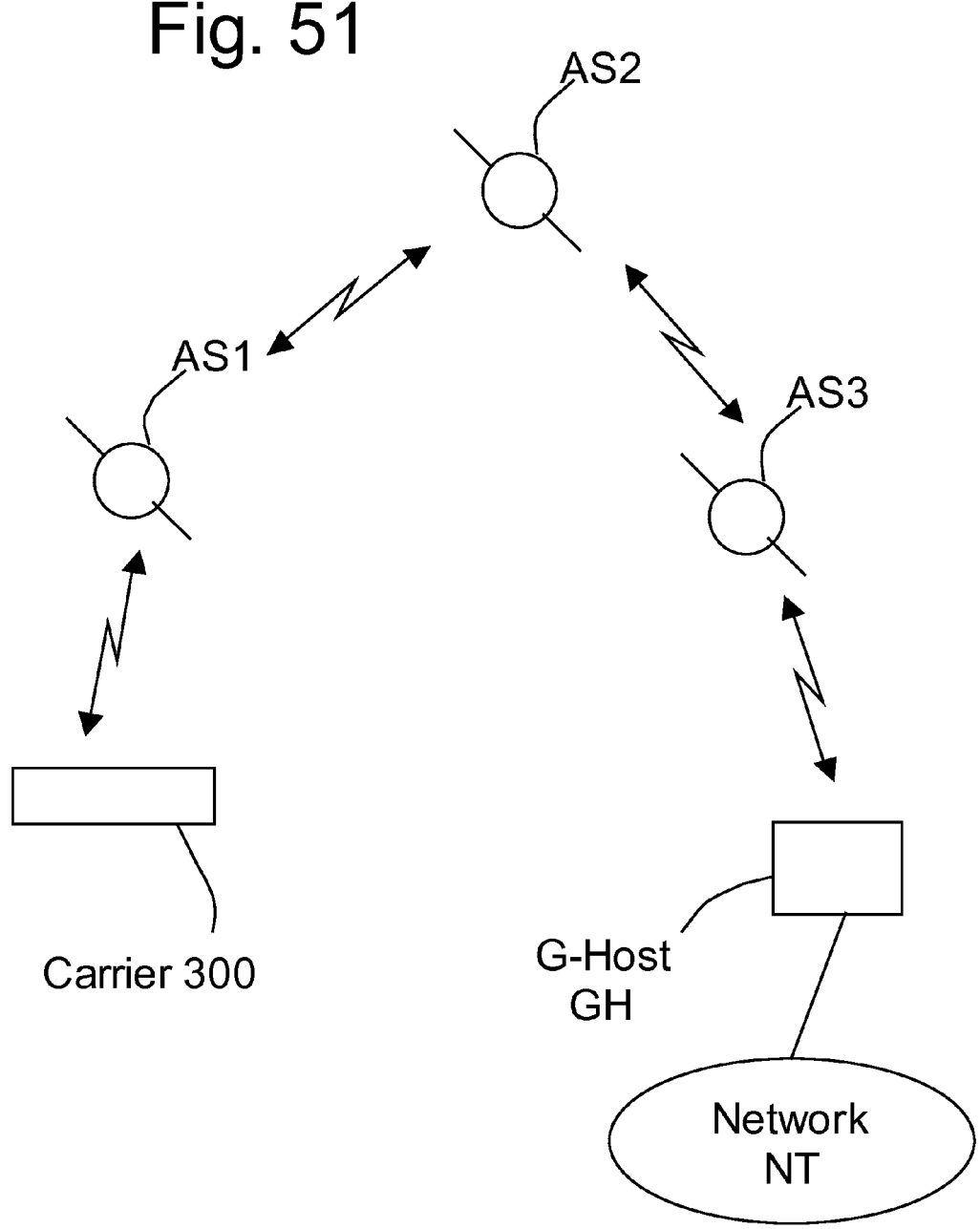
FIG. 51 is a simplified illustration of the exemplary embodiment of the present invention.

FIG. 51 describes the general idea of the system in which the present invention is utilized. Referring to FIG. 51, Carrier 300 is connected to Ground Host GH which is located on the ground by having the communication data sent therefrom routed by Artificial Satellites AS1, AS2, and AS3. Artificial Satellite AS1 is connected to Artificial Satellite AS2, Artificial Satellite AS2 is connected to Artificial Satellite AS3, and Artificial Satellite AS3 is connected to Ground Host GH in a wireless manner, respectively. Ground Host GH is connected to Network NT, such as the Internet, by phone line, cable or any other non-wireless methods. Here, Ground Host GH is a computer located on the ground or on the surface of the earth which functions as a gateway or an entrance to Network NT. Ground Host GH may be substituted by Host H described hereinbefore. Carrier 300 is enabled to contact Network NT by way of connecting to the nearest artificial satellite, which is Artificial Satellite AS1 in the present example.

Figure 52:
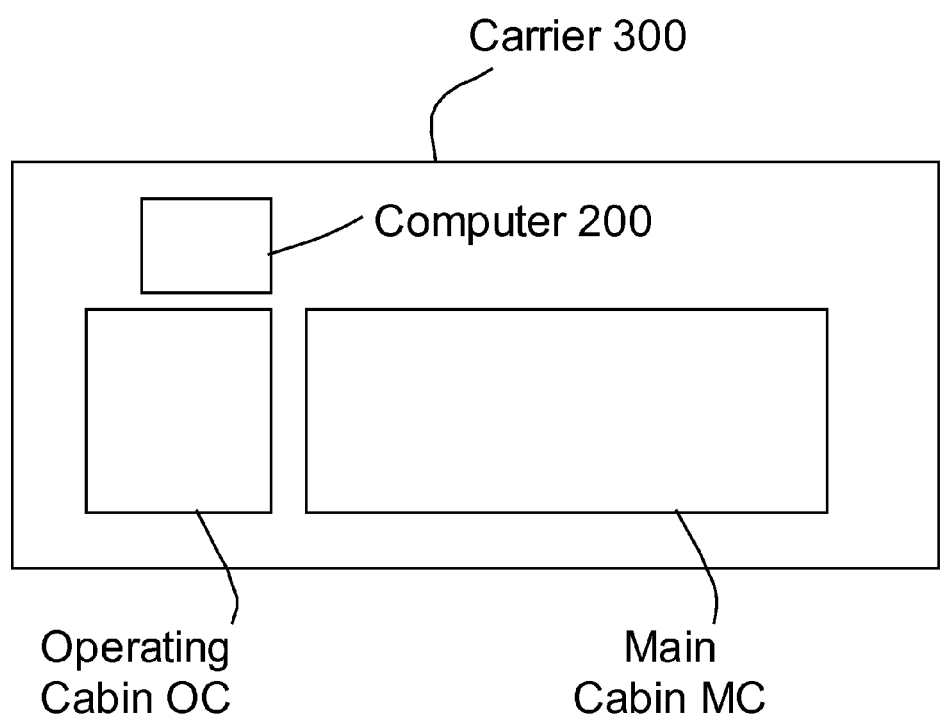
FIG. 52 is a simplified illustration of the exemplary embodiment of the present invention.

FIG. 52 describes the structure of Carrier 300 shown in FIG. 51. As described in FIG. 52, Carrier 300 has two major cabins, i.e. Operating Cabin OC and Main Cabin MC. Operating Cabin OC is primarily utilized for operating and controlling Carrier 300, and Main Cabin MC is primarily utilized for carrying a plurality of passengers. Computer 200 is a computer which is utilized for operating and controlling Carrier 300 by control signals input from Operating Cabin OC and for implementing the present invention which is discussed in details hereinafter. Computer 200 is located adjacent to Operating Cabin OC. Operating Cabin OC may or may not have pilots or drivers to manoeuvre Carrier 300. If no pilots or drivers are present in Operating Cabin OC, Computer 200 is responsible for the overall control of Carrier 300.

Figure 53:
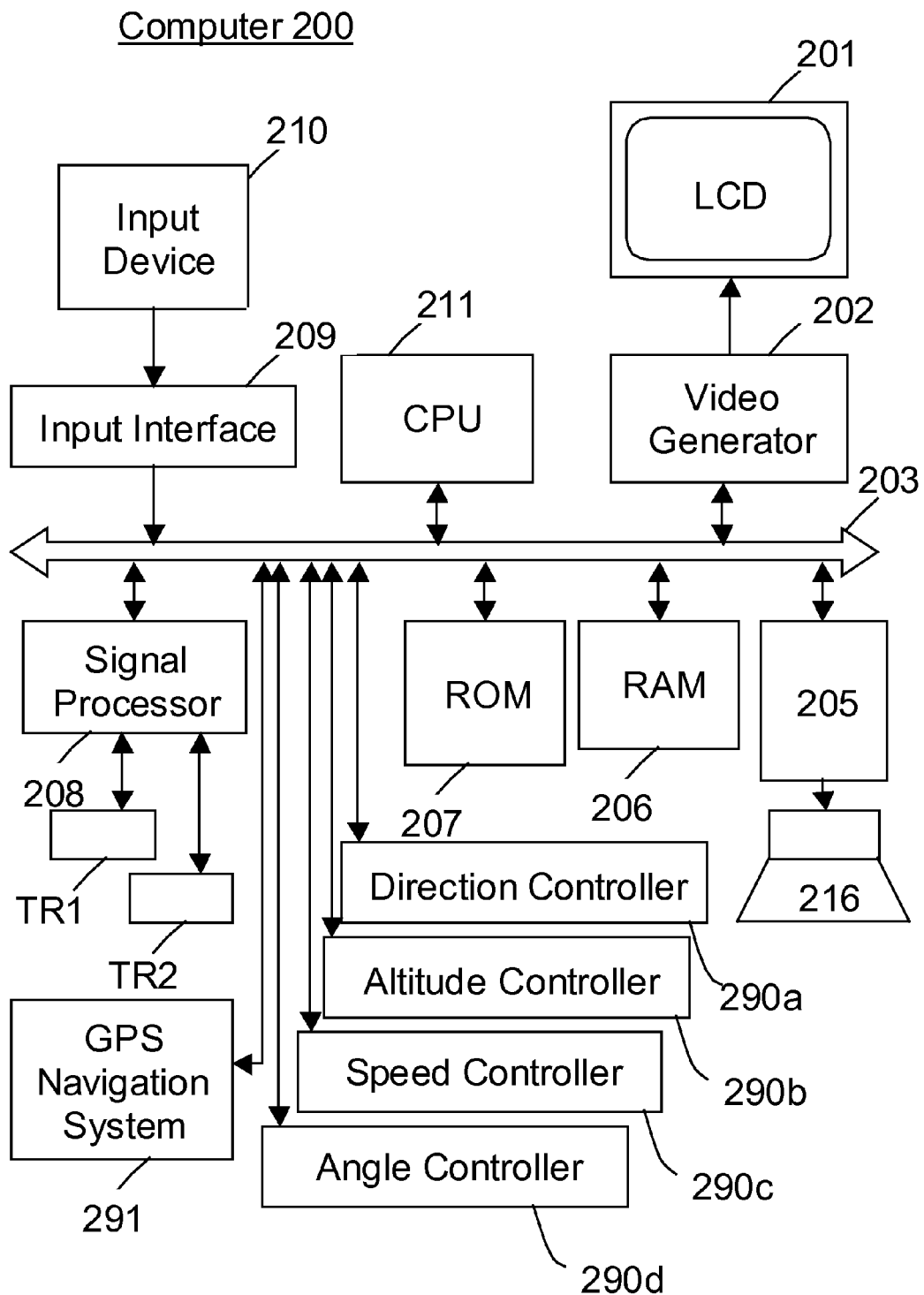
FIG. 53 is a block diagram illustrating an exemplary embodiment of the present invention.

FIG. 53 illustrates another embodiment of Computer 200 described in FIG. 1b to perform the present system. Referring to FIG. 53, CPU 211 controls and administers the overall function and operation of Computer 200. CPU 211 uses RAM 206 to temporarily store data and/or to perform calculation to perform its function. RAM 206 is also used to store a plurality of data and programs necessary to perform the present invention which are utilized by CPU 211 for calculation. Video Generator 202 generates analogue and/or digital video signals which are displayed on Monitor 201. Sound Generator 205 generates analogue and/or digital audio signals that are transferred to Speaker 204. ROM 207 stores data and programs which are necessary for CPU 211 to control and administer the overall function and operation of Computer 200. Transmitters TR1 and TR2 send and receive communication data, location data and various types of wireless signals. Signal Processor 208 converts a stream of data produced by CPU 211 into a specific format (for example, data compression) in order to be sent by Transmitters TR1 and/or TR2 in a wireless fashion, and also converts a stream of wireless data received by Transmitters TR1 and/or TR2 into a specific format which is readable by CPU 211. Input signals, most of which are to manoeuvre Carrier 300 (FIG. 52), are input by Input Device 210, such as keyboard, ON/OFF switches, joysticks, and such signals are transferred to CPU 211 via Input Interface 209 and Data Bus 203. Direction Controller 213 controls the direction of Carrier 300 under the control and administration of CPU 211. Altitude Controller 214 controls the altitude of Carrier 300 under the control and administration of CPU 211. Speed Controller 215 controls the speed of Carrier 300 under the control and administration of CPU 211. Angle Controller 216 controls the angle of Carrier 300 under the control and administration of CPU 211. GPS Navigation System 217 calculates and identifies the present geographic location of Carrier 300 in the actual three-dimensional space by way of utilizing the method so-called "GPS" or "global positioning system". Such function can be enabled by the technologies primarily introduced in the following inventions and the references cited thereof: U.S. Pat. No. 6,429,814; U.S. Pat. No. 6,427,121; U.S. Pat. No. 6,427,120; U.S. Pat. No. 6,424,826; U.S. Pat. No. 6,415,227; U.S. Pat. No. 6,415,154; U.S. Pat. No. 6,411,811; U.S. Pat. No. 6,392,591; U.S. Pat. No. 6,389,291; U.S. Pat. No. 6,369,751; U.S. Pat. No. 6,347,113; U.S. Pat. No. 6,324,473; U.S. Pat. No. 6,301,545; U.S. Pat. No. 6,297,770; U.S. Pat. No. 6,278,404; U.S. Pat. No. 6,275,771; U.S. Pat. No. 6,272,349; U.S. Pat. No. 6,266,012; U.S. Pat. No. 6,259,401; U.S. Pat. No. 6,243,647; U.S. Pat. No. 6,236,354; U.S. Pat. No. 6,233,094; U.S. Pat. No. 6,232,922; U.S. Pat. No. 6,211,822; U.S. Pat. No. 6,188,351; U.S. Pat. No. 6,182,927; U.S. Pat. No. 6,163,567; U.S. Pat. No. 6,101,430; U.S. Pat. No. 6,084,542; U.S. Pat. No. 5,971,552; U.S. Pat. No. 5,963,167; U.S. Pat. No. 5,944,770; U.S. Pat. No. 5,890,091; U.S. Pat. No. 5,841,399; U.S. Pat. No. 5,808,582; U.S. Pat. No. 5,777,578; U.S. Pat. No. 5,774,831; U.S. Pat. No. 5,764,184; U.S. Pat. No. 5,757,786; U.S. Pat. No. 5,736,961; U.S. Pat. No. 5,736,960; U.S. Pat. No. 5,594,454; U.S. Pat. No. 5,585,800; U.S. Pat. No. 5,554,994; U.S. Pat. No. 5,535,278; U.S. Pat. No. 5,534,875; U.S. Pat. No. 5,519,620; U.S. Pat. No. 5,506,588; U.S. Pat. No. 5,446,465; U.S. Pat. No. 5,434,574; U.S. Pat. No. 5,402,441; U.S. Pat. No.

5,373,531; U.S. Pat. No. 5,349,531; U.S. Pat. No. 5,347,286; U.S. Pat. No. 5,341,301; U.S. Pat. No. 5,339,246; U.S. Pat. No. 5,293,170; U.S. Pat. No. 5,225,842; U.S. Pat. No. 5,223,843; U.S. Pat. No. 5,210,540; U.S. Pat. No. 5,193,064; U.S. Pat. No. 5,187,485; U.S. Pat. No. 5,175,557; U.S. Pat. No. 5,148,452; U.S. Pat. No. 5,134,407; U.S. Pat. No. 4,928,107; U.S. Pat. No. 4,928,106; U.S. Pat. No. 4,785,463; U.S. Pat. No. 4,754,465; U.S. Pat. No. 4,622,557; and U.S. Pat. No. 4,457,006.

Figure 54:
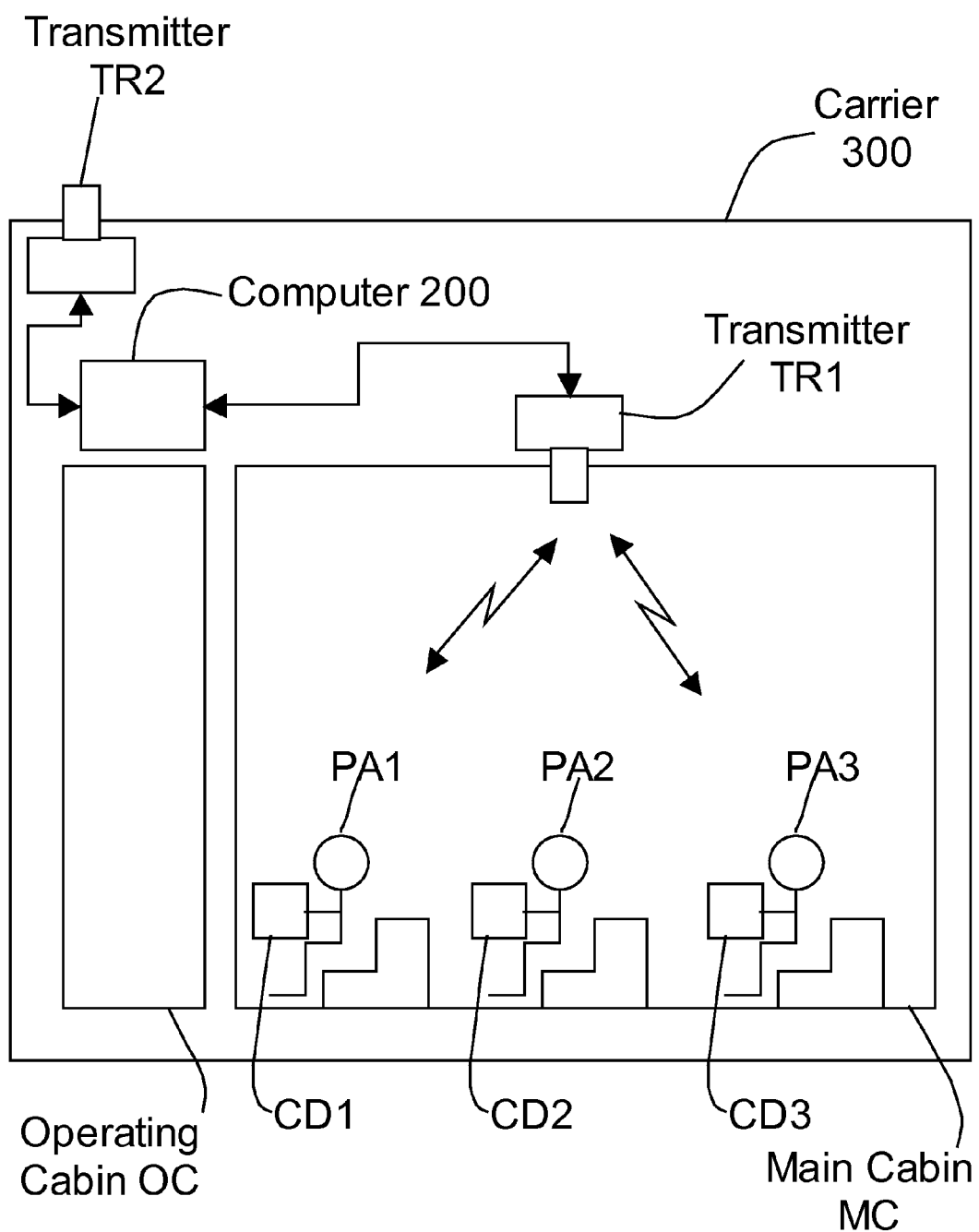
FIG. 54 is a simplified illustration of the exemplary embodiment of the present invention.

FIG. 54 illustrates how the series of communication data produced in Main Cabin MC are sent from and received by Carrier 300. Here, communication data includes both voice data which is primarily used for oral communication in a wireless fashion and non-voice data which is primarily used for non-oral communication, such as, but not limited to, text data, software data, video data, image data, log data, and other data necessary to access Network NT (FIG. 51). Main Cabin MC is designed to carry a plurality of passengers. In the present example, three passengers are currently in Main Cabin MC, i.e., Passenger PA1, Passenger PA2, and Passenger PA3. Passenger PA1 is carrying Communication Device CD1, Passenger PA2 is carrying Communication Device CD2, and Passenger PA3 is carrying Communication Device CD3. Here, the communication device (CD1, CD2, and/or CD3) can be a personal computer which is capable to send and receive data in a wireless fashion, a PDA, a PHS, and/or a cellular phone. Transmitter TR1 is an antenna which is located adjacent to the ceiling of Main Cabin MC so as to receive a series of communication data produced by Communication Devices CD1, CD2, and/or CD3. The series of communication data received by Transmitter TR1 are sent to Computer 200 and, having being converted into a specific form as described in FIG. 53 and hereinafter, sent to the nearest artificial satellite (Artificial Satellite AS1 in FIG. 51) from Transmitter TR2 in a wireless fashion. A series of communication data received by Transmitter TR2 are transferred to Computer 200 by which such communication data are converted into a specific form as described in FIG. 53 and hereinafter. The converted communication data are transferred to Transmitter TR1 which distributes the communication data in a wireless fashion to the communication device (CD1, CD2, and/or CD3) in Main Cabin MC.

Figure 55:
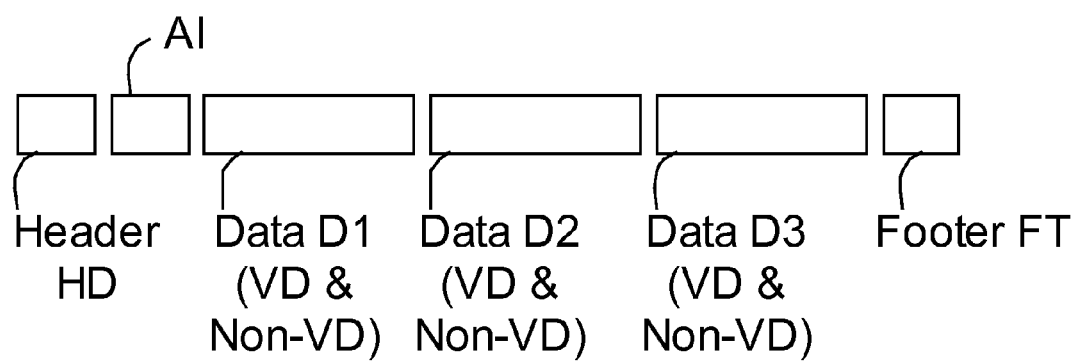
FIG. 55 is a digital information illustrating an exemplary embodiment of the present invention.

FIG. 55 illustrates one of the series of communication data converted by Computer 200 (FIG. 54) and transferred from Transmitter TR2 (FIG. 54). Referring to FIG. 55, Header HD indicates the beginning of the communication data, Footer FT indicates the end of the communication data. Airplane ID Number AI indicates the identification number of Carrier 300 (FIG. 54) which is unique to each Carrier 300. Data D1 represents the communication data produced by Communication Device CD1 owned by Passenger PA1 in FIG. 54. In the same manner, Data D2 and D3 represent the communication data produced by Communication Device CD2 and CD3, respectively. Here, Data D1, D2, and D3 include both voice data and/or non-voice data which are explained hereinabove.

Figure 56B:
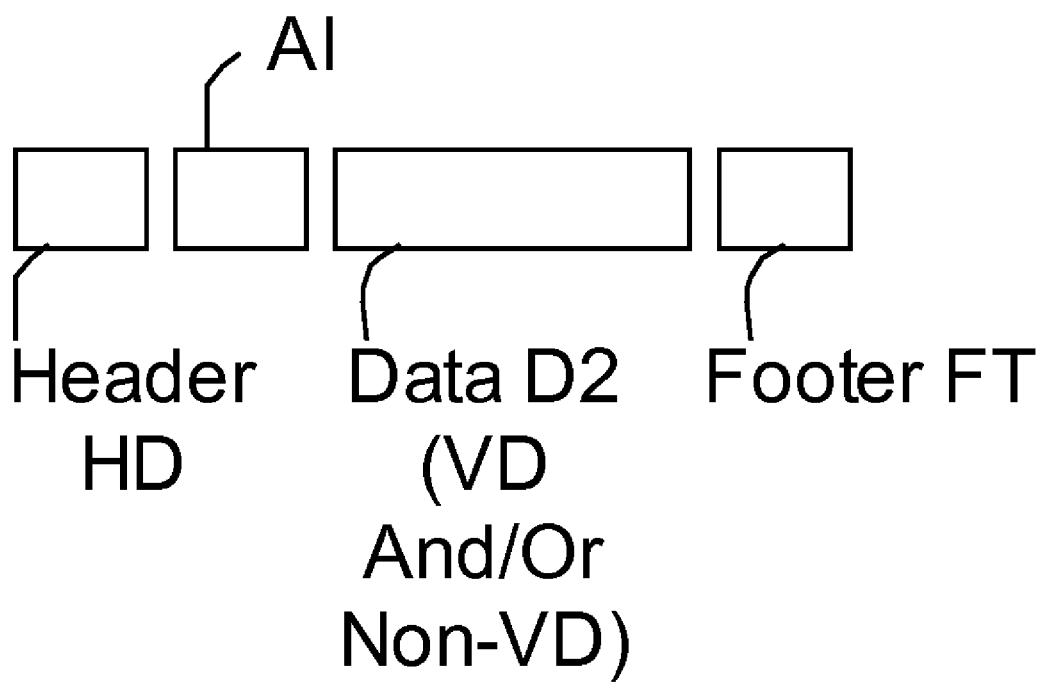
FIG. 56b is a digital information illustrating an exemplary embodiment of the present invention.

FIGS. 56a, 56b, and 56c illustrate other embodiments of transferring communication data described in FIG. 55. Referring to FIG. 56a, Header HD indicates the beginning of the communication data, Footer FT indicates the end of the communication data. Airplane ID Number AI indicates the identification number of Carrier 300 (FIG. 54) which is unique to each Carrier 300. Data D1 represents the communication data produced by Communication Device CD1 owned by Passenger PA1 in FIG. 54. Data D2 and D3 can be sent separately as described in FIGS. 6b and 6c respectively in the same manner.

Just like the communication data explained in FIG. 5, data D1, D2, and D3 include both voice data and/or non-voice data.

For transferring communication data, FDMA, TDMA, CDMA, and/or W-CDMA can be utilized.

FIG. 57 illustrates the operation of Computer 200 (FIG. 54), more precisely the operation of CPU 211 (FIG. 53), in order to convert the communication data into a specific format. First of all, CPU 211 periodically checks the signals received by Transmitter TR1 (FIG. 53) (S1). If the received signal is a communication data (S2), CPU 211 identifies the types of the communication data received, i.e., whether voice data or non-voice data as well as the user ID which is embedded into such communication data (S3). Here, the user ID represents the user identification number or code which is unique to each communication device (i.e., CD1, CD2, and CD3) described in FIG. 54. After identifying the types of the communication data received, voice data is converted into a specific format which is particular to voice data (S4a), and non-voice data is converted into a specific format which is particular to non-voice data (S4b). Both converted voice data and non-voice data are then integrated into one format (S5) and are arranged into a specific format as described in FIG. 55 and/or FIGS. 56a, 56b and 56c. As another embodiment, the steps of S4a and S4b may be merged into one step and employ the same method of formatting (i.e., not distinguishing the type of data and format accordingly to such type) since both voice data and non-voice data are digital.

Figure 58:
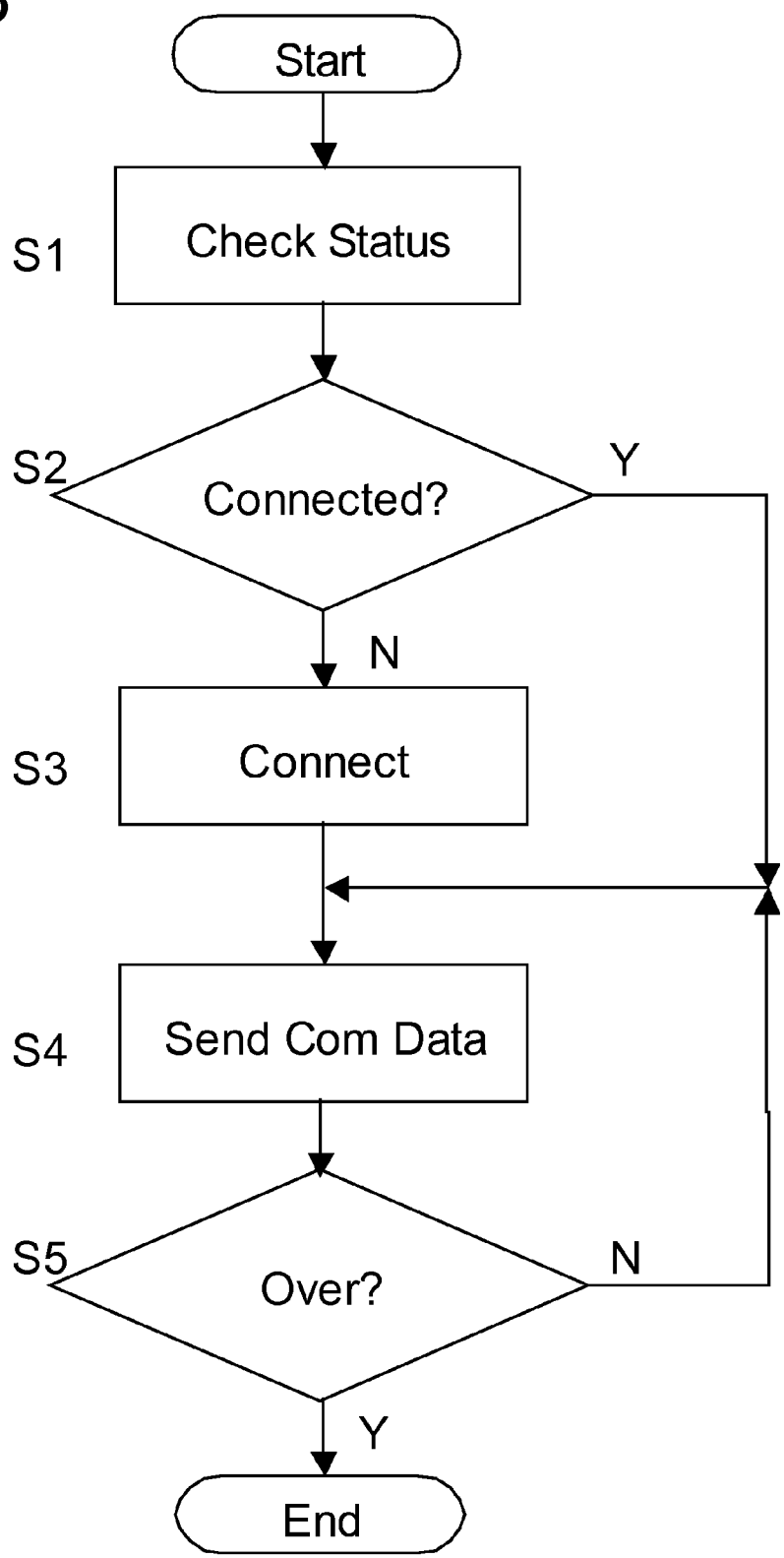
FIG. 58 is a flowchart illustrating an exemplary embodiment of the present invention.

FIG. 58 illustrates the operation of Computer 200 (FIG. 54), more precisely of CPU 211 (FIG. 53), to send the converted communication data which is described in FIG. 57 to Artificial Satellite AS1 (FIG. 51) from Transmitter TR2 (FIG. 54). Referring to FIG. 58, CPU 211 checks the connection status between Carrier 300 (FIG. 54) and the nearest artificial satellite, i.e., Artificial Satellite AS1 in the present example (S1). If Carrier 300 is not connected to Artificial Satellite AS1 (S2), the connection process is initiated and such process is repeated until the connection between Carrier 300 and Artificial Satellite AS1 is confirmed (S3). Communication data in the format described in FIG. 55 and/or FIGS. 56a, 56b and FIG. 56c are then transferred from Transmitter TR2 (FIG. 54) under the control of CPU 211 (S4). Such process is continued until all communication data are transferred. The communication data which are to be sent are temporarily registered in RAM 206 (FIG. 53) and erased thereafter. The communication log can be saved in RAM 206 and also can be output from Monitor 201 (FIG. 53) as well as from Speaker 204 (FIG. 53). A GPS navigation data produced by GPS Navigation System 217 (FIG. 53) can be embedded into the series of communication data described in FIG. 55 and/or FIGS. 56a, 56b, and 56c. All of the software programs necessary to operate the function described in FIG. 58 are stored in RAM 206 (FIG. 53) and/or ROM 207 (FIG. 3).

FIGS. 59 through 64b illustrate the method of enhancing the quality of wireless communication when utilizing a plurality of artificial satellites.

Figure 59:
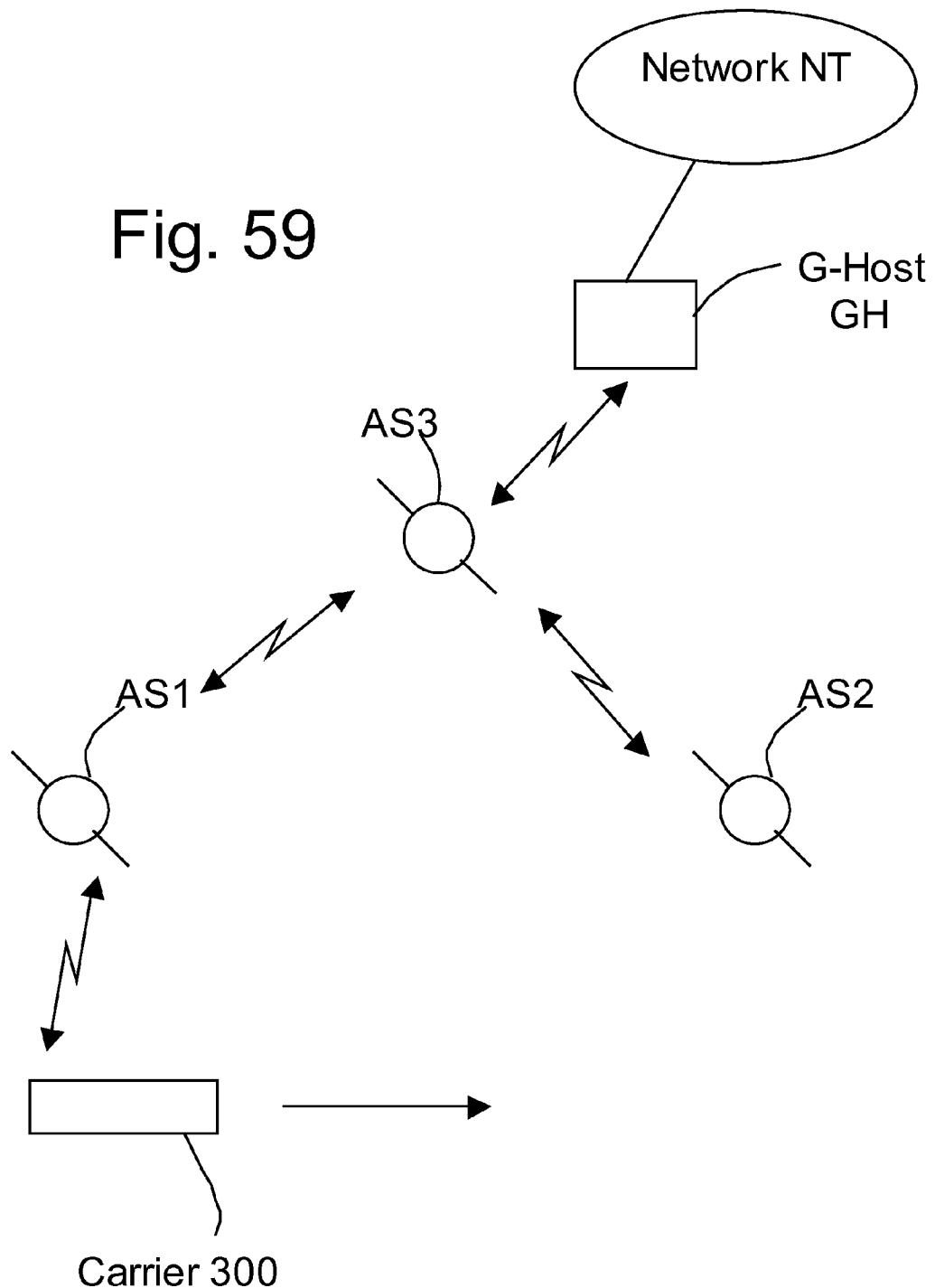
FIG. 59 is a simplified illustration of the prior art of the present invention.

As described in FIG. 59, Carrier 300 is connected to Artificial Satellite AS1 in a wireless fashion, Artificial Satellite AS1 is connected to Artificial Satellite AS3 in a wireless fashion, and Artificial Satellite AS3 is connected to Ground Host GH in a wireless fashion. Here, Ground Host GH is a computer located on the ground or on the surface of the earth which functions as a gateway or an entrance to Network NT. Ground Host GH may be substituted by Host H described hereinbefore. Ground Host GH is connected to Network NT, such as the Internet, by a non-wireless method, such as by phone line, cable, or any other non-wireless methods. Artificial Satellite AS2 is also connected to Artificial Satellite AS3 in a wireless fashion. In such manner, Carrier 300 is able to connect to Network NT via Artificial Satellite AS1, Artificial Satellite AS3, and Ground Host GH. Assuming that Carrier 300 is travelling to the direction indicated by arrow (or to the right of the drawing), Carrier 300 is connected to Artificial Satellite AS1 so long as Carrier 300 is in the communication rage of Artificial Satellite AS1. As described in FIG. 60, Carrier 300 moves further from Artificial Satellite AS1 and comes closer to Artificial Satellite AS2 so long as Carrier 300 maintains its course. In other words, Carrier 300 will exit the communication range of Artificial Satellite AS1 and enter the communication range of Artificial Satellite AS2, thereby maintain connection with Network NT via Artificial Satellite AS2, Artificial Satellite AS3, and Ground Host GH. However, when Carrier 300 terminates connection with Artificial Satellite AS1 by exiting its communication range and initiates connection with Artificial Satellite AS2 by entering its communication range, Carrier 300 is forced to endure a gap" or blank" in its communication with Network NT which will cause degradation in wireless communication. For example, if a series of voice data are being sent and received between Carrier 300 and Network NT and switching from Artificial Satellite AS1 to Artificial Satellite AS2 occurs during such communication, the voice data is forced to be dropped" or not being transferred properly to Network NT while Carrier 300 is switching its connection from Artificial Satellite AS1 to Artificial Satellite AS2. If Carrier 300 is connected to Network NT and transferring non-voice data, for example but not limited to, text data, software data, video data, image data, log data, and other data necessary to access Network NT and such gap" or blank" occurs by switching from Artificial Satellite AS1 to Artificial Satellite AS2, some portion of such non-voice data will not be transferred to Network NT. In some cases, the connection between Carrier 300 and Network NT is forced to be terminated if the gap" or blank" in communication is too long. In order to avoid such inconvenience and inferiority in wireless communication, Carrier 300 initiates connection with Artificial Satellite AS2 when it is about to terminate connection with Artificial Satellite AS1 as described in FIG. 61. In other words, Carrier 300 is connected to both Artificial Satellite AS1 and Artificial Satellite AS2 for a certain period of time in order to avoid gap" or blank" in wireless communication, or to avoid being dropped off" from connection with Network NT. The method described in FIGS. 59 through 61 is called the "soft handover".

Figure 60:
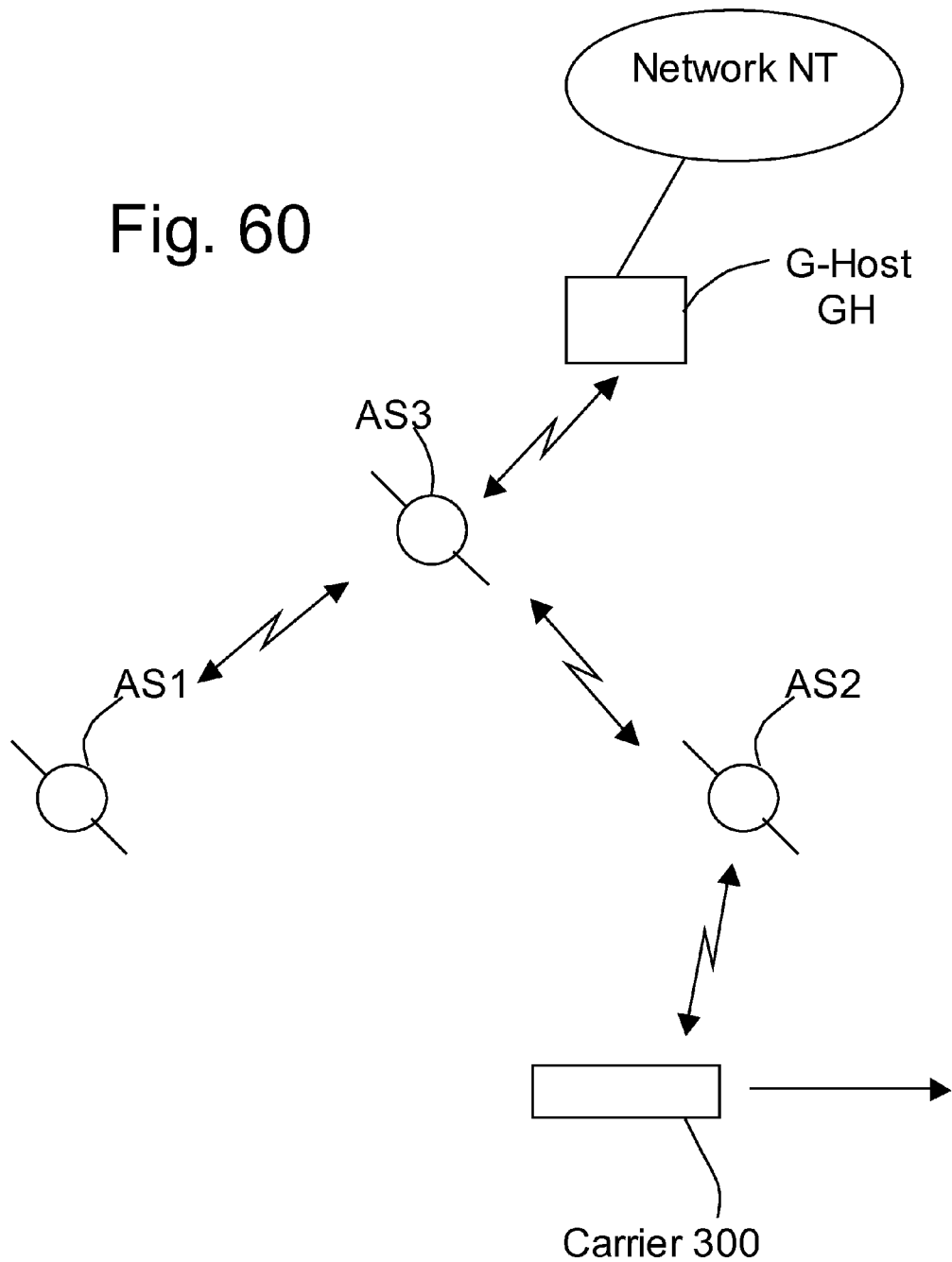
FIG. 60 is a simplified illustration of the prior art of the present invention.
Figure 61:
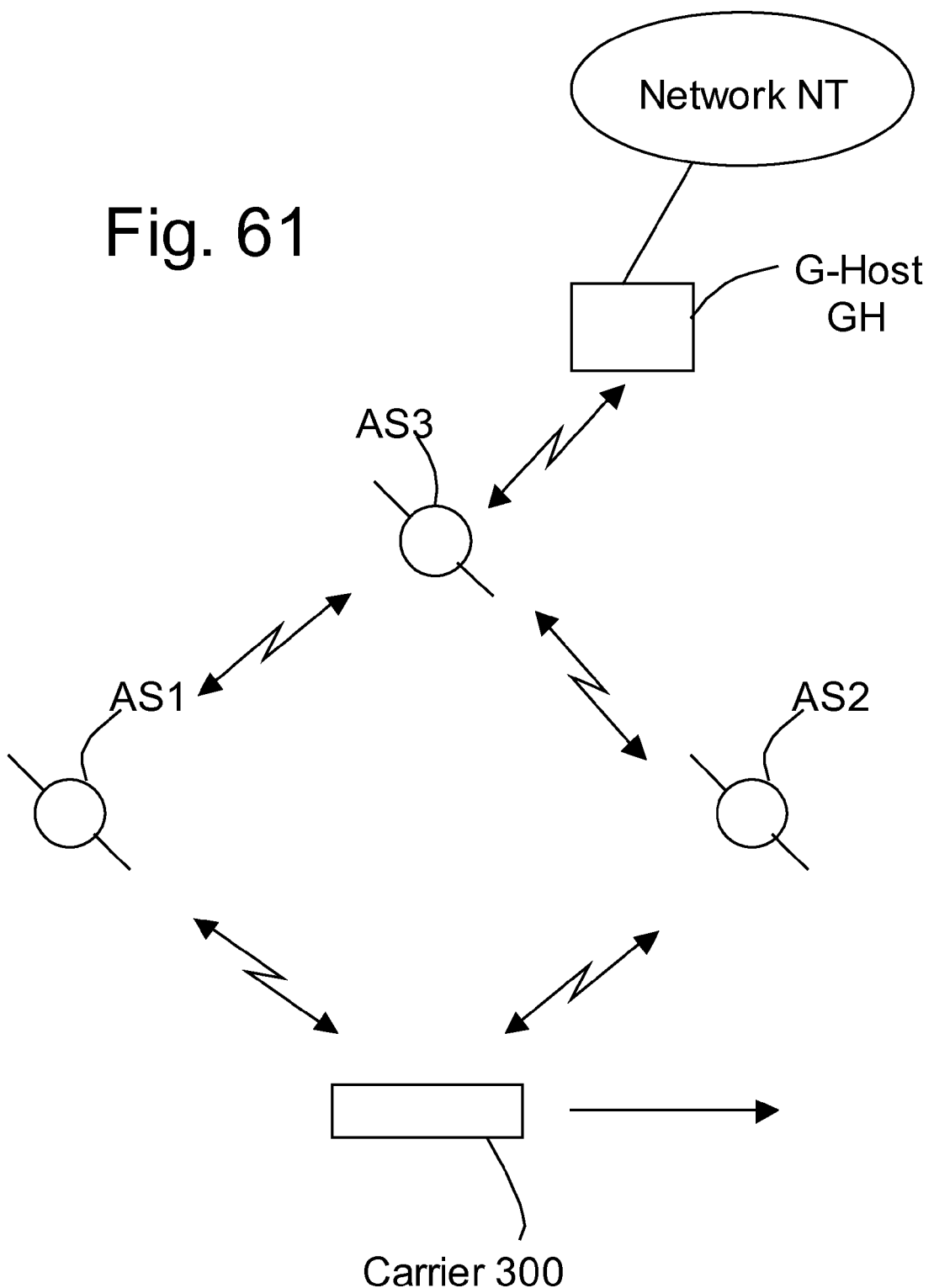
FIG. 61 is a simplified illustration of the exemplary embodiment of the present invention.
Figure 62:
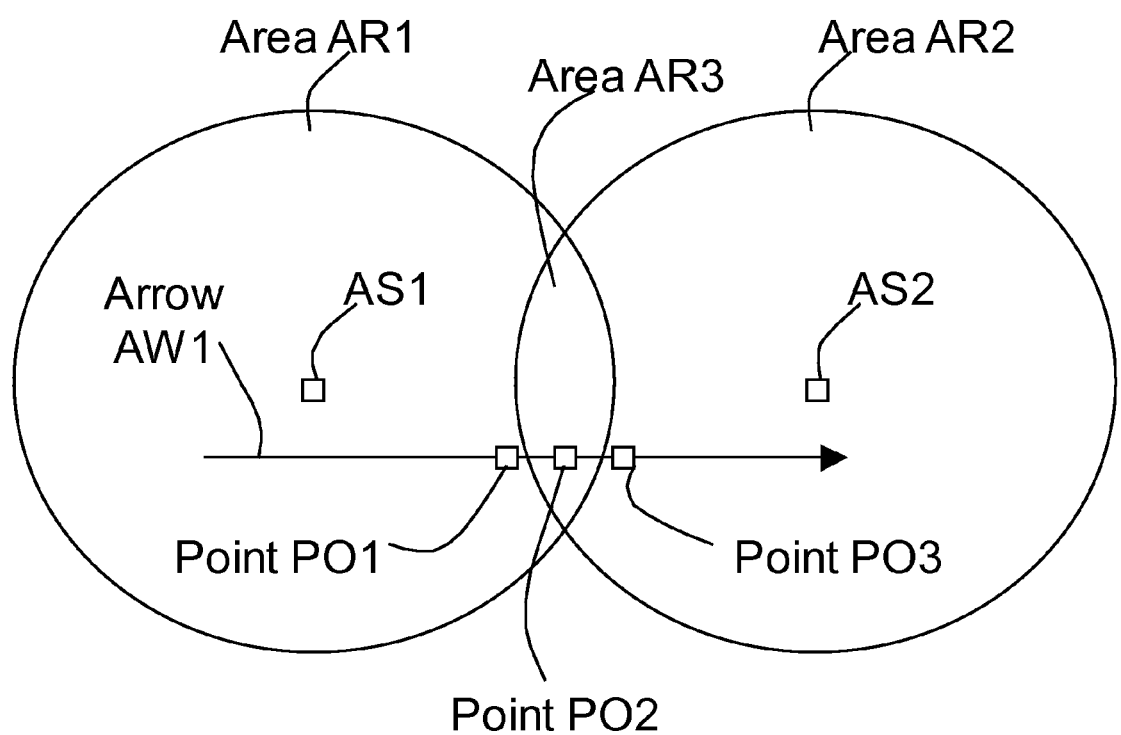
FIG. 62 is a simplified illustration of the exemplary embodiment of the present invention.

FIG. 62 is a reiteration of FIGS. 59 through 61, i.e., the soft handover. As described in FIG. 62, Artificial Satellite AS1 has a communication range described by Area AR1 and Artificial Satellite AS2 has a communication range described by Area AR2. Assuming that Carrier 300 (FIG. 61) is travelling to the direction indicated by Arrow AW1. When Carrier 300 is at Point P01, a location in Area AR1, Carrier 300 is connected to Artificial Satellite AS1. However, when Carrier 300 is at Point P02, i.e., maintains it course as described by Arrow AW1 and about to exit Area AR1 and enters Area AR3, the communication range of Artificial Satellite AS2, Carrier 300 initiates connection with AS2 while connection is maintained with Artificial Satellite AS1. When Carrier 300 completely exits Area AR1 and is in Area AR3 as described by Point P03, Carrier 300 has terminated connection with Artificial Satellite AS1 and maintains connection only with Artificial Satellite AS2.

FIG. 63 illustrates the operation of CPU 211 (FIG. 53) in order to initiate connection with Artificial Satellite AS1 (FIG. 62) before implementing the soft handover. First of all, CPU 211 periodically checks the incoming signals received by Transmitter TR2 (FIG. 53) (S1). If the signal level of the received signal is more than a specific level x" (S2), the received signal is decomposed by signal processor 208 (FIG. 53) in order to convert the signals to a specific format readable by CPU 211. The converted signal is temporarily registered in RAM 206 (FIG. 53). CPU 211 reads the converted signal from RAM 206 and if such signal is determined to be from an artificial satellite and identifies the ID number of such artificial satellite (in the present example, Artificial Satellite AS1) (S3), it initiates connection process therewith (S4). All software programs necessary to perform such operations are stored in RAM 206 (FIG. 53) and/or ROM 207 (FIG. 53).

Figure 64B:
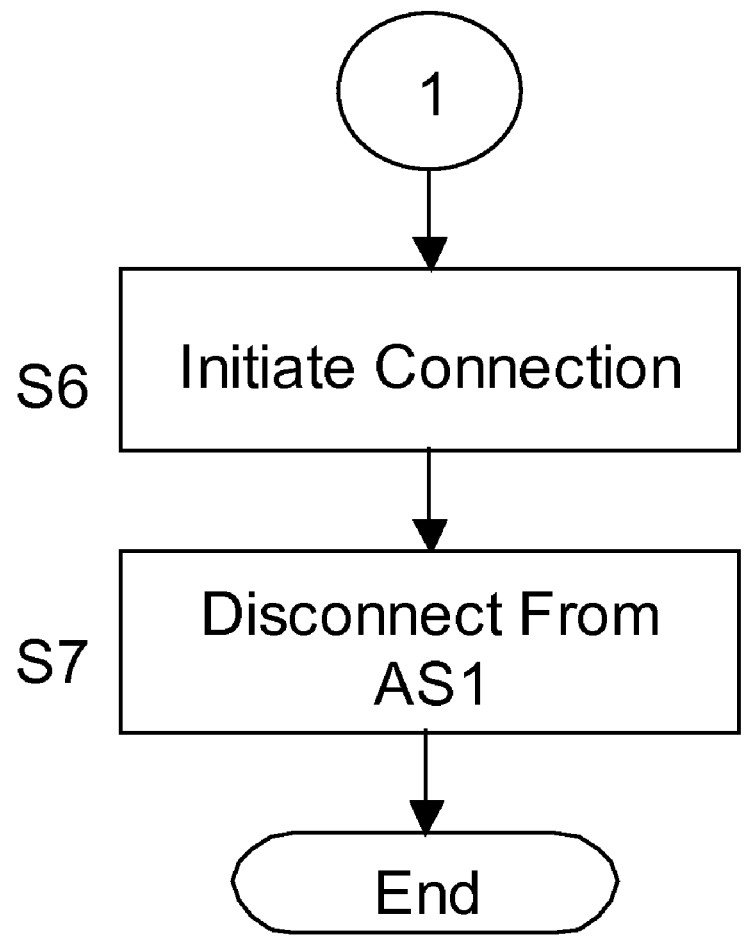
FIG. 64b is a flowchart illustrating an exemplary embodiment of the present invention.

FIG. 64a and FIG. 64b illustrate the operation of CPU 211 (FIG. 53) in order to implement the soft handover. While connection with Artificial Satellite AS1 is maintained (S1), CPU 211 periodically checks the signal level of the signals received from Artificial Satellite AS1 (FIG. 12). If the signal level is above level x", no further action is necessary and Carrier 300 is solely connected to Artificial Satellite AS1 (S2). However, if Carrier 300 moves further from Artificial Satellite AS1 and approaches to the boundary of Area AR1 (FIG. 62) and thereby the signal level is no longer above level x" (S2), CPU 211 initiates a certain process to search for another artificial satellite (S3). If the signal level of the received signal is more than a specific level x" (S4), the received signal is decomposed by signal processor 208 (FIG. 53) in order to convert the signals to a specific format readable by CPU 211. The converted signal is temporarily registered in RAM 206 (FIG. 53). CPU 211 reads the converted signal from RAM 206 and if such signal is determined to be from an artificial satellite and identifies the ID number of such artificial satellite (in the present example, Artificial Satellite AS2) (S5), it initiates connection therewith (S6). After confirming that the connection with Artificial Satellite AS2 is secured, CPU 211 terminates the connection with Artificial Satellite AS1 (S7). All software programs necessary to perform such operations are stored in RAM 206 and/or ROM 207 (FIG. 53).

For purposes of implementing the soft handover, various types of communication method may be utilized, such as FDMA, TDMA, CDMA, and/or W-CDMA.

As another embodiment of the present invention Carrier 300" can be read as communication device" such as personal computer which is capable to send and receive data in a wireless fashion, a PDA, a PHS, and/or a cellular phone, and thereby enables such communication device to be connected to Network NT (FIG. 61) without having gap" or blank" or connection drop-off by way of utilizing the present invention.

Having thus described a presently preferred embodiment of the present invention, it will not be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

<<Wireless Communication Facilitating System—Summary>>

A transportation system comprising a main cabin, a first antenna, a second antenna, and a host; said main cabin comprises a plurality of seats, said first antenna is connected to or located close to said main cabin, said second antenna is connected to or located close to the outer-surface of said transportation system, said host is connected to said first antenna and said second antenna wherein a plurality of wireless signals produced in said main cabin are received by said first antenna which transfers said wireless signals to said host, and said host converts said wireless signals to a specific format, which are transferred from said second antenna.

A transportation system comprising a main cabin, a first antenna, a second antenna, and a host; said main cabin comprises a plurality of seats, said first antenna is connected to or located close to said main cabin, said second antenna is connected to or located close to the outer-surface of said transportation system, said host is connected to said first antenna and said second antenna wherein a plurality of wireless signals produced outside the transportation system are received by said second antenna which transfers said wireless signals to said host, and said host converts said wireless signals to a specific format, which are transferred from said first antenna to said main cabin.

A transportation system comprising a main cabin, a first antenna, a second antenna, and a host; said main cabin comprises a plurality of seats, said first antenna is connected to or located close to said main cabin, said second antenna is connected to or located close to the outer-surface of said transportation system, said host is connected to said first antenna and said second antenna wherein a plurality of wireless signals produced in said main cabin are received by said first antenna which transfers said wireless signals to said host, and said host converts said wireless signals to a specific format, which are transferred from said second antenna, wherein said transportation system thereby enables the passengers in said main cabin to communicate in a wireless fashion with people or things which cannot directly be contacted with the communication devices they possess in said main cabin.

A transportation system comprising a main cabin, a first antenna, a second antenna, and a host; said main cabin comprises a plurality of seats, said first antenna is connected to or located close to said main cabin, said second antenna is connected to or located close to the outer-surface of said transportation system, said host is connected to said first antenna and said second antenna wherein a plurality of wireless signals produced outside the transportation system are received by said second antenna which transfers said wireless signals to said host, and said host converts said wireless signals to a specific format, which are transferred from said first antenna to said main cabin, wherein said transportation system thereby enables the passengers in said main cabin to communicate in a wireless fashion with people or things which cannot directly be contacted with the communication devices they possess in said main cabin.

The transportation system of summary 1, 2, 3, or 4, wherein said wireless signals comprise digital data.

The transportation system of summary 1, 2, 3, or 4, wherein said wireless signals comprise voice data and non-voice data.

The transportation system of summary 1, 2, 3, or 4, wherein said wireless signals comprise text data.

The transportation system of summary 1, 2, 3, or 4, wherein said wireless signals comprise software data.

The transportation system of summary 1, 2, 3, or 4, wherein said wireless signals comprise video data.

The transportation system of summary 1, 2, 3, or 4, wherein said wireless signals comprise image data.

The transportation system of summary 1, 2, 3, or 4, wherein said transportation system thereby enables the passengers in said main cabin to communicate in a wireless fashion with people or things which cannot directly be contacted with the communication devices they possess in said main cabin.

The transportation system of summary 1 or 2, wherein said transportation system is enabled to implement soft hand over between a first Artificial Satellite and a second Artificial Satellite in order to maintain a seamless connection with another device.

Having thus described a presently preferred embodiment of the present invention, it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. For the avoidance of doubt, the applicant has no intent to surrender any equivalent of any element included in the claims by any amendment of the claims unless expressly and unambiguously stated otherwise in the amendment. Further, for the avoidance of doubt, the number of the prior arts introduced herein (and/or in IDS) may be of a large one, however, the applicant has no intent to hide the more relevant prior art(s) in the less relevant ones.

The invention claimed is:

1. A vehicle comprising an internal wireless communication device and an external wireless communication device;
   wherein said internal wireless communication device is operable to receive a 1st multiple data and a 2nd multiple data, wherein said 1st multiple data includes a 1st first type data and a 1st second type data, wherein said 1st first type data indicates a specific type of data transferred by a 1st wireless mobile device located in said vehicle, said 1st second type data indicates another specific type of data transferred by said 1st wireless mobile device located in said vehicle, wherein said 1st second type data is a different type of data compared to said 1st first type data, and said 1st second type data includes alphabetic and/or numeric data produced by said 1st wireless mobile device, and wherein said 2nd multiple data includes a 2nd first type data and a 2nd second type data, wherein said 2nd first type data indicates a specific type of data transferred by a 2nd wireless mobile device located in said vehicle, said 2nd second type data indicates another specific type of data transferred by said 2nd wireless mobile device located in said vehicle, wherein said 2nd second type data is a different type of data compared to said 2nd first type data, and said 2nd second type data includes alphabetic and/or numeric data produced by said 2nd wireless mobile device;
   wherein said external wireless communication device is operable to transfer in a wireless fashion said 1st multiple data and said 2nd multiple data received via said internal wireless communication device to an external wireless signal receiving device, which is a device located outside of said vehicle and which is operable to receive wireless signals; and
   wherein when said external wireless communication device receives an off-board wireless controlling signal, an onboard control command indicating to control said vehicle is nullified and said vehicle is controlled by an off-board wireless controlling command received via said external wireless communication device in a wireless fashion.

2. The vehicle of claim 1, wherein said 1st first type data indicates a voice data and said 1st second type data indicates a text data.

3. The vehicle of claim 1, wherein said 1st first type data indicates a voice data and said 1st second type data indicates a software data.

4. The vehicle of claim 1, wherein said 1st first type data indicates a voice data and said 1st second type data indicates a video data.

5. The vehicle of claim 1, wherein said 1st first type data indicates a voice data and said 1st second type data indicates an image data.

6. The vehicle of claim 1, wherein said 1st first type data indicates a voice data and said 1st second type data indicates a non-voice data.

7. A vehicle comprising an internal wireless communication device and an external wireless communication device;
   wherein said internal wireless communication device is operable to receive a 1st multiple data and a 2nd multiple data;
   wherein said 1st multiple data includes a 1st first type data and a 1st second type data, wherein said 1st first type data indicates a specific type of data transferred by a 1st wireless mobile device located in said vehicle, said 1st second type data indicates another specific type of data transferred by said 1st wireless mobile device located in said vehicle, wherein said 1st second type data is a different type of data compared to said 1st first type data, and said 1st second type data includes alphabetic and/or numeric data produced by said 1st wireless mobile device;
   wherein said 2nd multiple data includes a 2nd first type data and a 2nd second type data, wherein said 2nd first type data indicates a specific type of data transferred by a 2nd wireless mobile device located in said vehicle, said 2nd second type data indicates another specific type of data transferred by said 2nd wireless mobile device located in said vehicle, wherein said 2nd second type data is a different type of data compared to said 2nd first type data, and said 2nd second type data includes alphabetic and/or numeric data produced by said 2nd wireless mobile device; and
   wherein said external wireless communication device is operable to transfer said 1st multiple data and said 2nd multiple data in a wireless fashion to an external wireless signal receiving device, which is a device located outside of said vehicle and which is operable to receive wireless signals.

8. The vehicle of claim 7, wherein said 1st first type data indicates a voice data and said 1st second type data indicates a text data.

9. The vehicle of claim 7, wherein said 1st first type data indicates a voice data and said 1st second type data indicates a software data.

10. The vehicle of claim 7, wherein said 1st first type data indicates a voice data and said 1st second type data indicates a video data.

11. The vehicle of claim 7, wherein said 1st first type data indicates a voice data and said 1st second type data indicates an image data.

12. The vehicle of claim 7, wherein said 1st first type data indicates a voice data and said 1st second type data indicates a non-voice data.

13. The vehicle of claim 7, wherein said external wireless signal receiving device is a satellite.

14. A method for a vehicle comprising:
   (1) receiving a 1st multiple data and a 2nd multiple data via an internal wireless communication device of said vehicle in a wireless fashion, and
   (2) transferring said 1st multiple data and said 2nd multiple data via an external wireless communication device of said vehicle in a wireless fashion to an external wireless signal receiving device, which is a device located outside of said vehicle and which is operable to receive wireless signals;
   wherein said 1st multiple data includes a 1st first type data and a 1st second type data, wherein said 1st first type data indicates a specific type of data transferred by a 1st wireless mobile device located in said vehicle, said 1st second type data indicates another specific type of data transferred by said 1st wireless mobile device located in said vehicle, wherein said 1st second type data is a different type of data compared to said 1st first type data, and said 1st second type data includes alphabetic and/or numeric data produced by said 1st wireless mobile device; and
   wherein said 2nd multiple data includes a 2nd first type data and a 2nd second type data, wherein said 2nd first type data indicates a specific type of data transferred by a 2nd wireless mobile device located in said vehicle, said 2nd second type data indicates another specific type of data transferred by said 2nd wireless mobile device located in said vehicle, wherein said 2nd second type data includes a different type of data compared to said 2nd first type data, and said 2nd second type data includes alphabetic and/or numeric data produced by said 2nd wireless mobile device.

15. The method of claim 14, wherein said 1st first type data indicates a voice data and said 1st second type data indicates a text data.

16. The method of claim 14, wherein said 1st first type data indicates a voice data and said 1st second type data indicates a software data.

17. The method of claim 14, wherein said 1st first type data indicates a voice data and said 1st second type data indicates a video data.

18. The method of claim 14, wherein said 1st first type data indicates a voice data and said 1st second type data indicates an image data.

19. The method of claim 14, wherein said 1st first type data indicates a voice data and said 1st second type data indicates a non-voice data.

20. The method of claim 14, wherein said external wireless signal receiving device is a satellite.

* * * * *